(12) United States Patent
Blunt

(10) Patent No.: US 6,898,975 B2
(45) Date of Patent: May 31, 2005

(54) SYNCHRONOUS AVERAGING OF EPICYCLIC SUN GEAR VIBRATION

(75) Inventor: David Mark Blunt, Fishermans Bend (AU)

(73) Assignee: The Defence Science and Technology Organization of the Department of Defence on Behalf of The Commonwealth of Australia, Fishermans Bend (AU)

( * ) Notice: Subject to any disclaimer, the term of this patent is extended or adjusted under 35 U.S.C. 154(b) by 0 days.

(21) Appl. No.: 10/764,044

(22) Filed: Jan. 23, 2004

(65) Prior Publication Data

US 2004/0200283 A1 Oct. 14, 2004

Related U.S. Application Data

(60) Provisional application No. 60/442,282, filed on Jan. 24, 2003.

(51) Int. Cl.[7] .......................... G01M 13/02; G01H 17/00
(52) U.S. Cl. ............................................................ 73/593
(58) Field of Search ........................... 73/593, 658, 659, 73/660, 661

(56) References Cited

U.S. PATENT DOCUMENTS

| | | | | |
|---|---|---|---|---|
| 5,698,788 A | * | 12/1997 | Mol et al. ...................... | 73/659 |
| 6,298,725 B1 | * | 10/2001 | Forrester ...................... | 73/593 |
| 6,681,634 B2 | * | 1/2004 | Sabini et al. ................... | 73/593 |

FOREIGN PATENT DOCUMENTS

| | | | | |
|---|---|---|---|---|
| AU | B-40638/95 | | 9/1996 | |
| JP | 56168518 A | * | 12/1981 | ............ G01H/1/00 |
| JP | 56168519 A | * | 12/1981 | ............ G01H/1/00 |
| JP | 56168520 A | * | 12/1981 | ............ G01H/1/00 |
| JP | 56168521 A | * | 12/1981 | ............ G01H/1/00 |
| JP | 56168522 A | * | 12/1981 | ............ G01H/1/00 |

OTHER PUBLICATIONS

Forrester, B.D. "A Method for the Separation of Epicyclic Planet Gear Vibration Signatures", Proceedings of the Third International Conference on Vibratory Surveillance Methods and Diagnostic Techniques, Senlis, France, Oct. 12th–15th, 1998.*

Howard, I. M., "An Investigation of Vibration Signal Averaging of Individual Components in an Epicyclic Gearbox", DSTO ARL Propulsion Report 185, ARL–PROP–R–185, AR–006–147, Jun. 1991.*

McFadden, P.D. and Howard, L.M., "The Detection of Seeded Faults in an Epicyclic Gearbox by Signal Averaging of the Vibration", DSTO ARL Propulsion Report 183, ARL–ROP–R–183, AR–006–087, Oct. 1990.*

McFadden, P.D., "A Model for the Extraction of Periodic Waveforms by Time Domain Averaging", Aero Propulsion Technical Memorandum 435, Department of Defense, Aeronautical Research Laboratory, Mar. 1986.*

* cited by examiner

Primary Examiner—Hezron Williams
Assistant Examiner—Rose M. Miller
(74) Attorney, Agent, or Firm—William W. Haefliger

(57) ABSTRACT

In the method of detecting a localized sun gear fault, in the operation of an epicyclic gear train having ring, planet and sun gears, and a planet carrier, the steps that include detecting sun gear vibrations transmitted through each planet gear, computing separated averages of such detected vibrations, phase shifting the averages to account for the differences in gear meshing positions, and re-combining the phase shifted averages to produce a modified average value of the sun gear vibration.

13 Claims, 55 Drawing Sheets

Figure 13B:
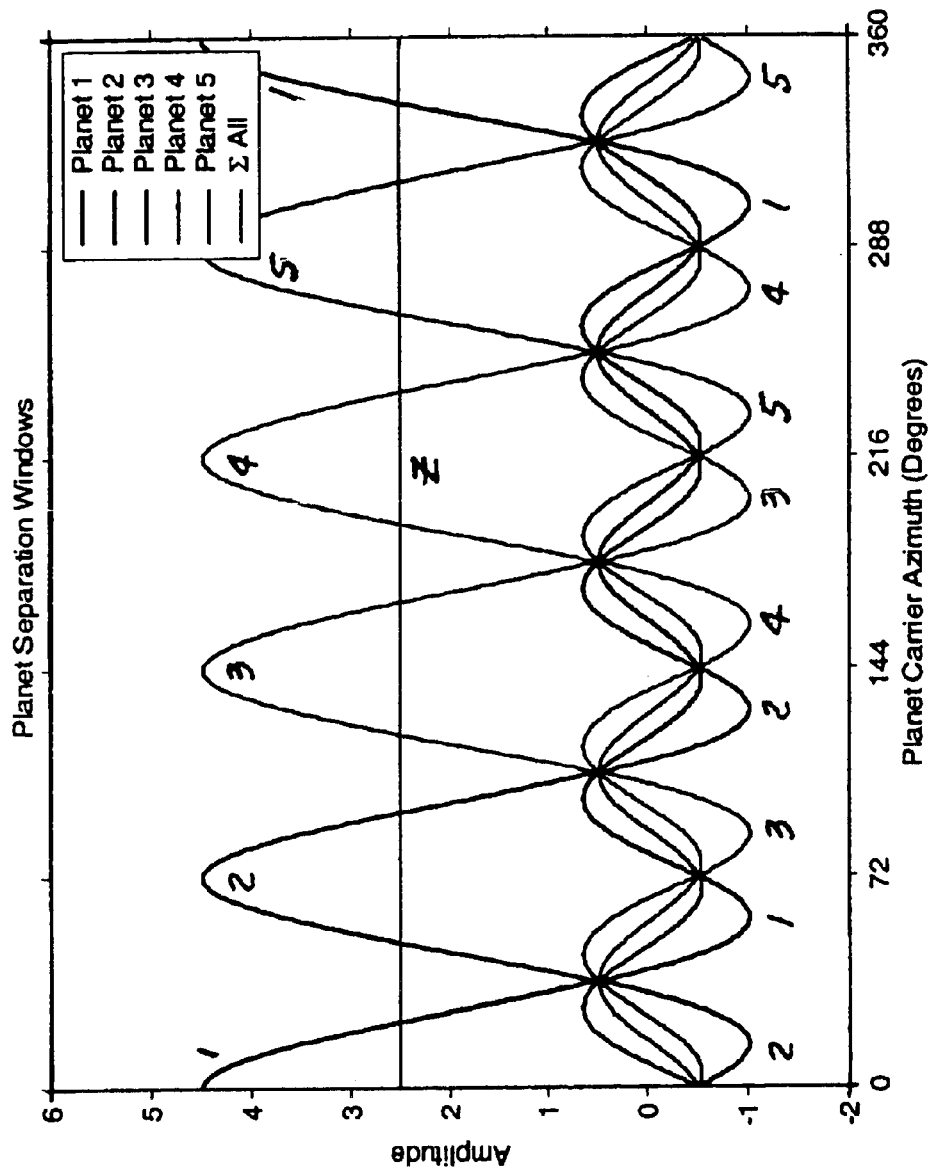

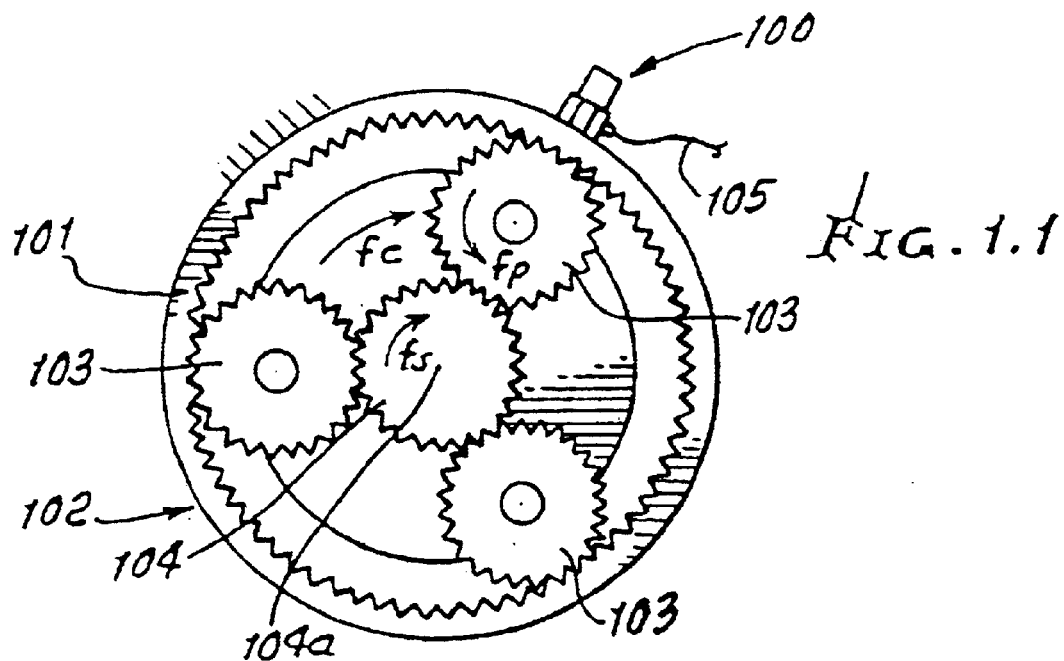
FIG. 1.1
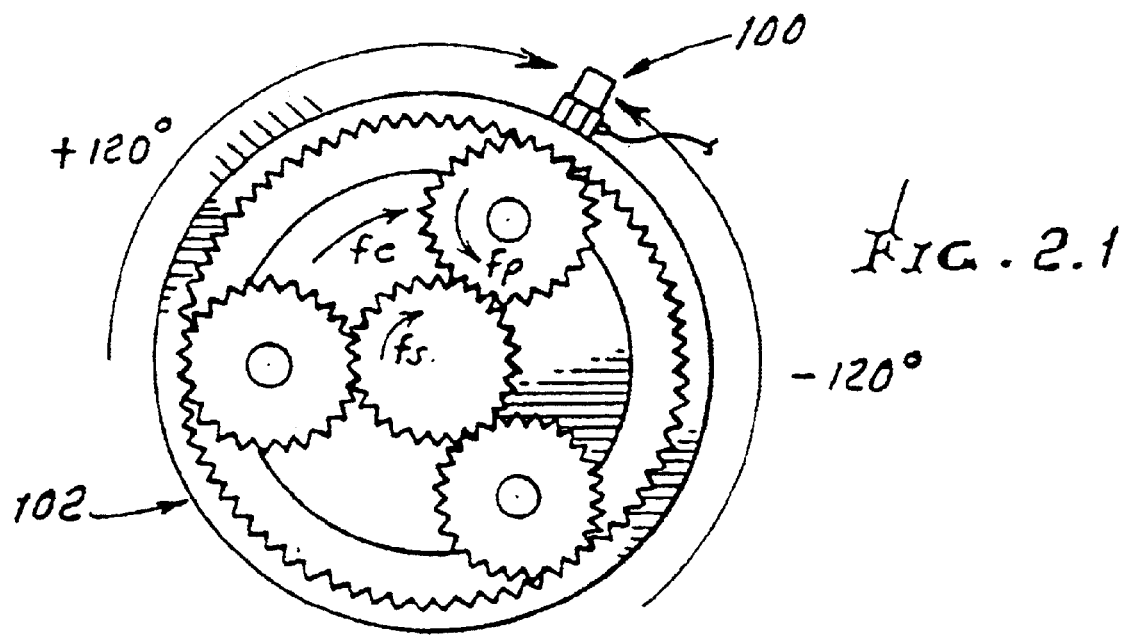
FIG. 2.1

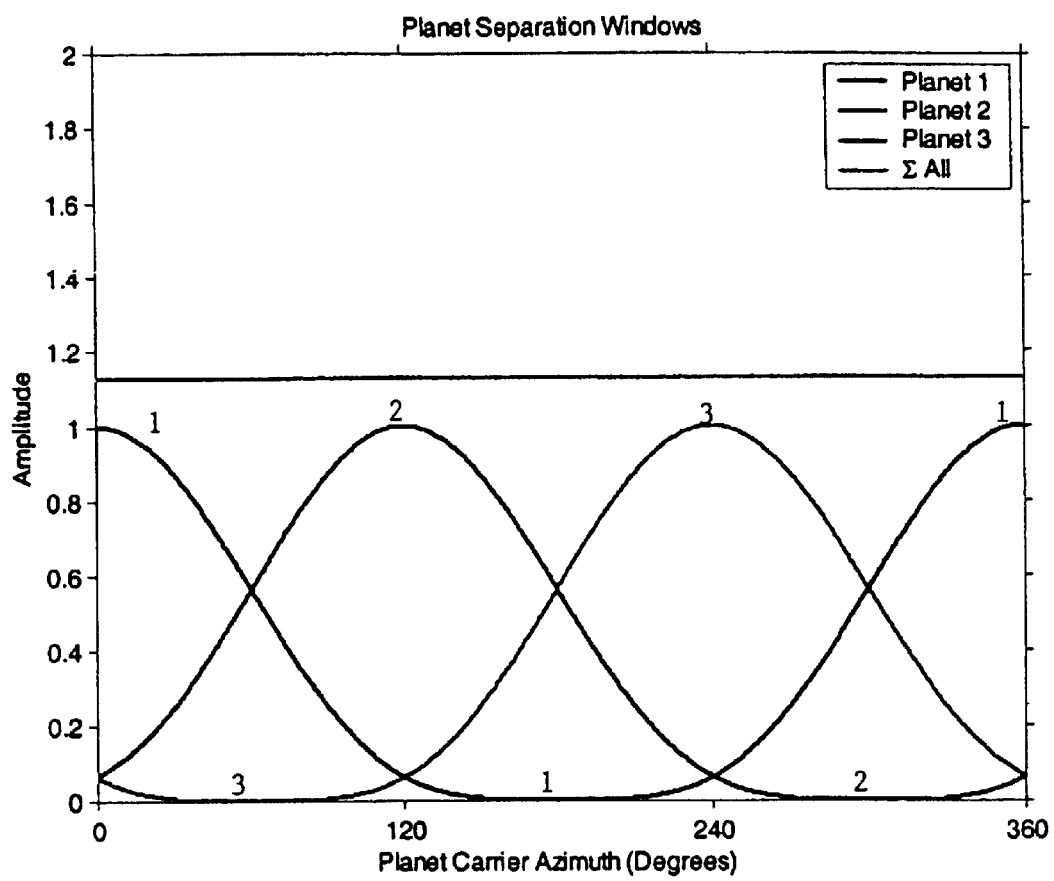
FIG. 1.2a

FIG. 1.2b
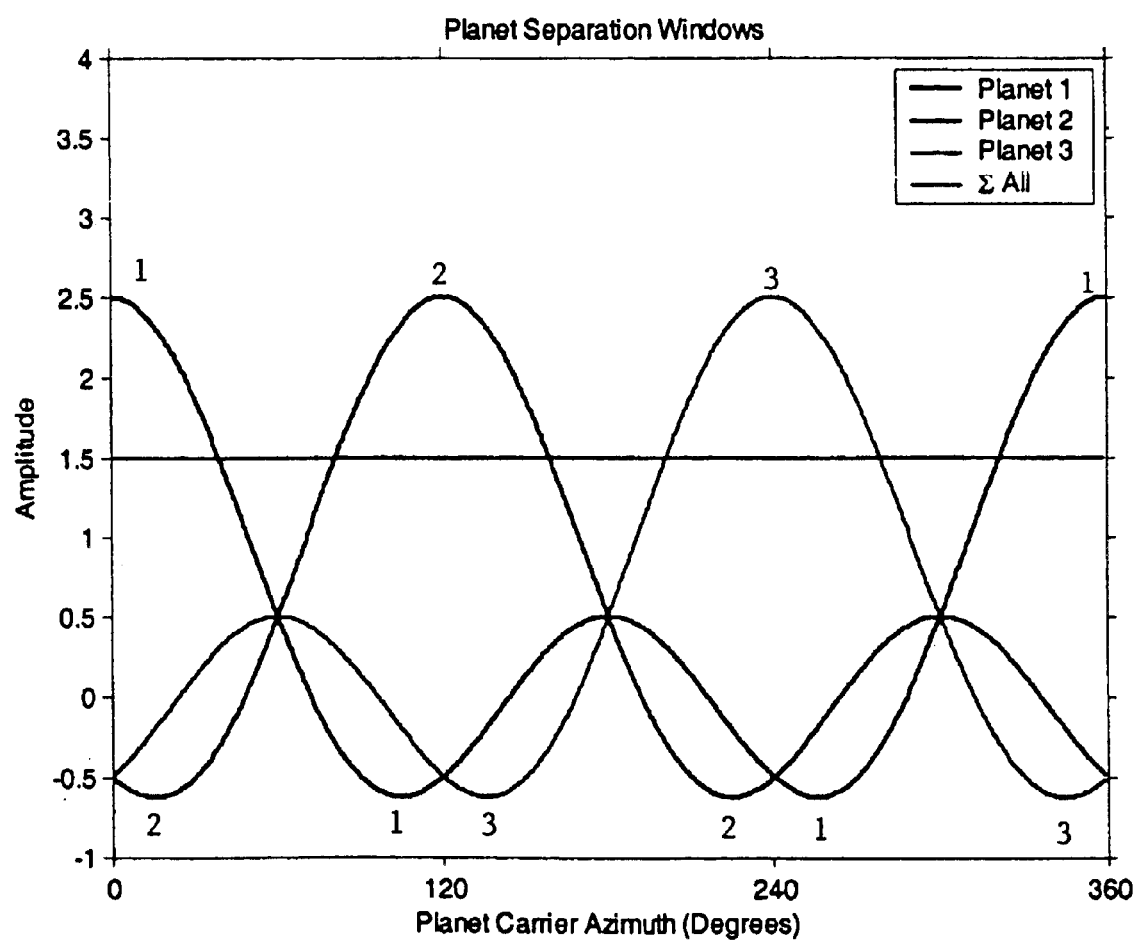

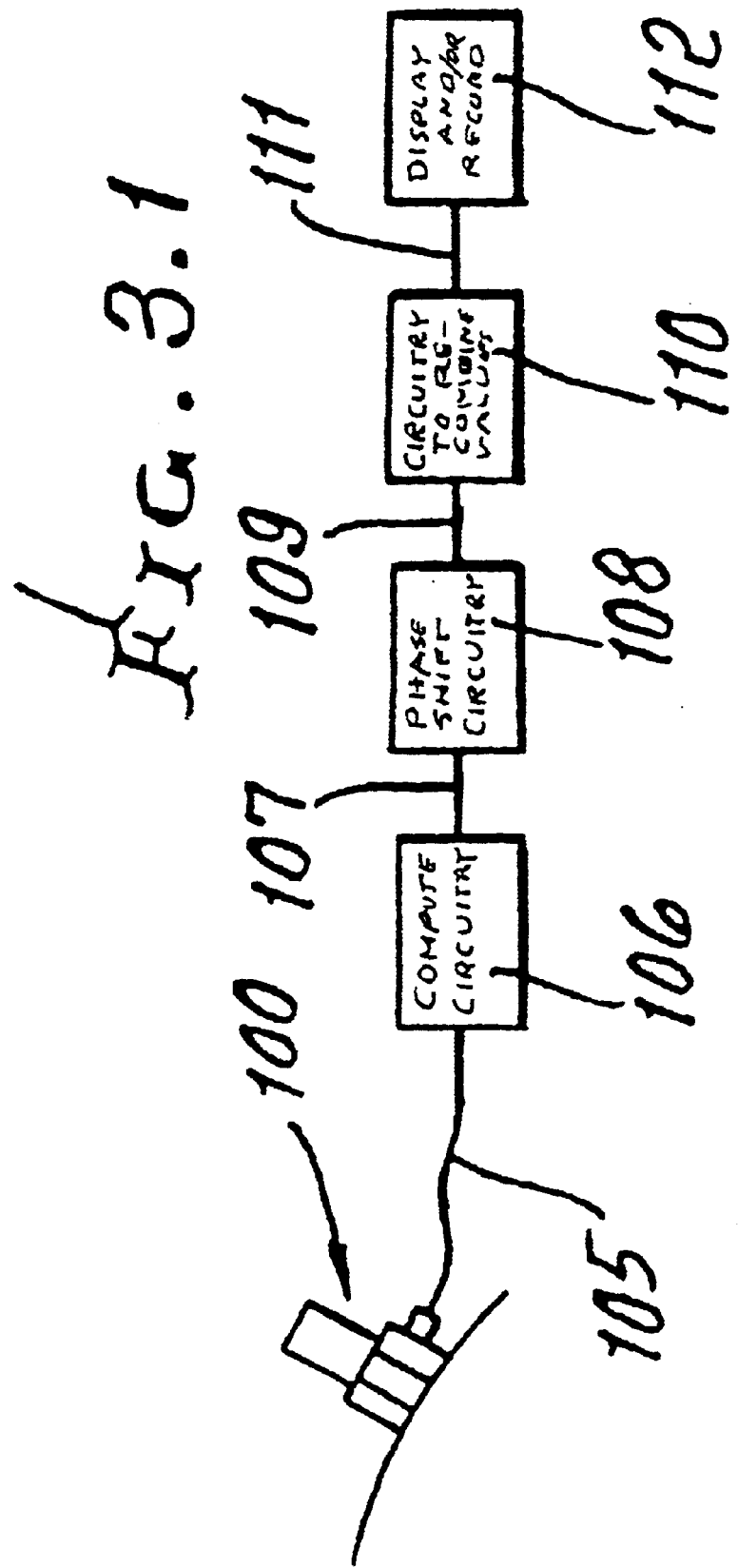

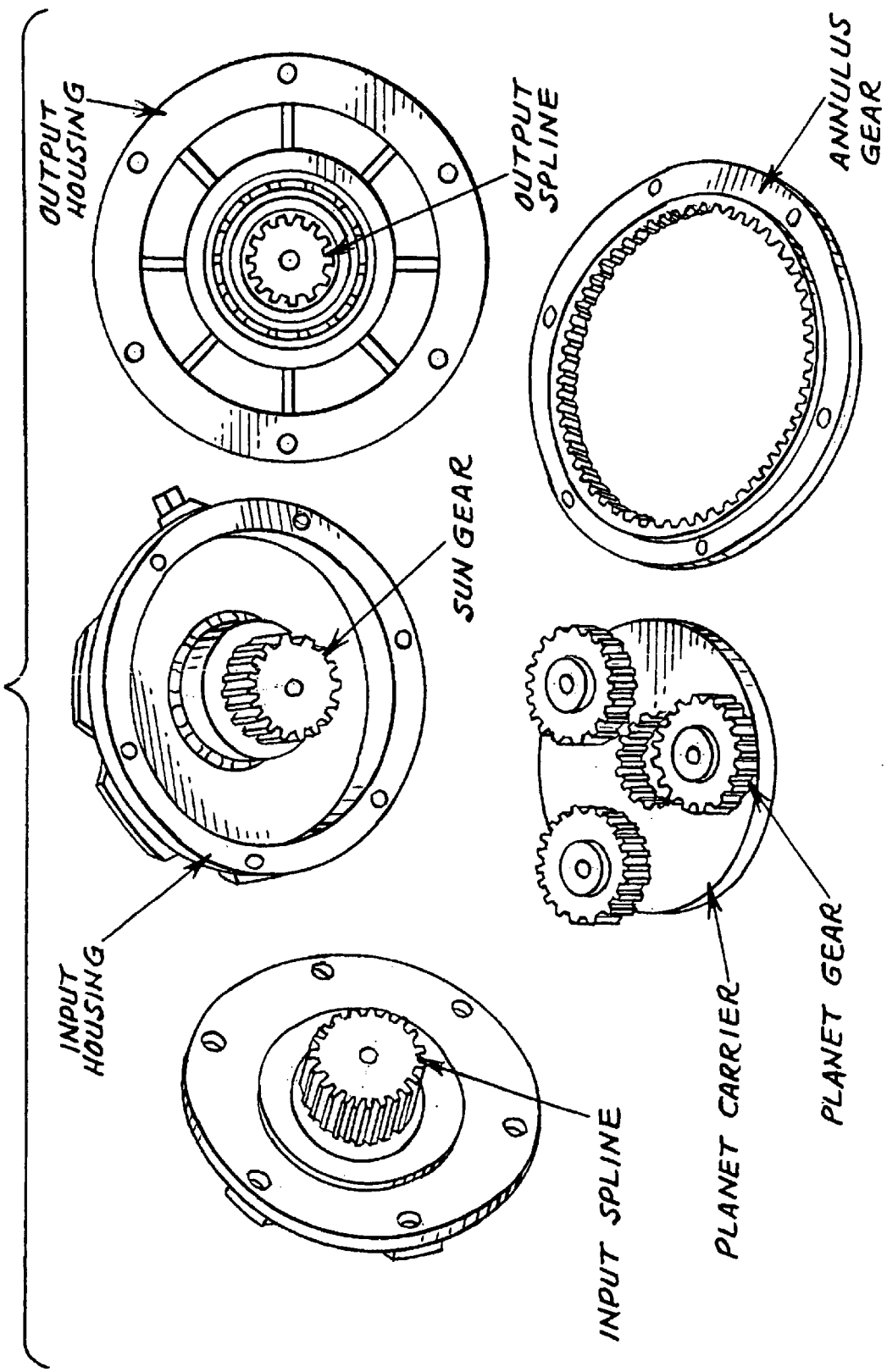

*Sun gear separations (window = $w_{power}(t)$) – no fault.*
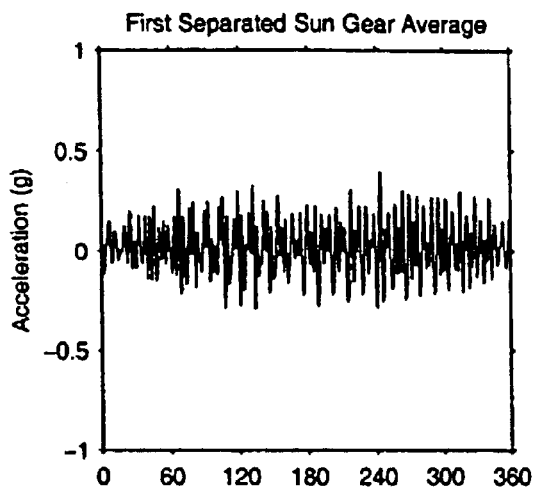
FIG. 4.2a
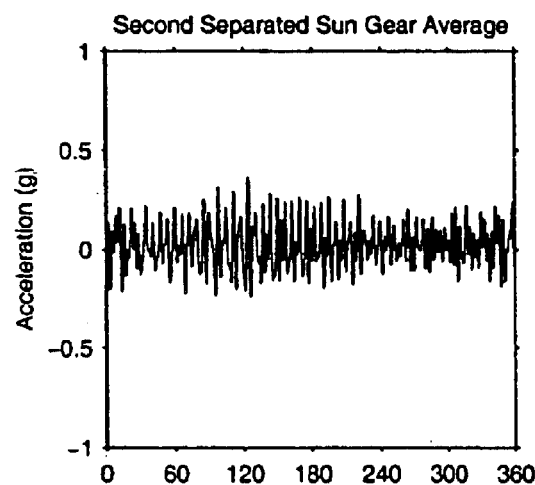
FIG. 4.2b
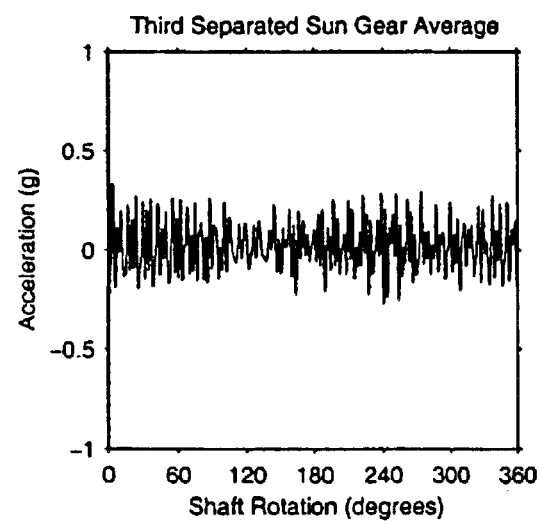
FIG. 4.2c

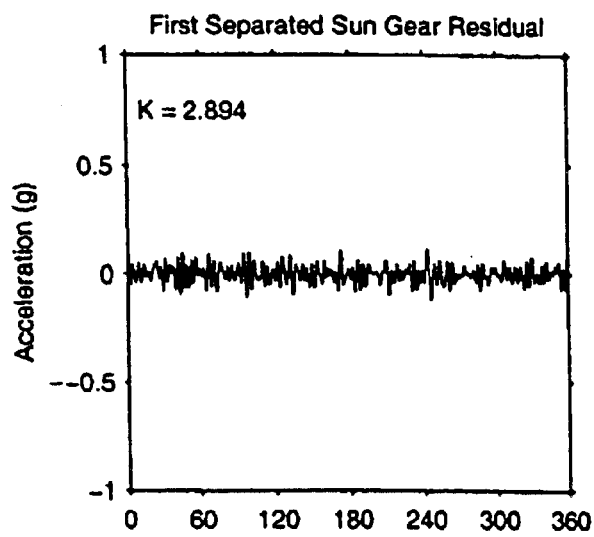
FIG. 4.2d
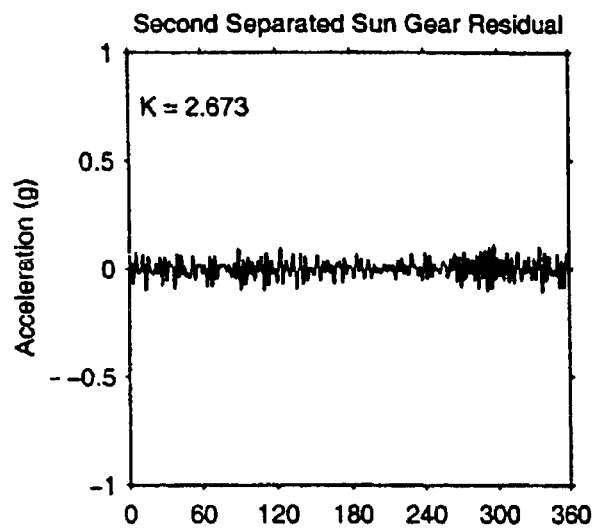
FIG. 4.2e
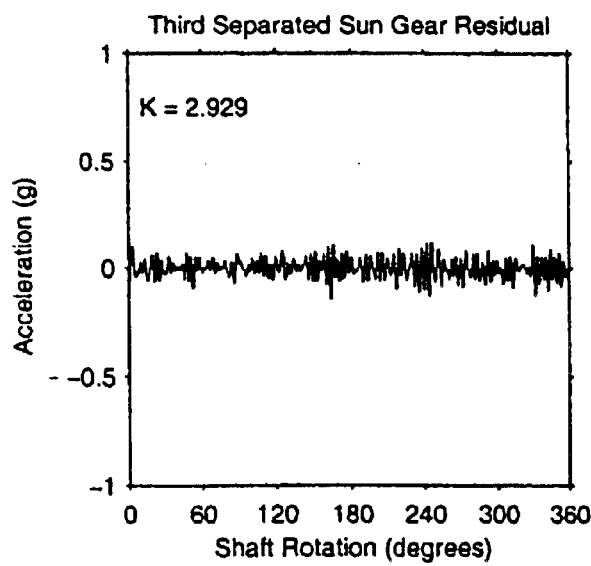
FIG. 4.2f

Sun gear separations (window = $w_{sum}(t)$) – no fault.
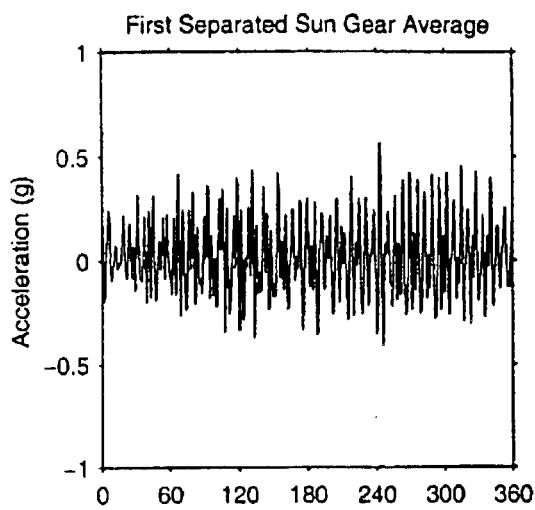
FIG. 4.3a
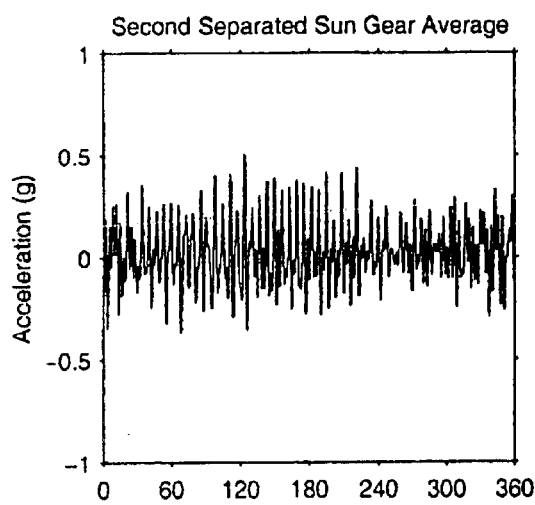
FIG. 4.3b
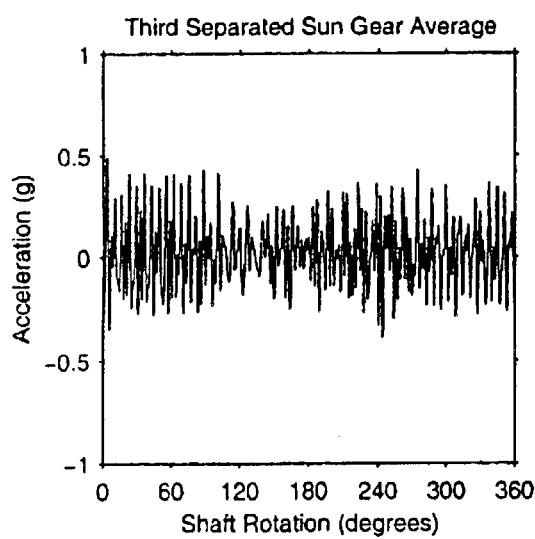
FIG. 4.3c

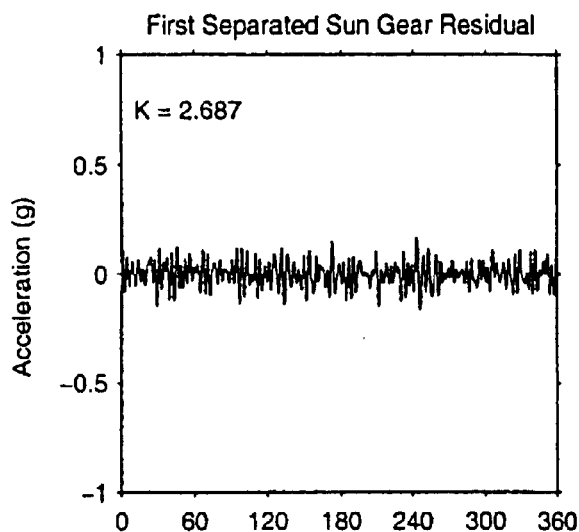
FIG. 4.3d
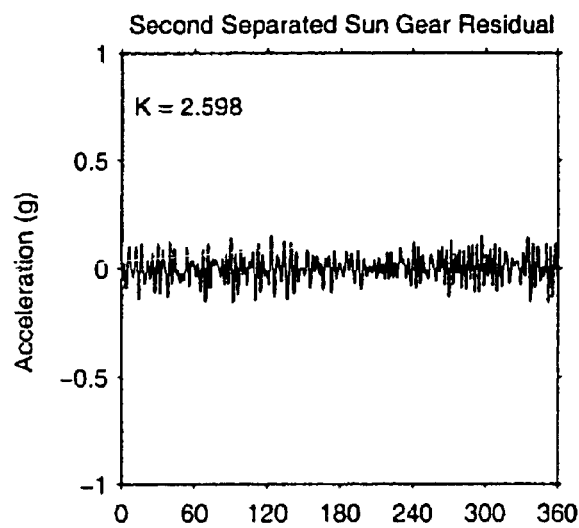
FIG. 4.3e
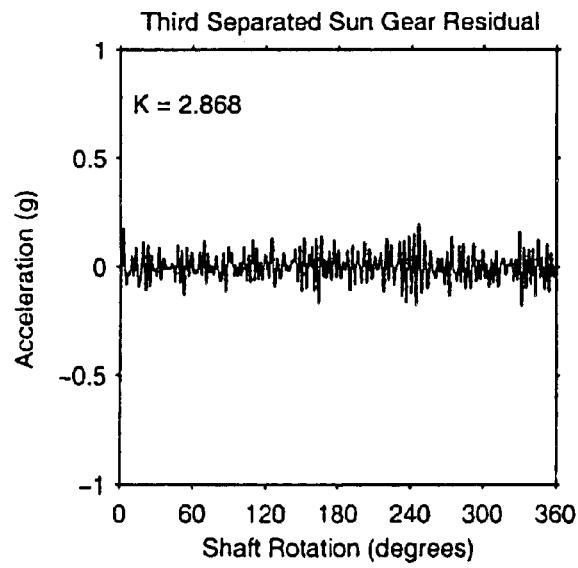
FIG. 4.3f

*Ordinary, combined & modified sun gear averages (window = $w_{power}(t)$) – no fault.*
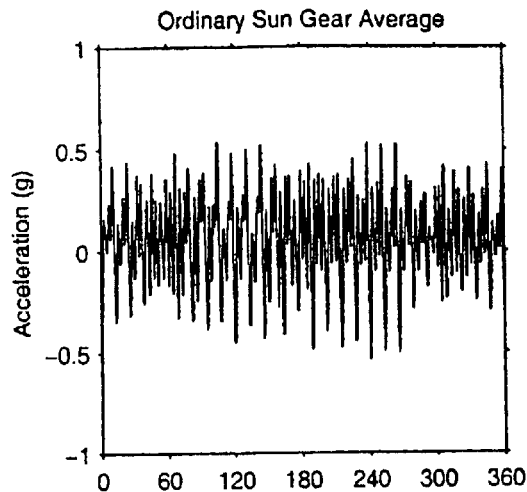
FIG. 4.4a
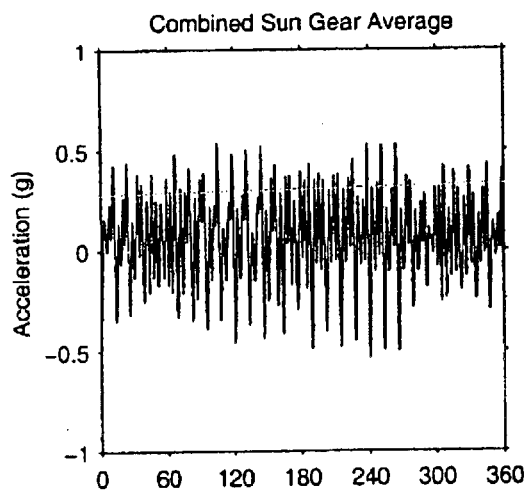
FIG. 4.4b
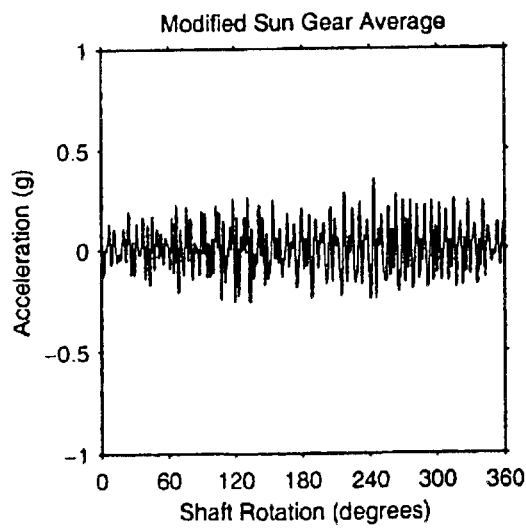
FIG. 4.4c

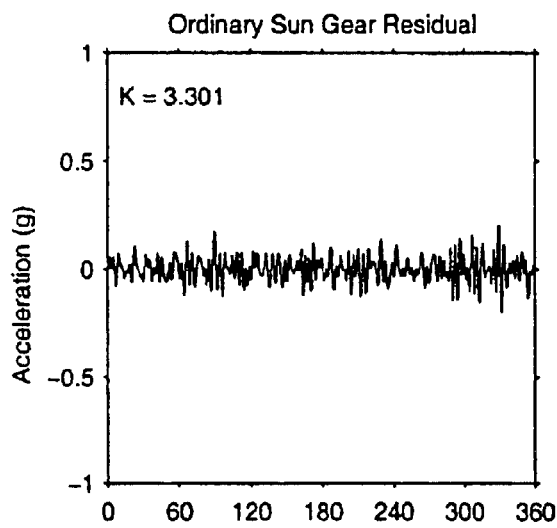
FIG. 4.4d
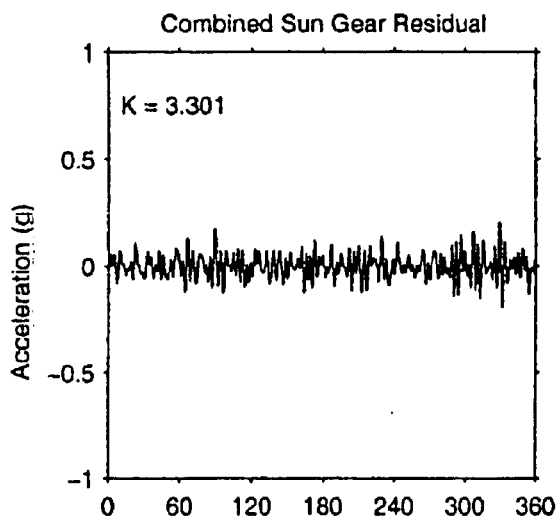
FIG. 4.4e
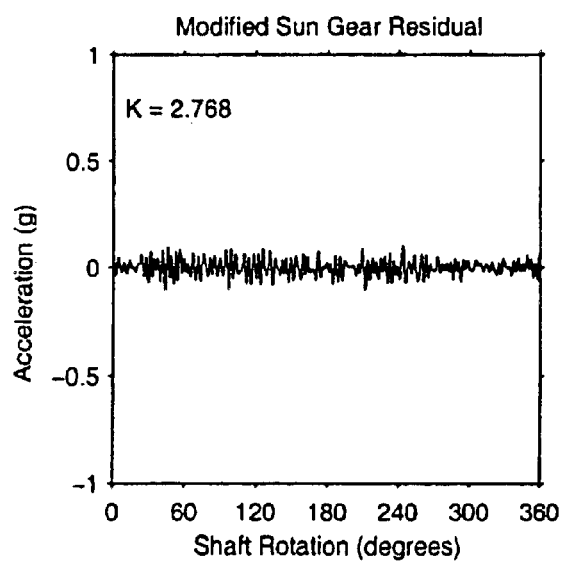
FIG. 4.4f

*Ordinary, combined & modified sun gear averages (window = $w_{sum}(t)$) – no fault.*
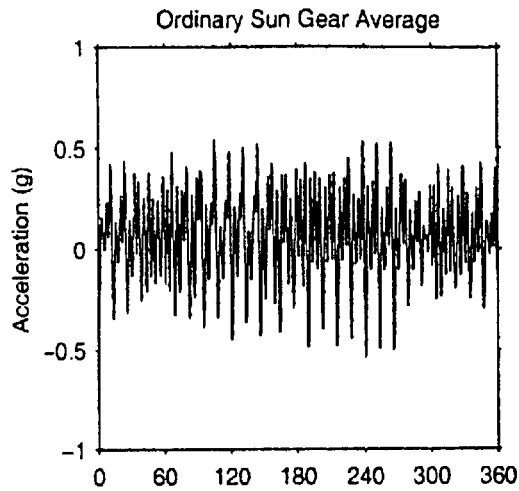
FIG. 4.5a
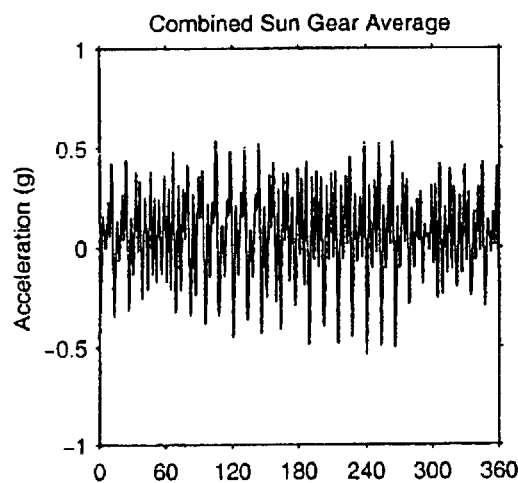
FIG. 4.5b
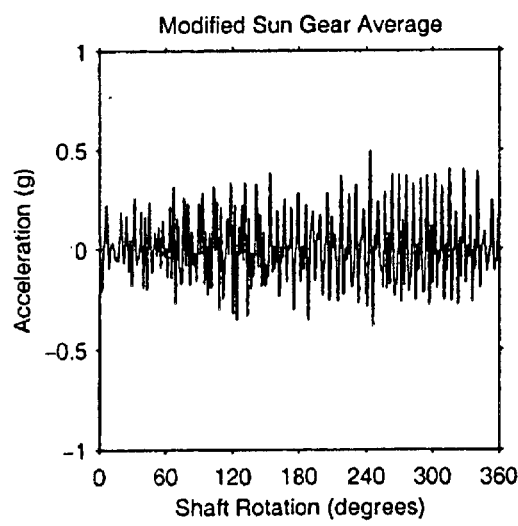
FIG. 4.5c

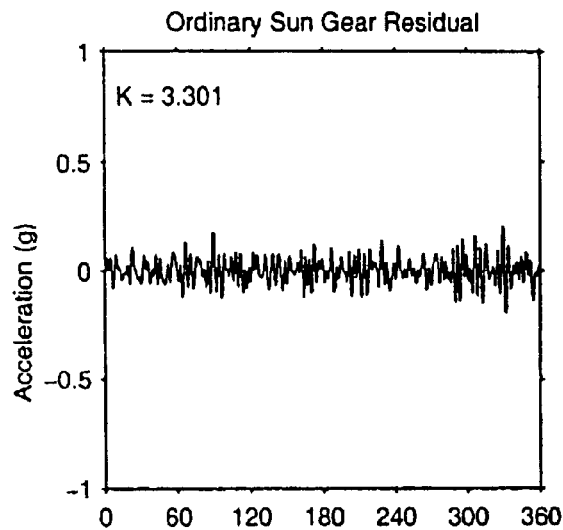
FIG. 4.5d
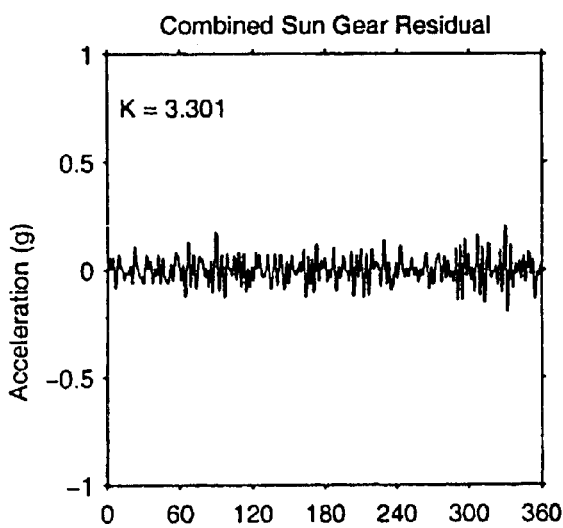
FIG. 4.5e
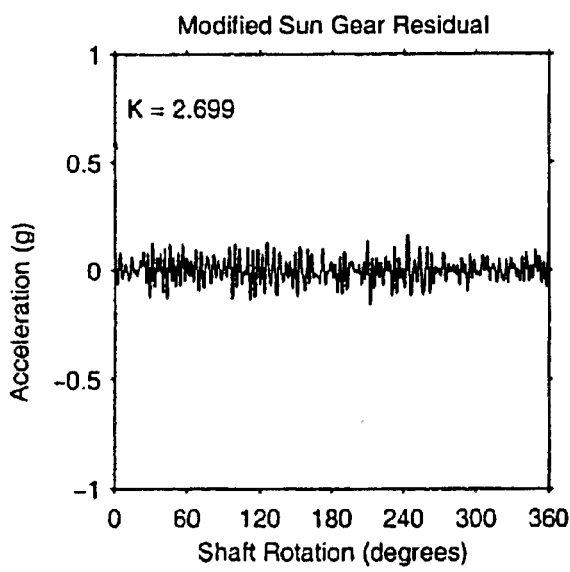
FIG. 4.5f

Sun gear separations (window = $w_{power}(t)$) – fault.
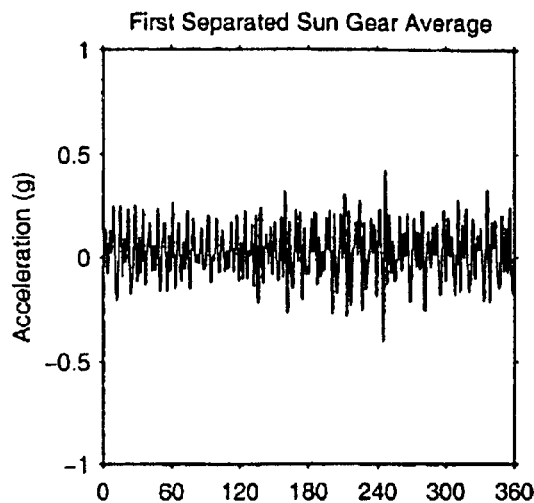
FIG. 4.6a
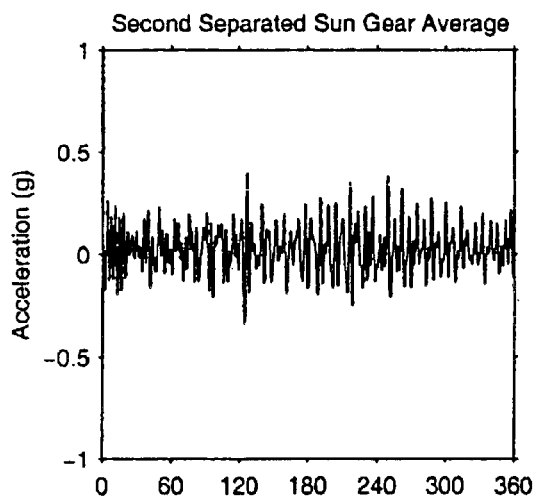
FIG. 4.6b
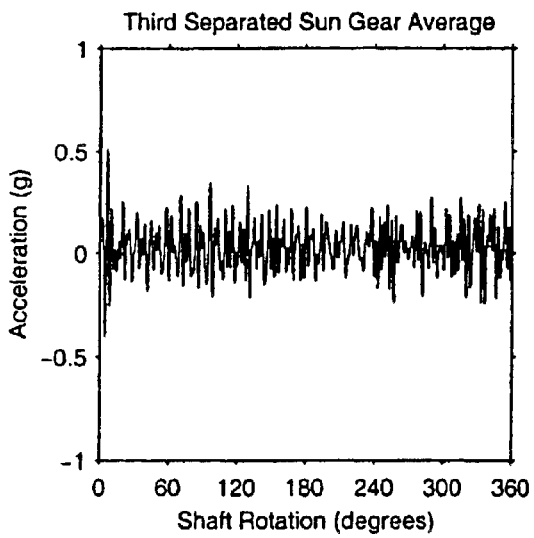
FIG. 4.6c

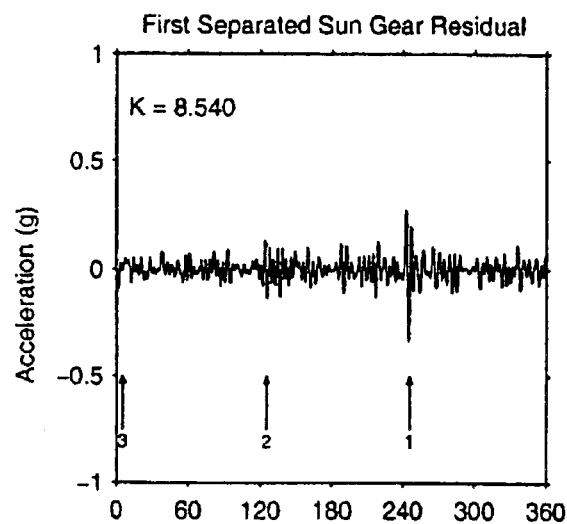
FIG. 4.6d
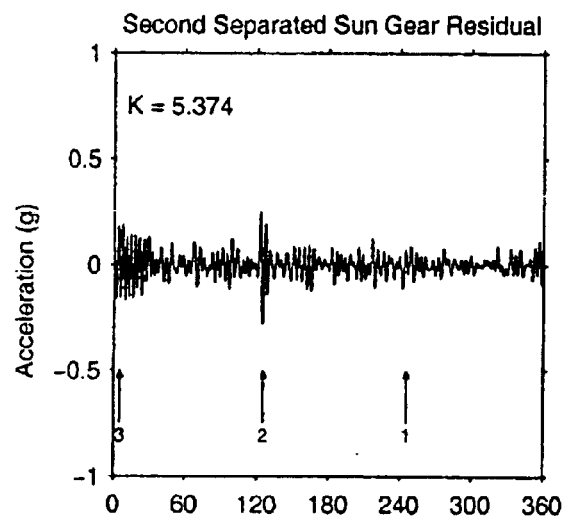
FIG. 4.6e
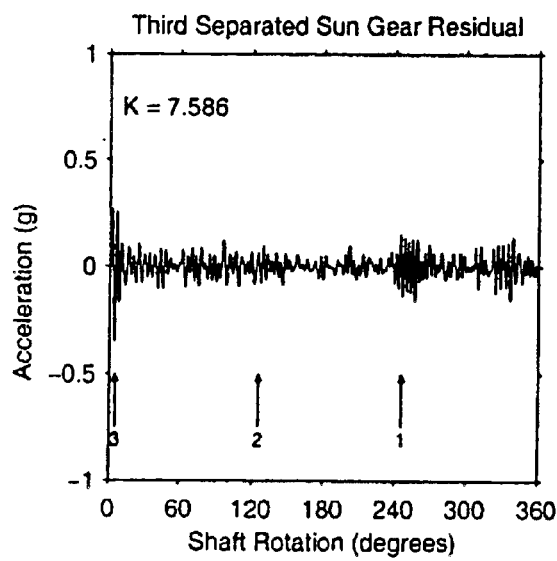
FIG. 4.6f

Sun gear separations (window = $w_{sum}(t)$) – fault.
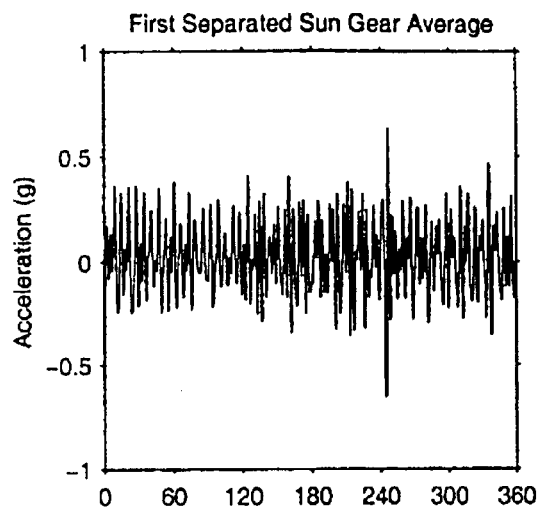
FIG. 4.7a
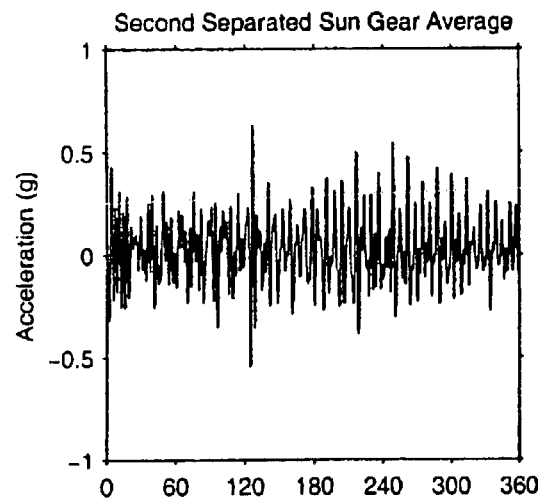
FIG. 4.7b
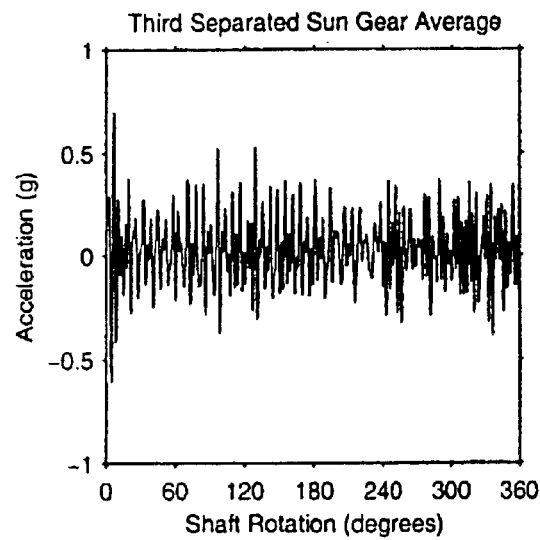
FIG. 4.7c

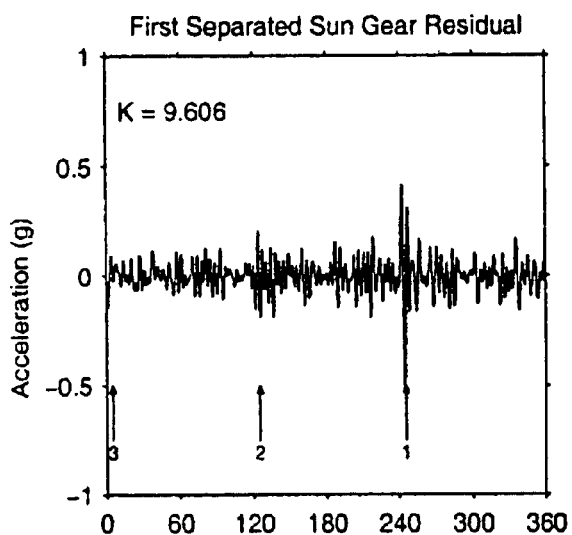
FIG. 4.7d
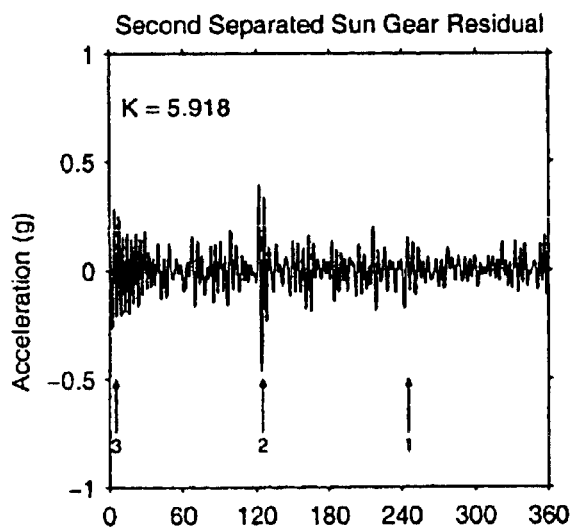
FIG. 4.7e
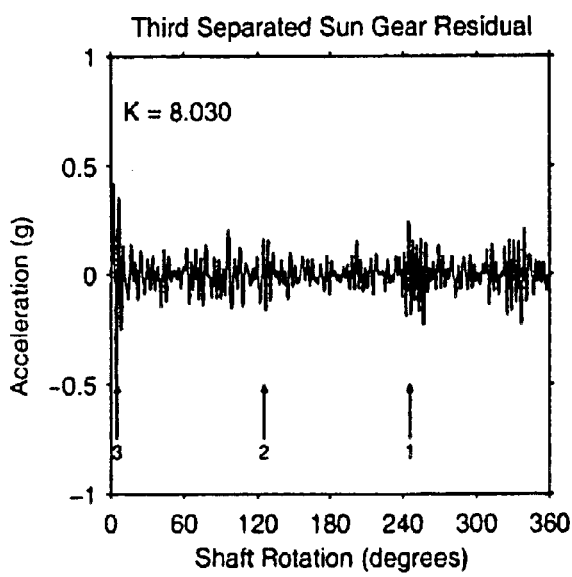
FIG. 4.7f

*Ordinary, combined & modified sun gear averages (window = $w_{power}(t)$) – fault.*
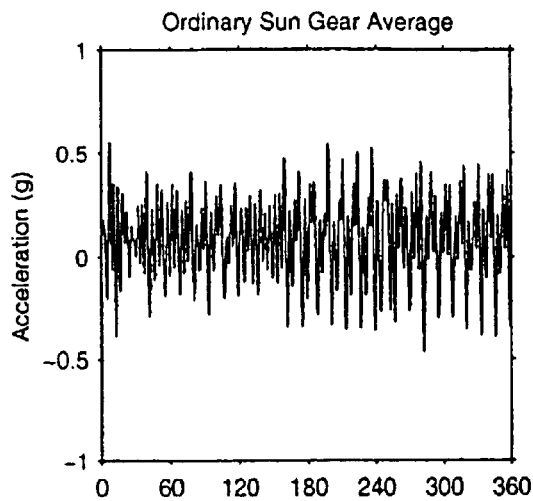
FIG. 4.8a
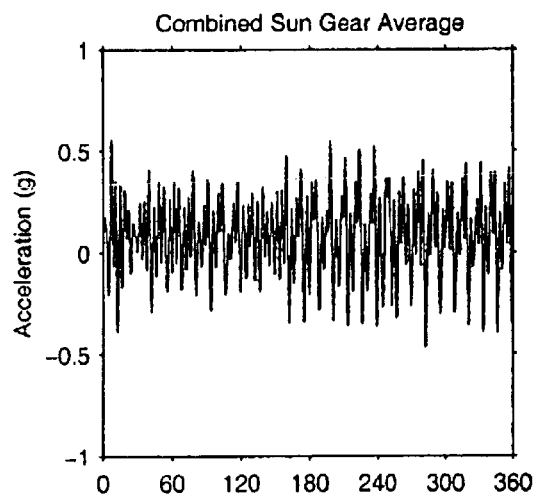
FIG. 4.8b
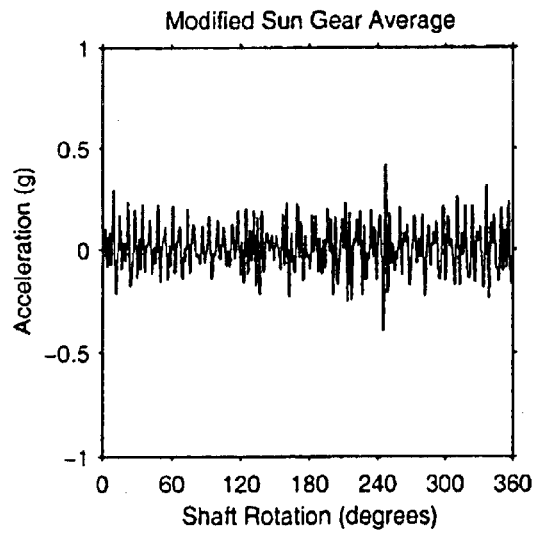
FIG. 4.8c

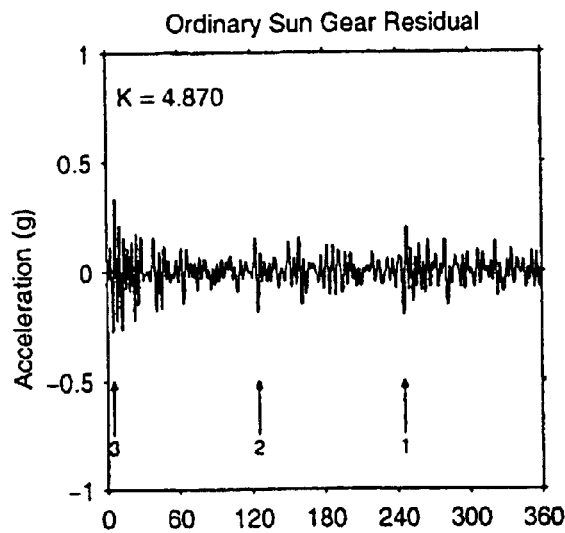
FIG. 4.8d
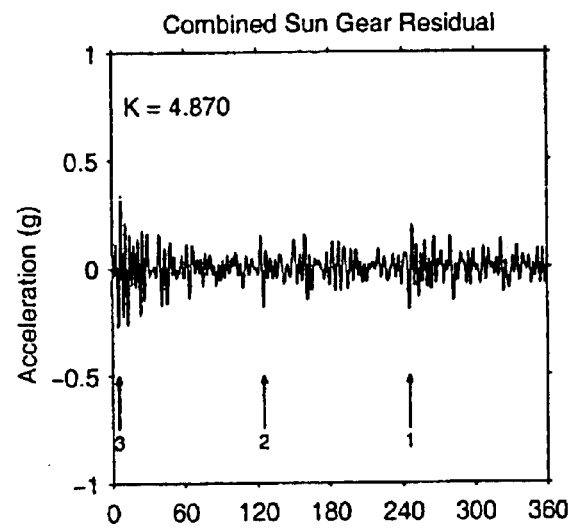
FIG. 4.8e
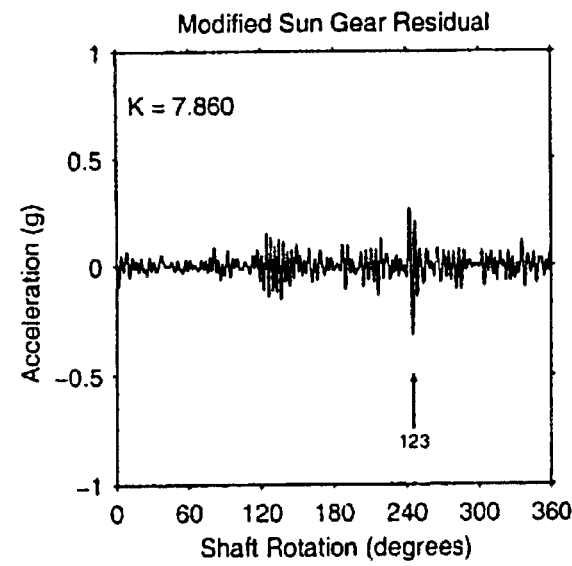
FIG. 4.8f

*Ordinary, combined & modified sun gear averages (window = $w_{sum}(t)$) – fault.*
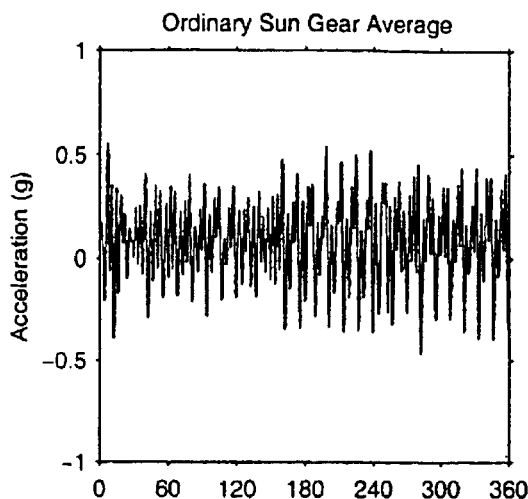
FIG. 4.9a
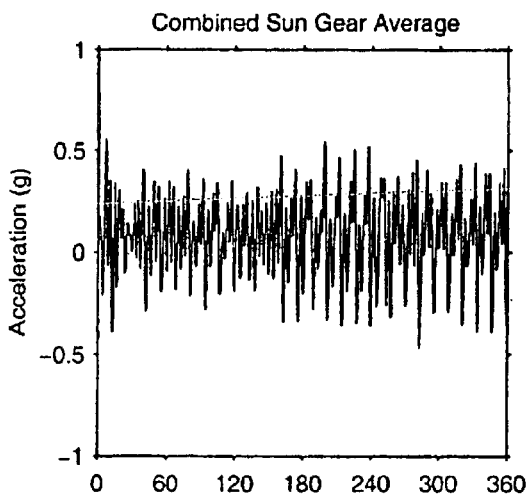
FIG. 4.9b
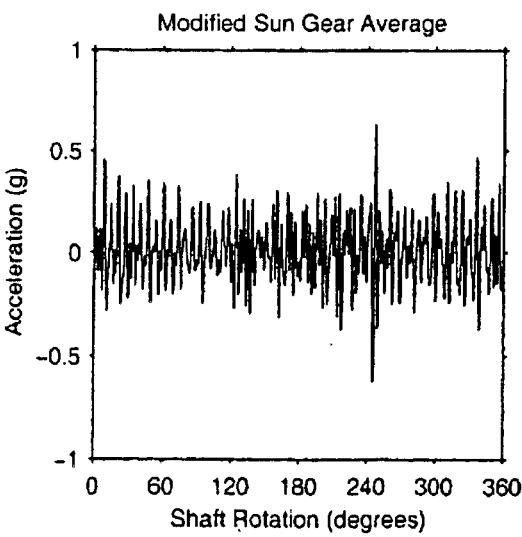
FIG. 4.9c

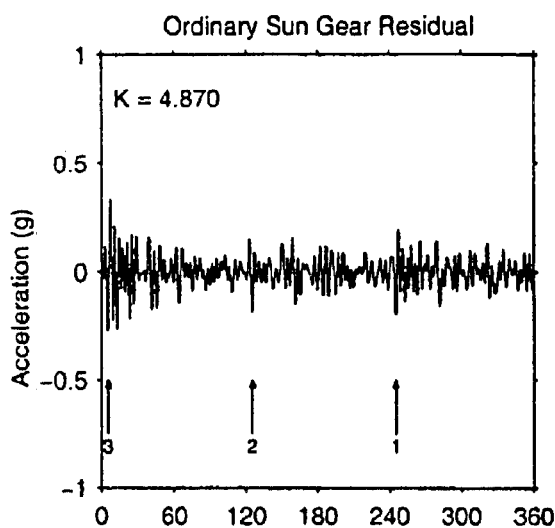
FIG. 4.9d
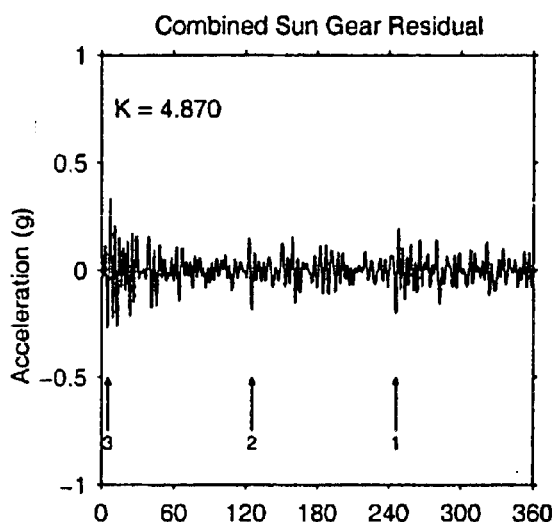
FIG. 4.9e
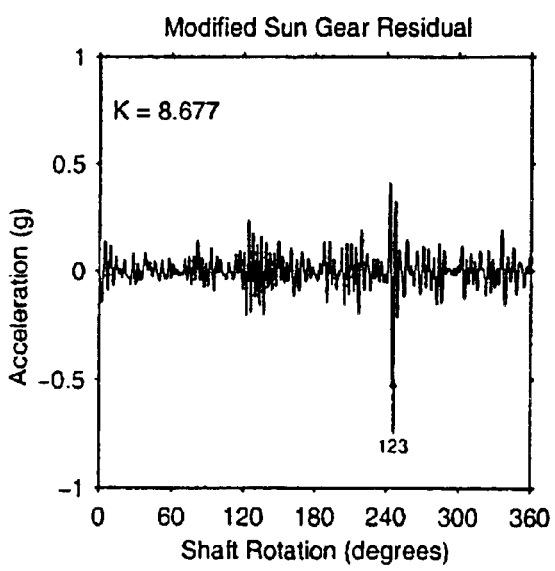
FIG. 4.9f

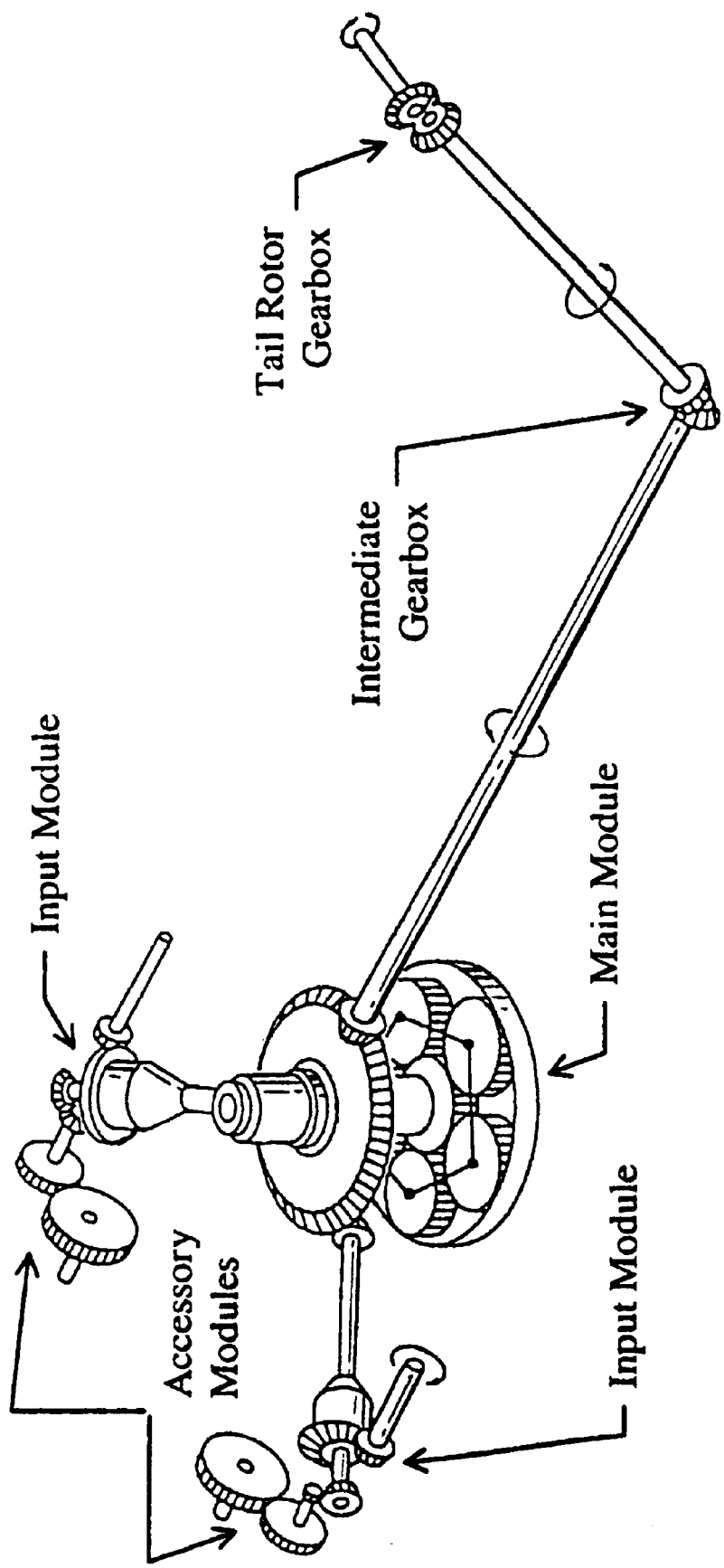

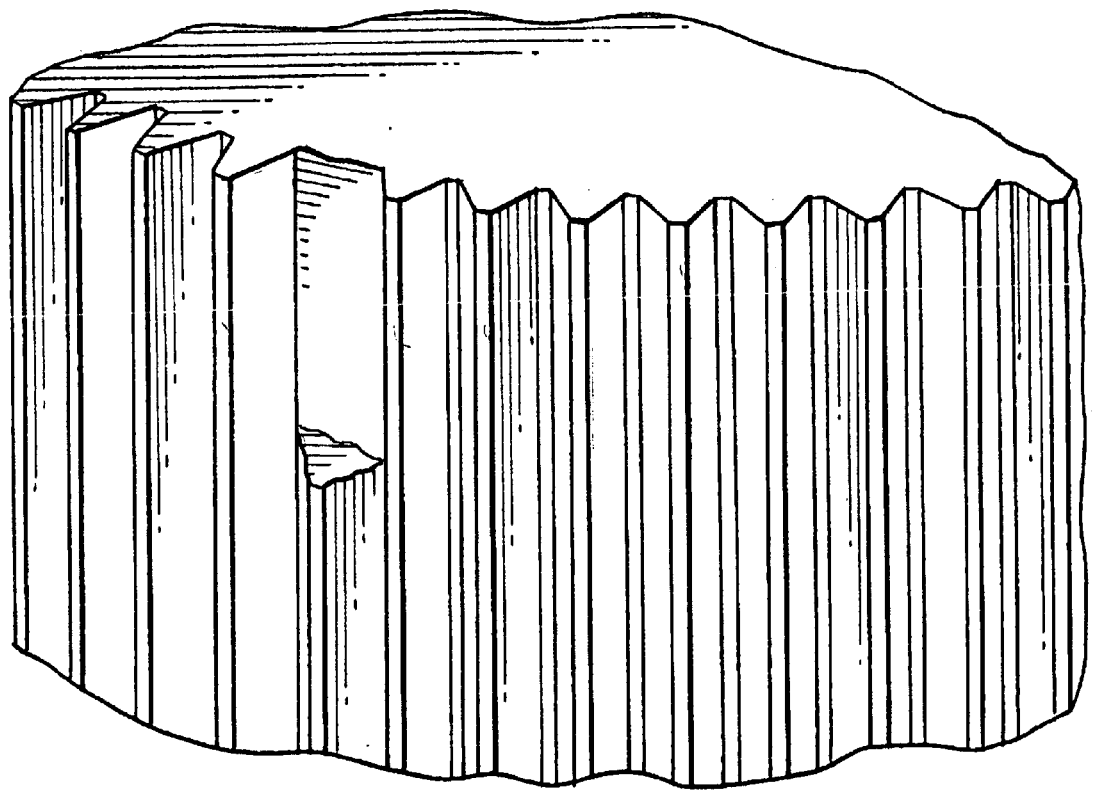
Fig. 4.11

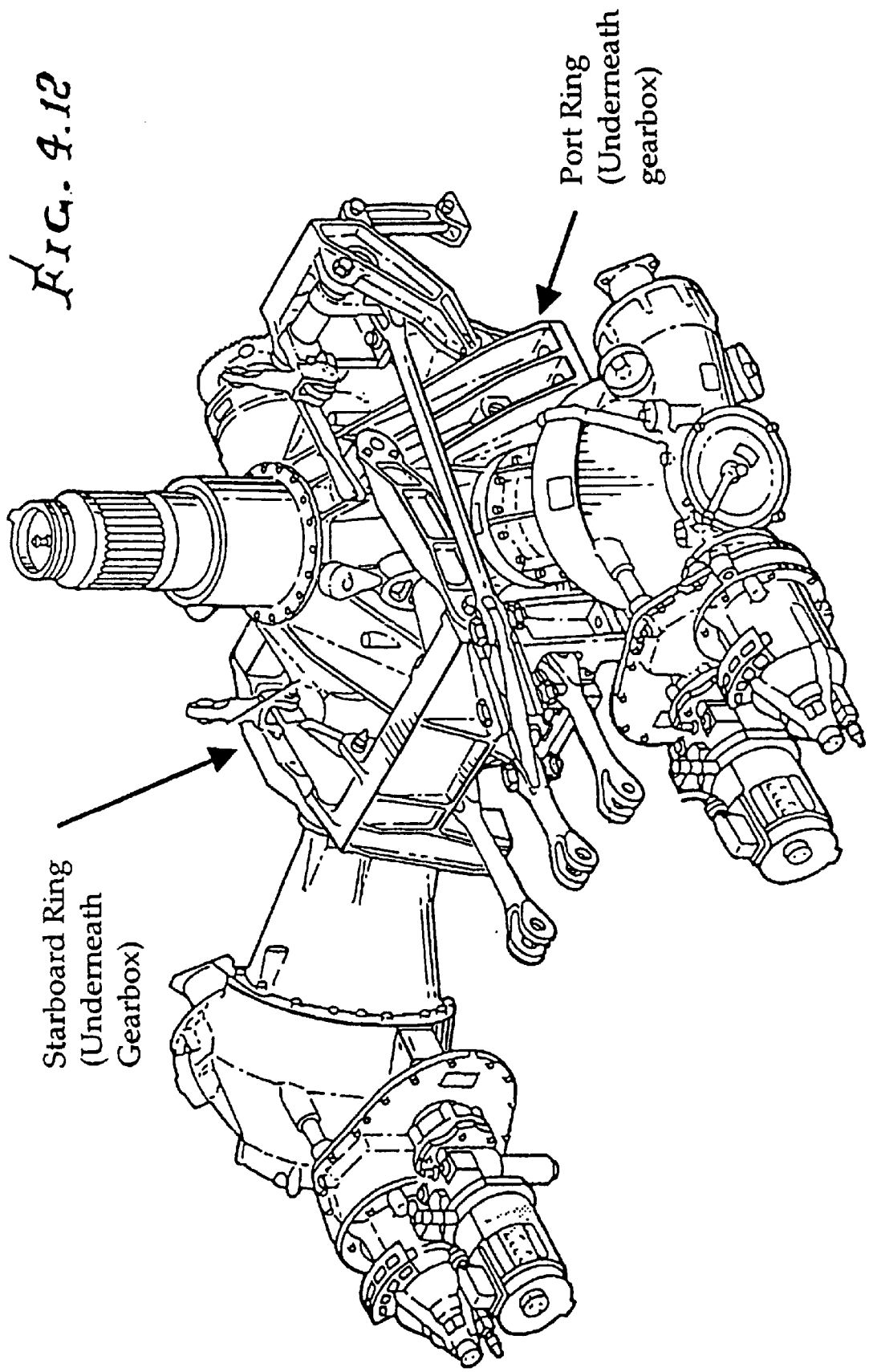
FIG. 4.12

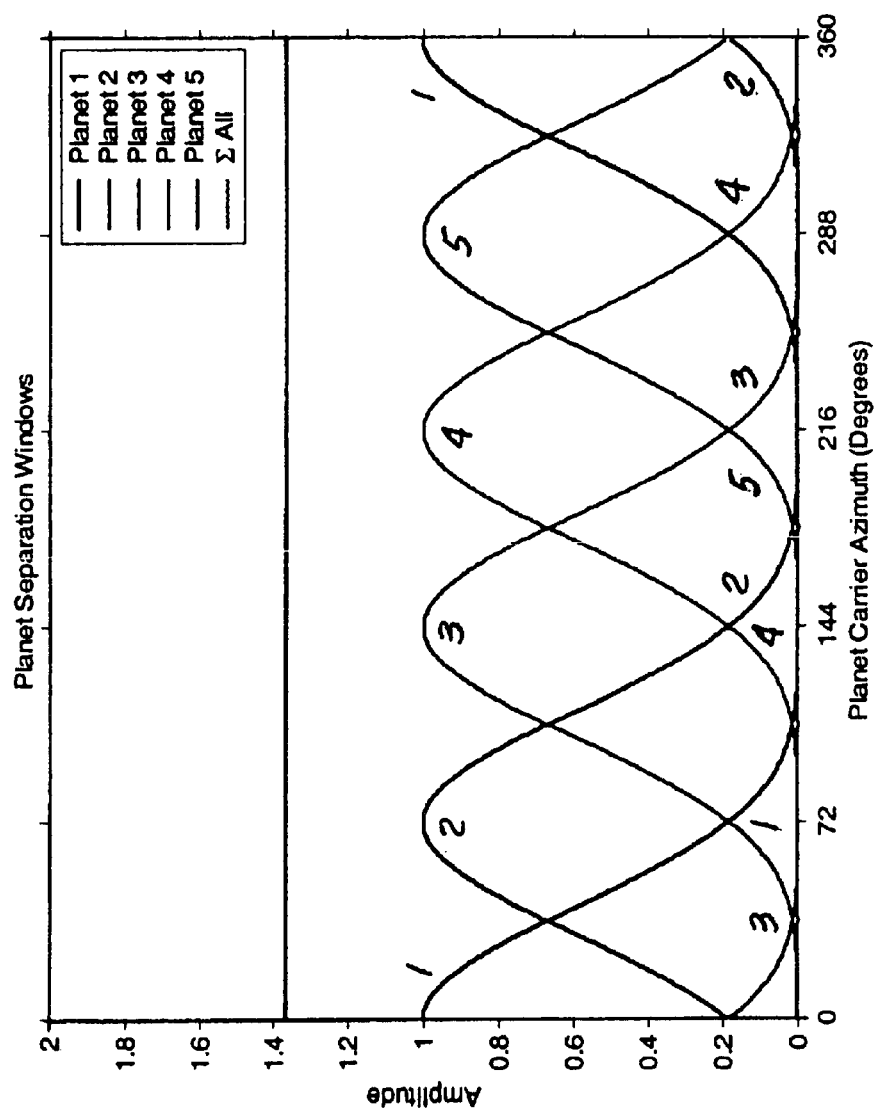
FIG. 9.13a

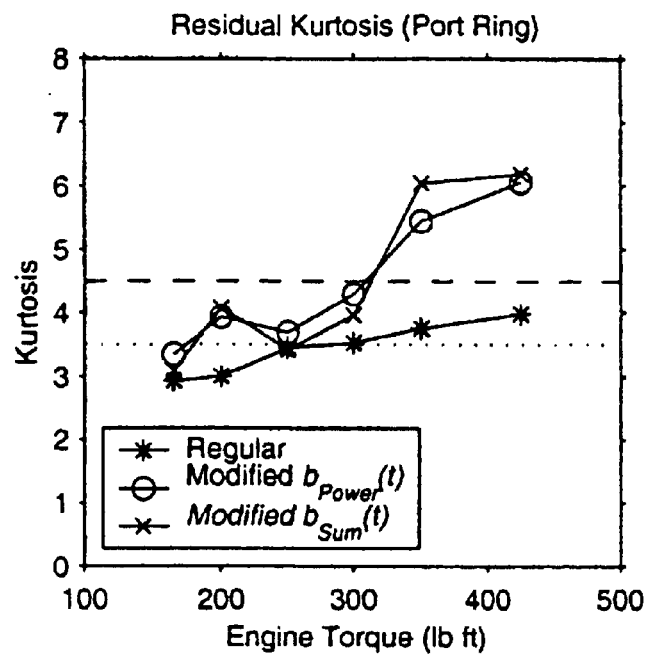
Fig. 4.14a
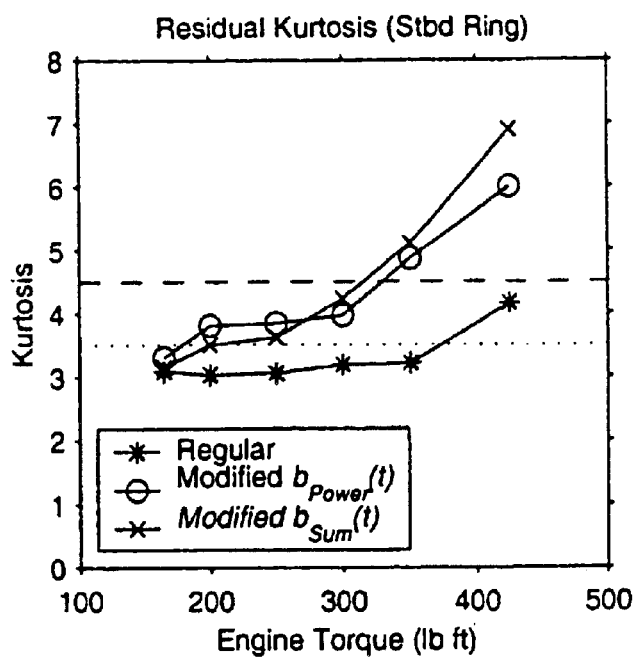
Fig. 4.14b

*Spectra of sun gear averages at 350 lb ft torque showing resonance band.*
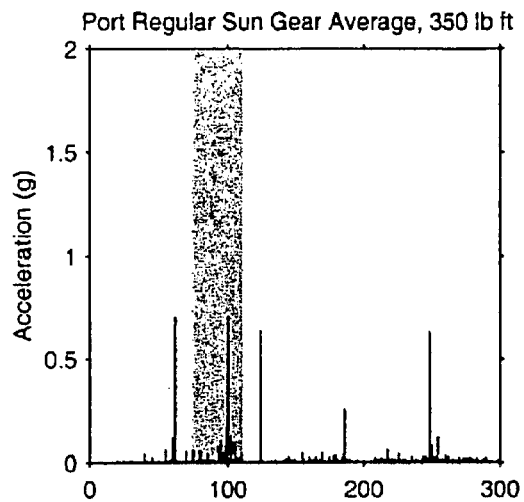
FIG. 4.15a
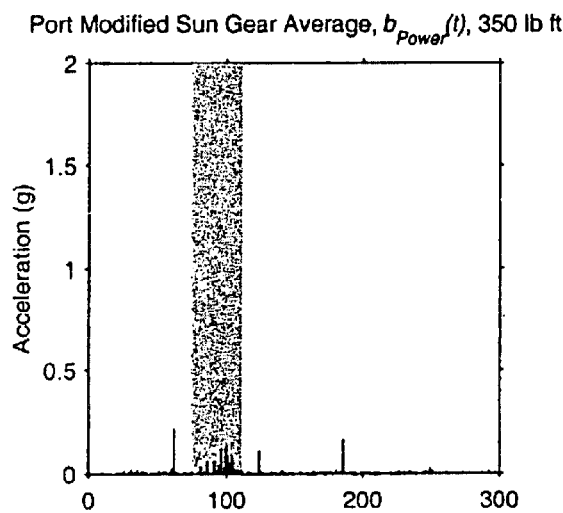
FIG. 4.15b
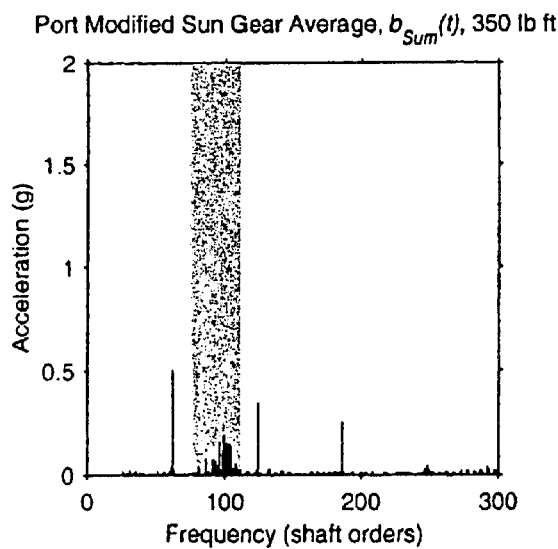
FIG. 4.15c

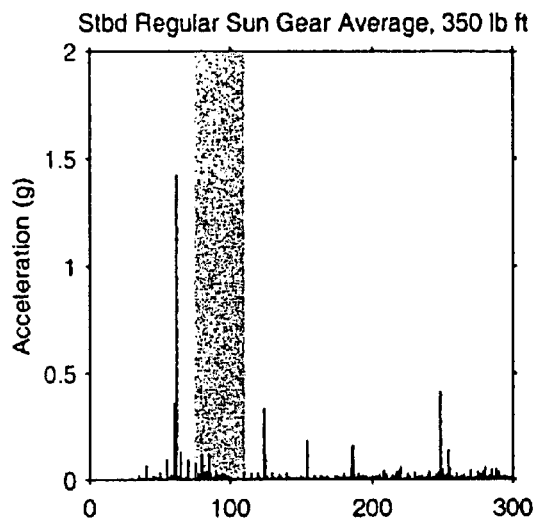
FIG. 4.15d
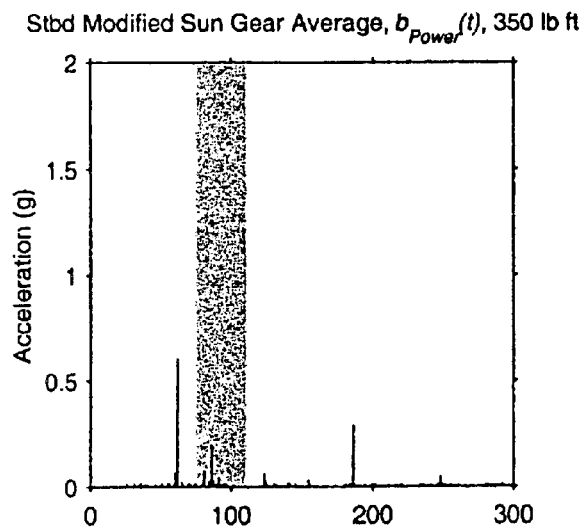
FIG. 4.15e
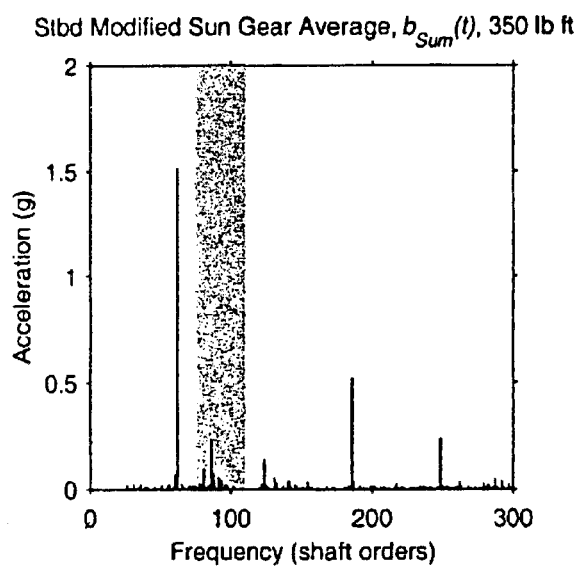
FIG. 4.15f

*Sun gear averages, 425 lb ft torque, port ring accelerometer.*
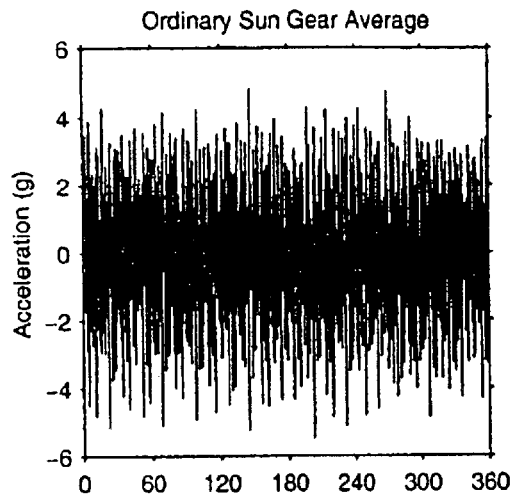
FIG. 4.16a
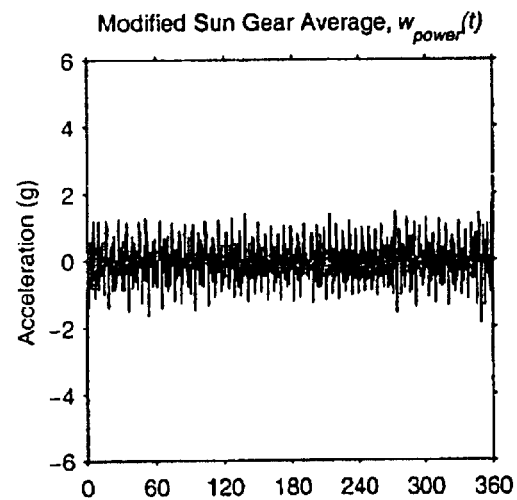
FIG. 4.16b
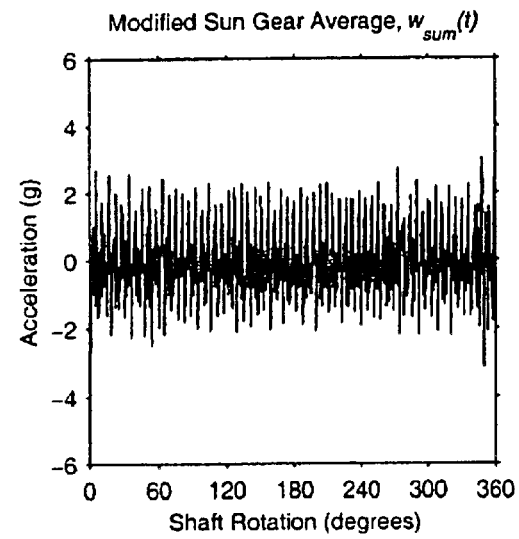
FIG. 4.16c

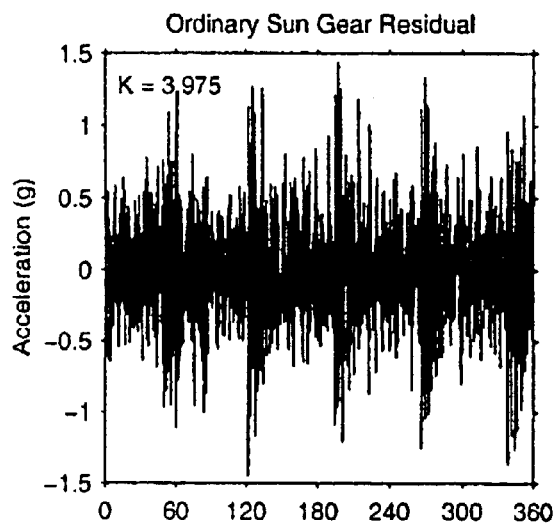
FIG. 4.16d
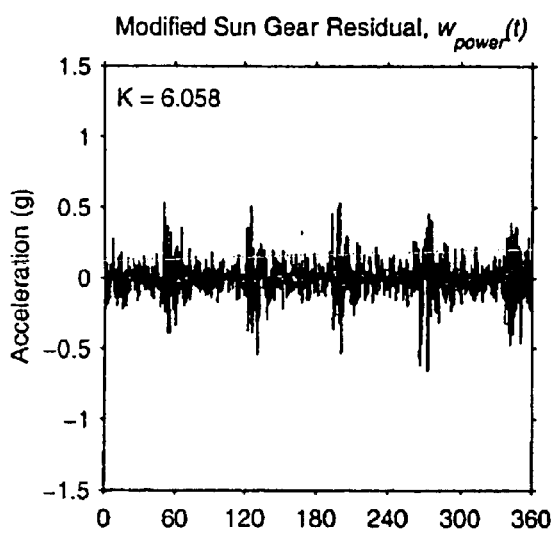
FIG. 4.16e
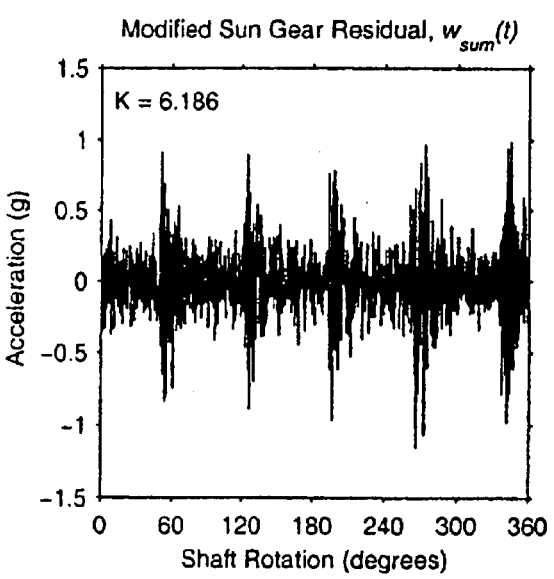
FIG. 4.16f

Sun gear averages, 425 lb ft torque, starboard ring accelerometer.
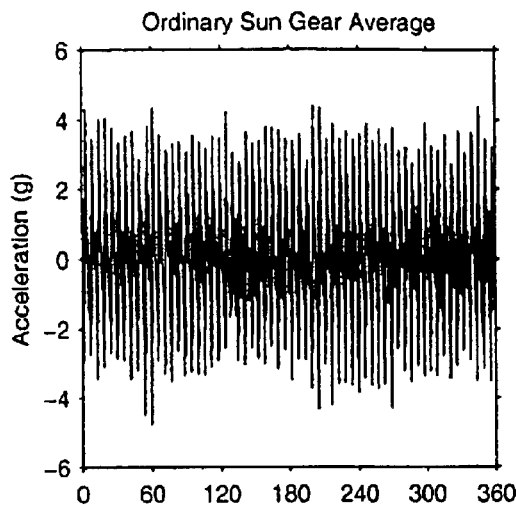
FIG. 4.17a
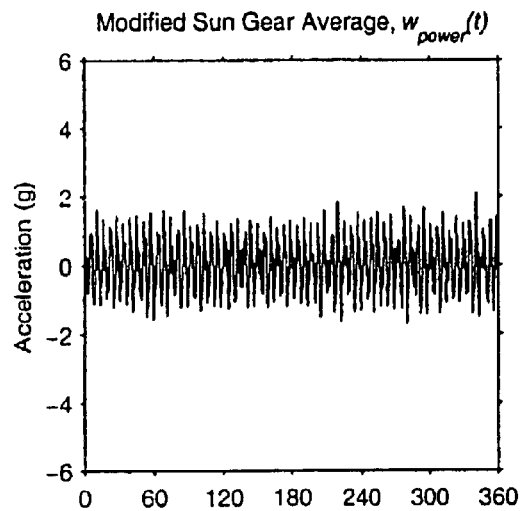
FIG. 4.17b
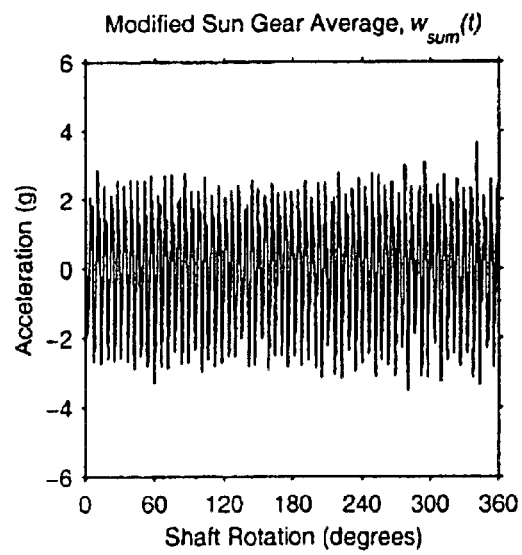
FIG. 4.17c

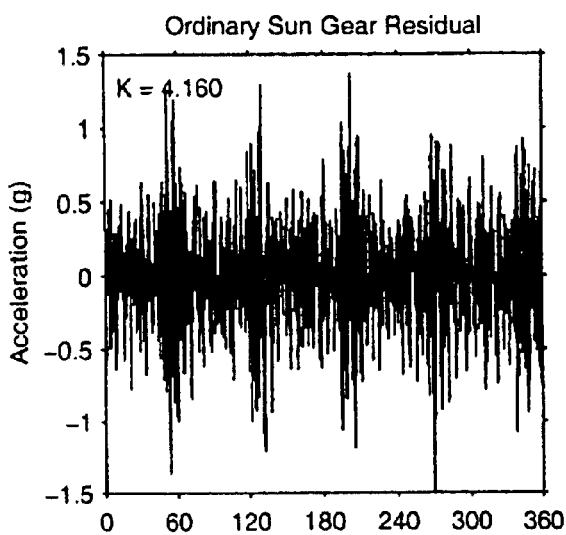
FIG. 4.17d
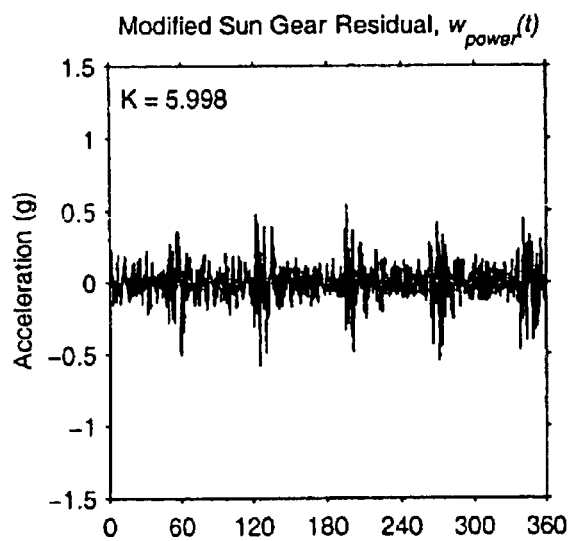
FIG. 4.17e
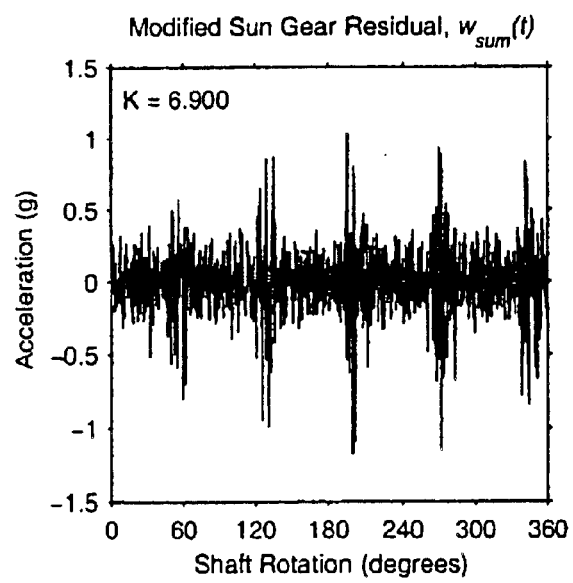
FIG. 4.17f

*Sun gear averages. 350 lb ft torque. port ring accelerometer.*
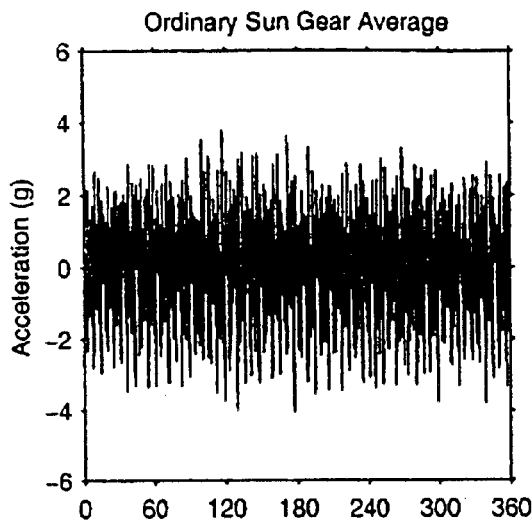
FIG. 4.18a
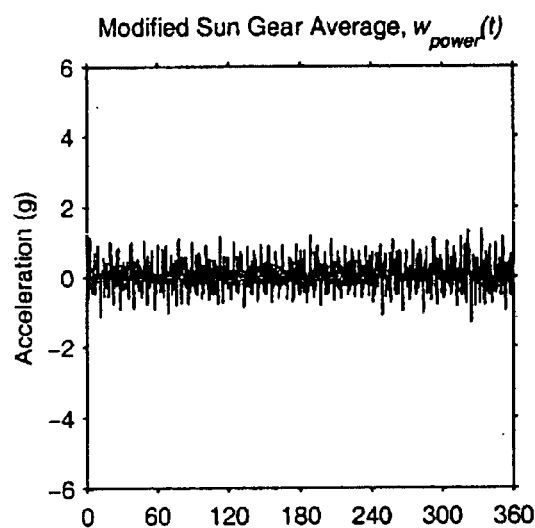
FIG. 4.18b
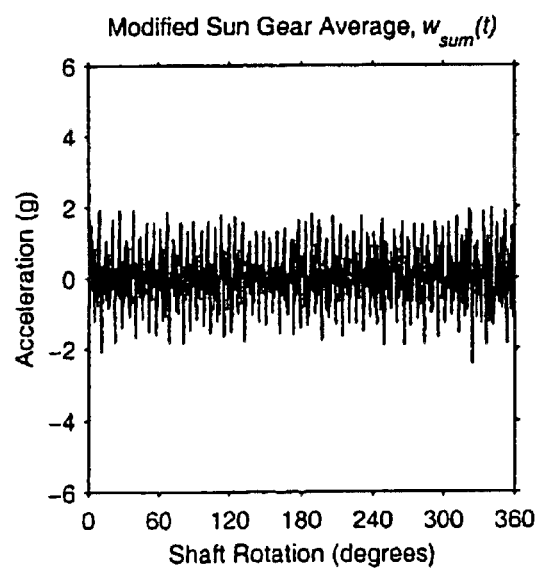
FIG. 4.18c

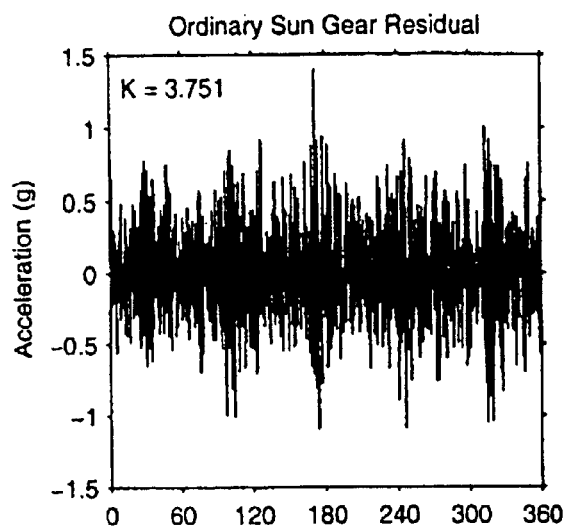
FIG. 4.18d
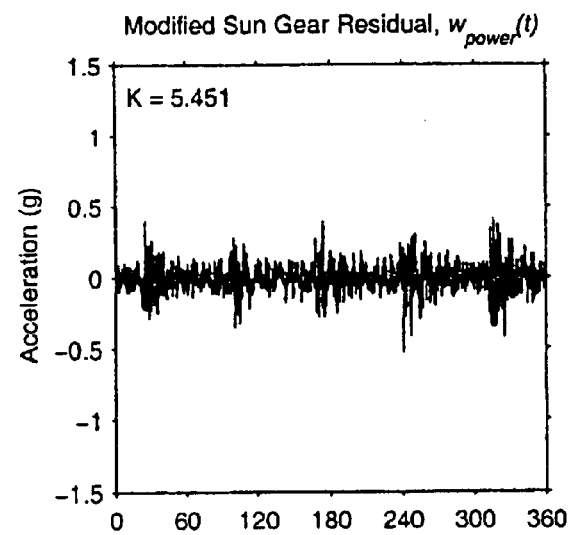
FIG. 4.18e
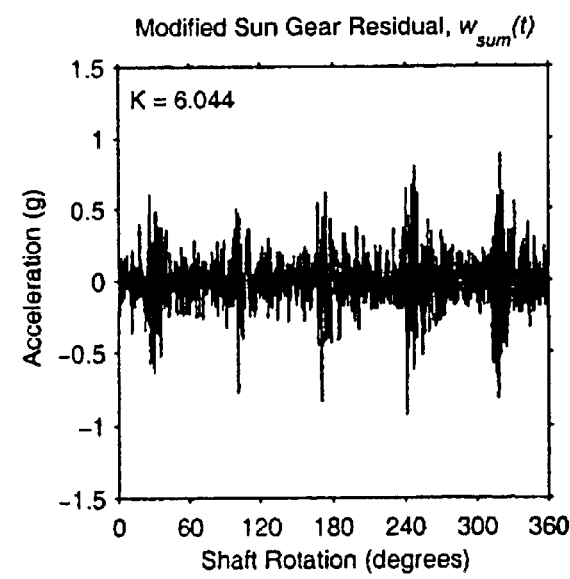
FIG. 4.18f

*Sun gear averages, 350 lb ft torque, starboard ring accelerometer.*
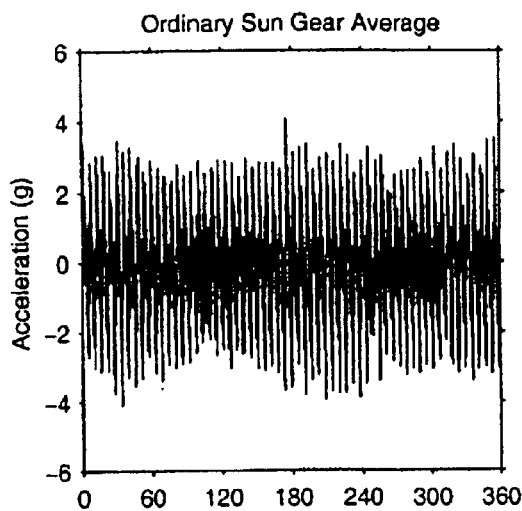
FIG. 4.19a
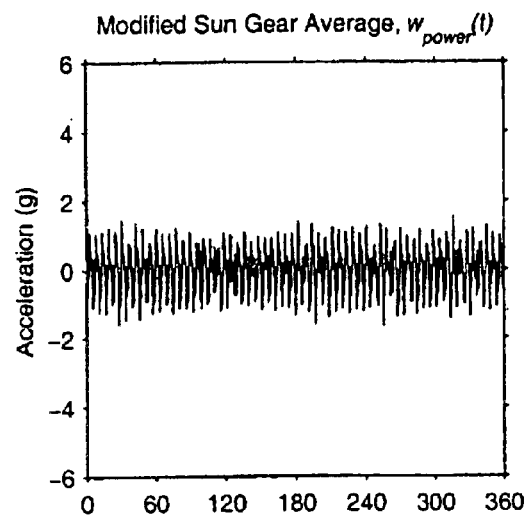
FIG. 4.19b
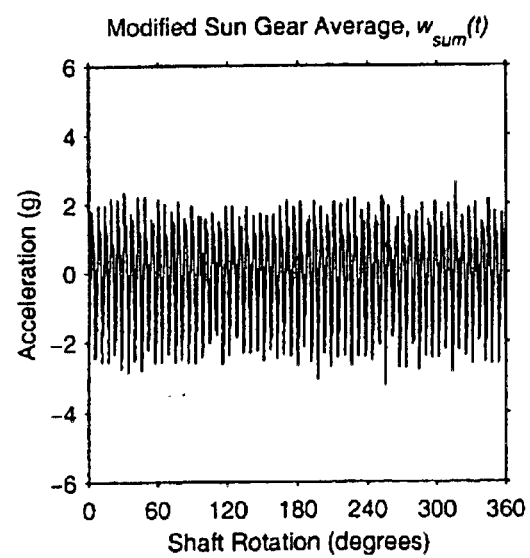
FIG. 4.19c

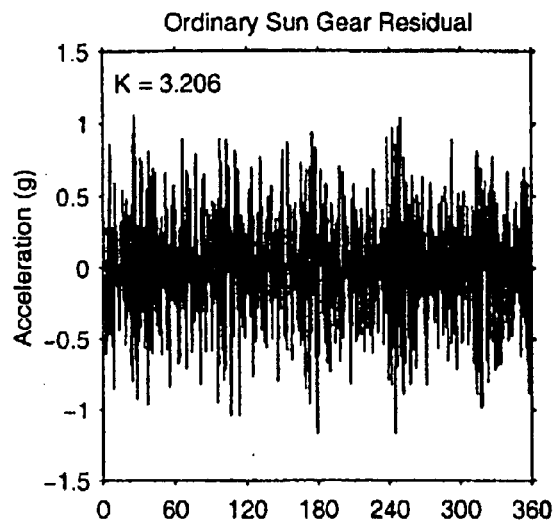
FIG. 4.19d
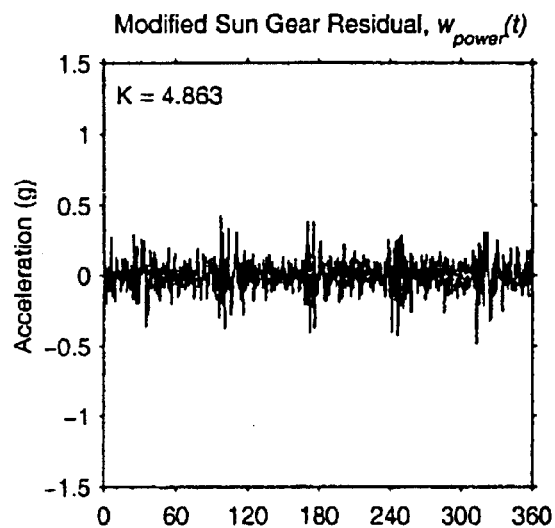
FIG. 4.19e
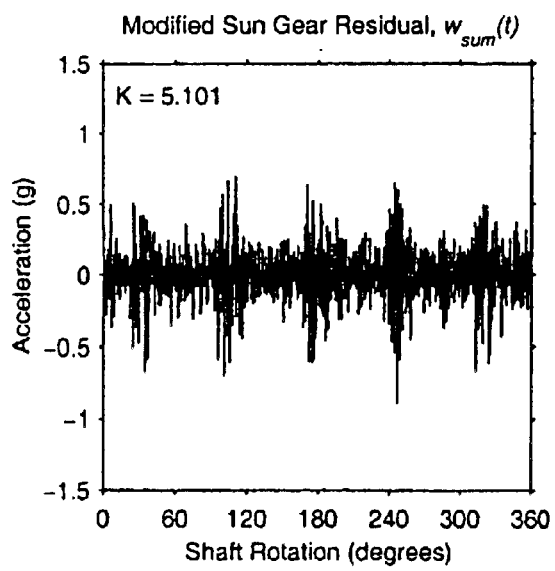
FIG. 4.19f

Sun gear averages, 300 lb ft torque, port ring accelerometer.
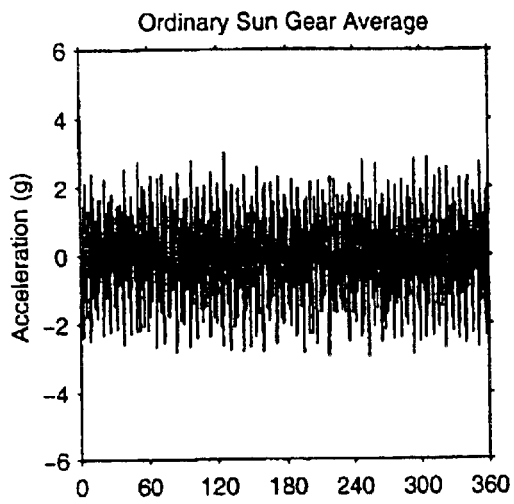
FIG. 4.20a
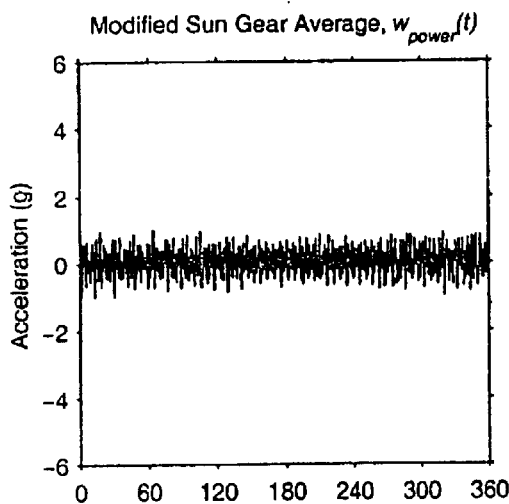
FIG. 4.20b
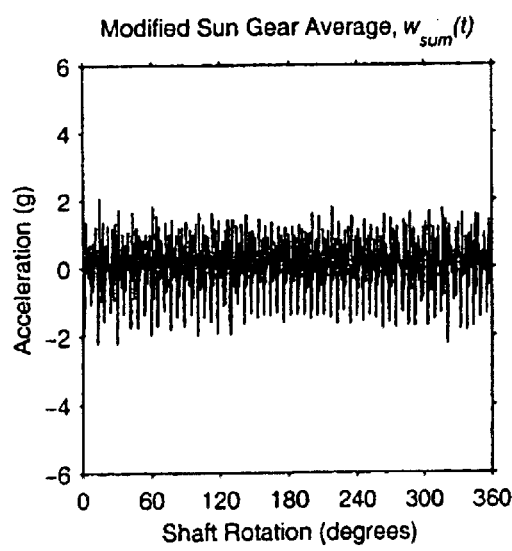
FIG. 4.20c

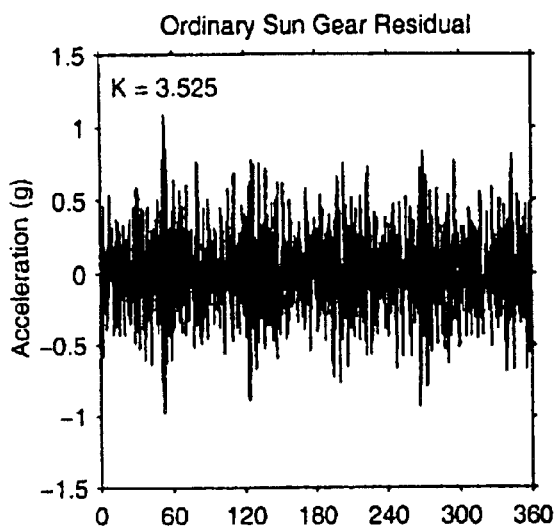
FIG. 4.20d
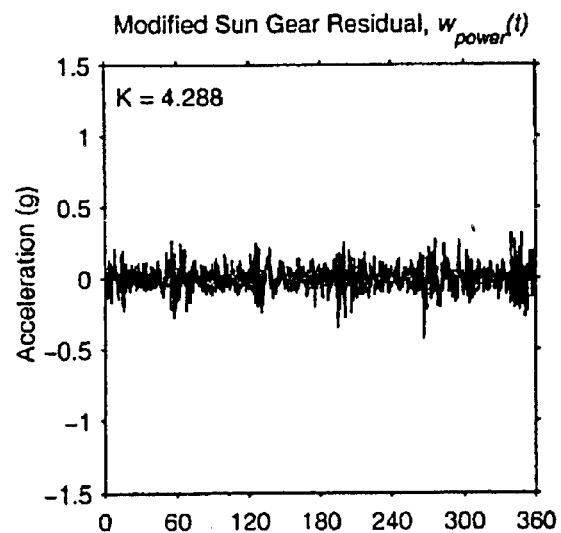
FIG. 4.20e
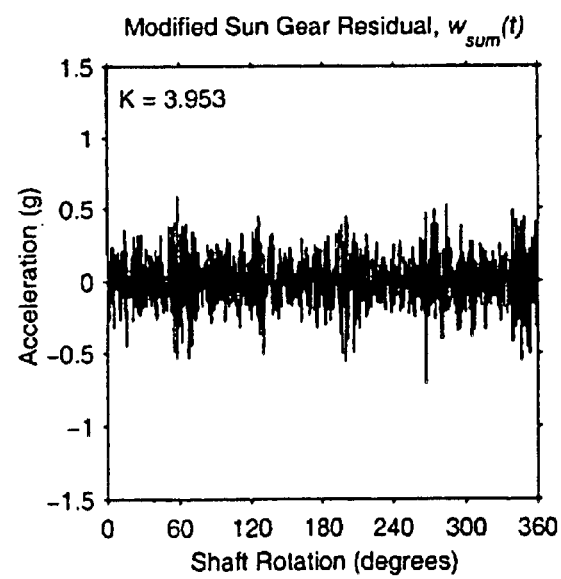
FIG. 4.20f

Sun gear averages, 300 lb ft torque, starboard ring accelerometer.
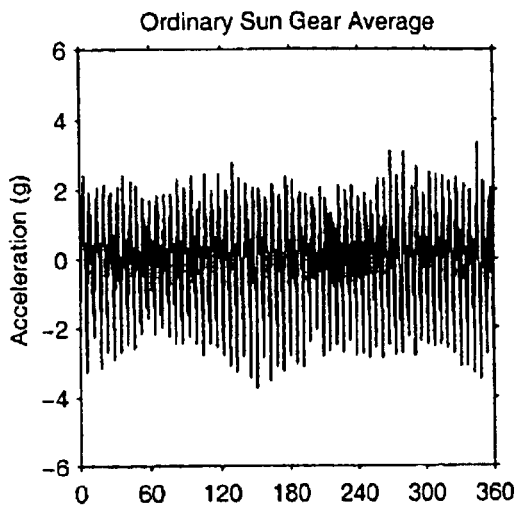
FIG. 4.21a
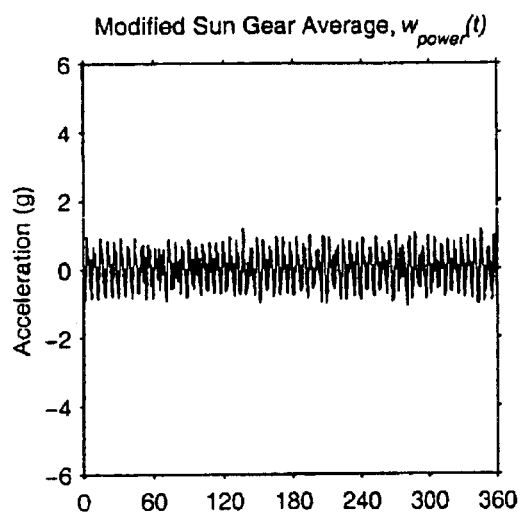
FIG. 4.21b
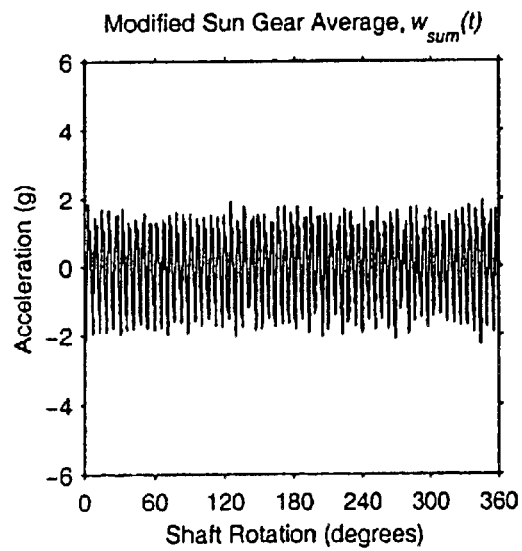
FIG. 4.21c

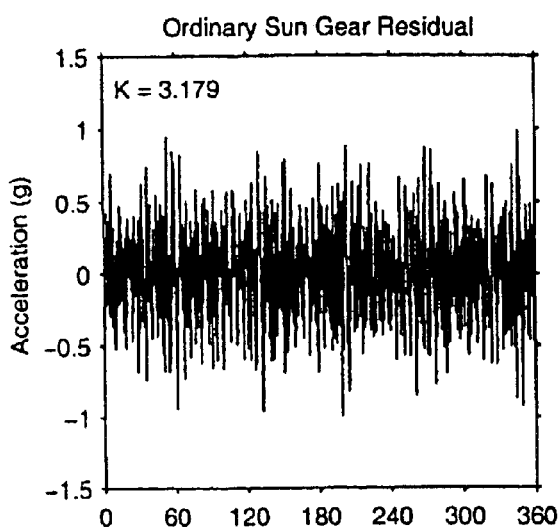
FIG. 4.21d
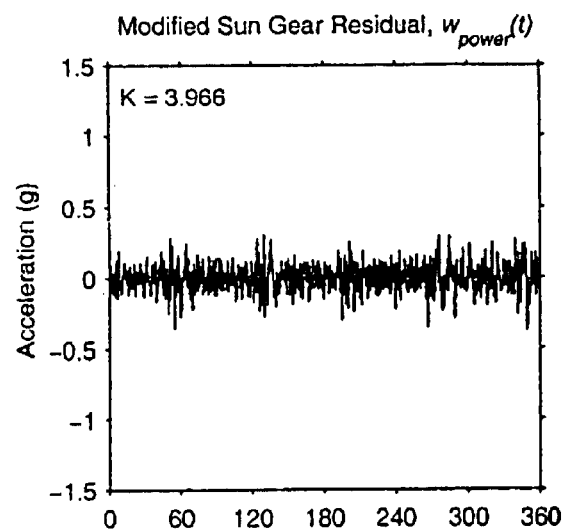
FIG. 4.21e
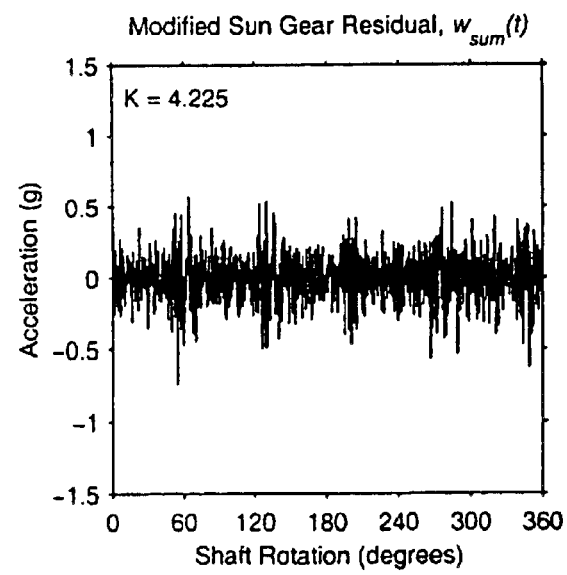
FIG. 4.21f

*Sun gear averages, 250 lb ft torque, port ring accelerometer.*
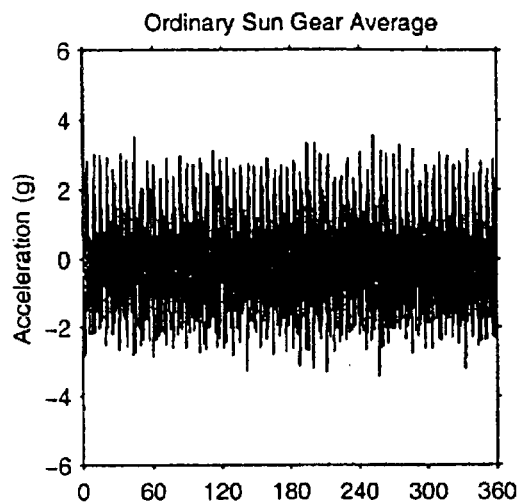
FIG.4.22a
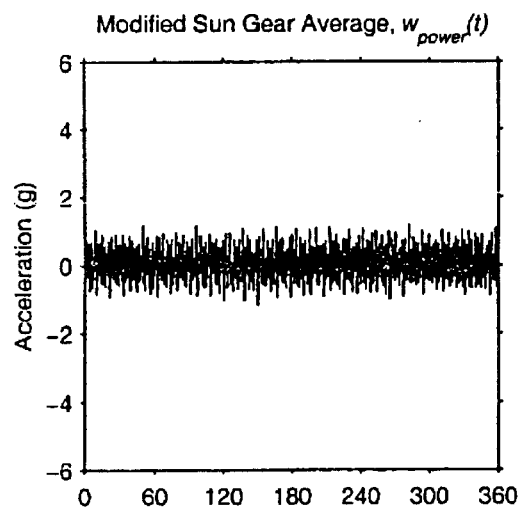
FIG.4.22b
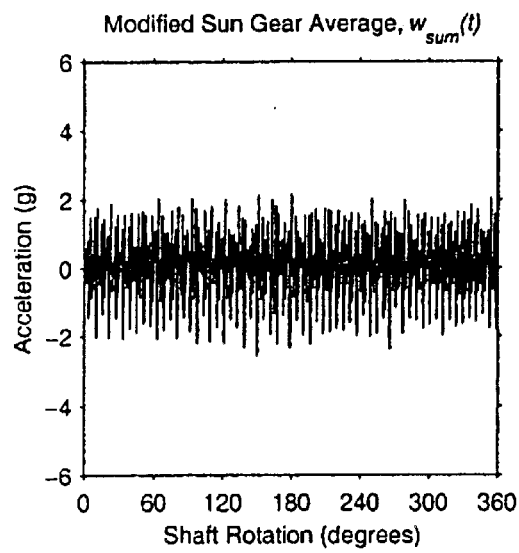
FIG.4.22c

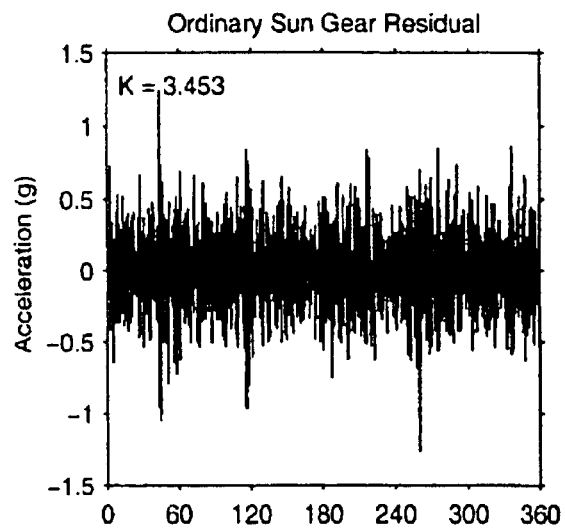
FIG. 4.22d
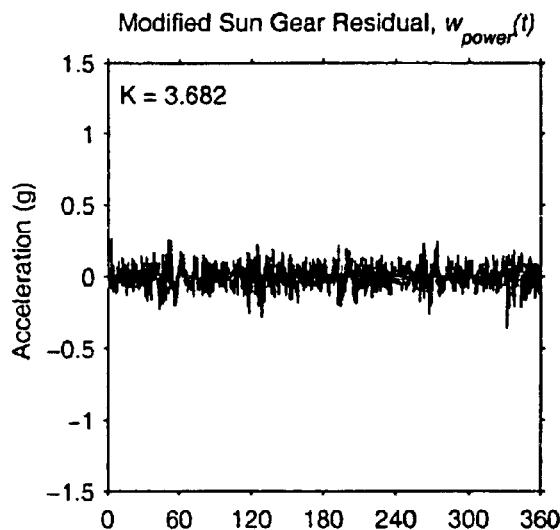
FIG. 4.22e
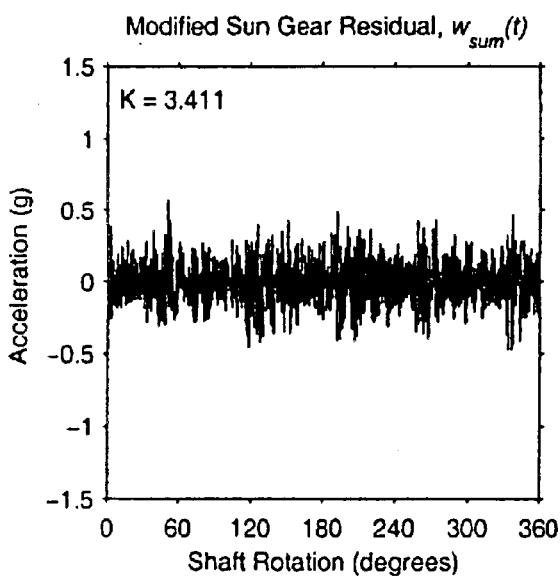
FIG. 4.22f

*Sun gear averages, 250 lb ft torque, starboard ring accelerometer.*
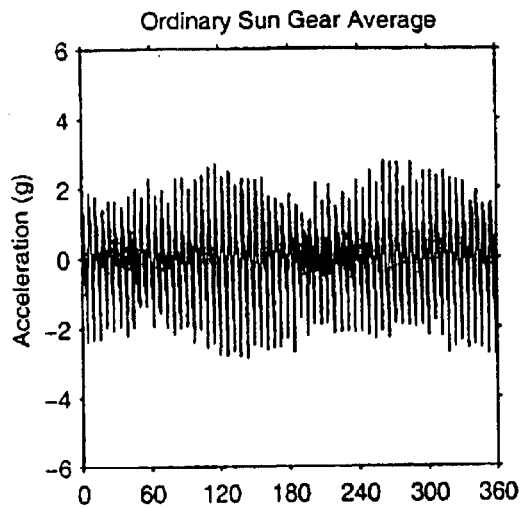
FIG. 4.23a
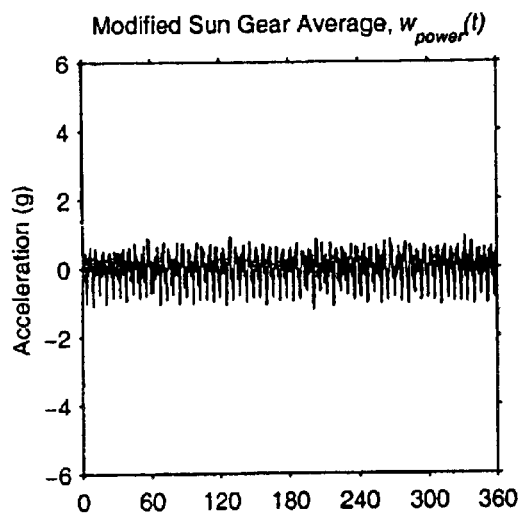
FIG. 4.23b
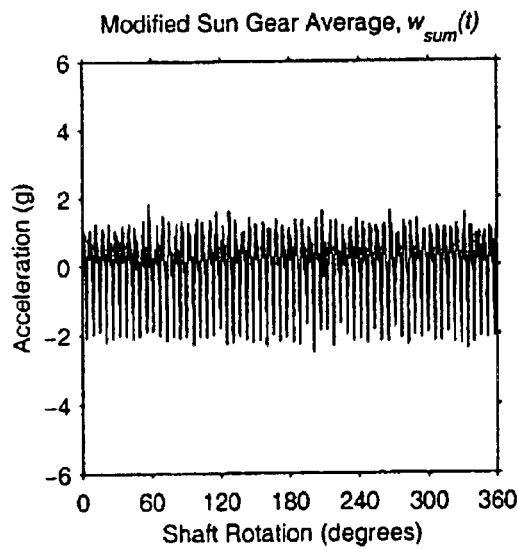
FIG. 4.23c

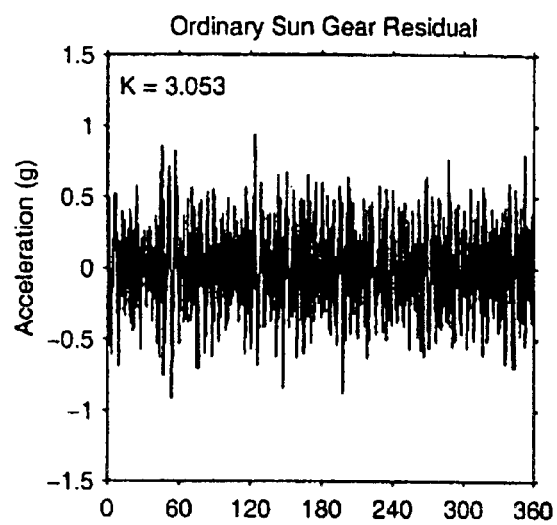
FIG. 4.23d
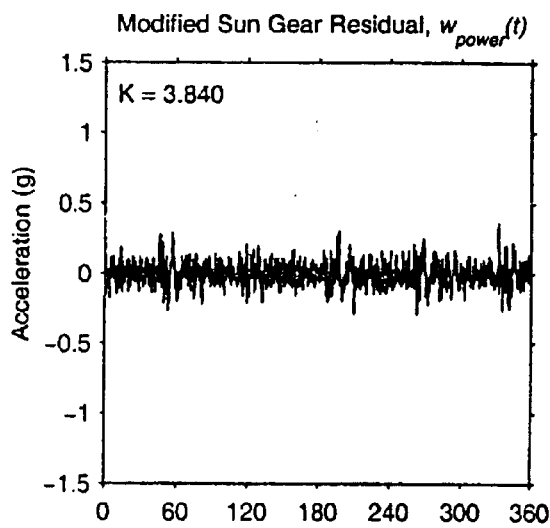
FIG. 4.23e
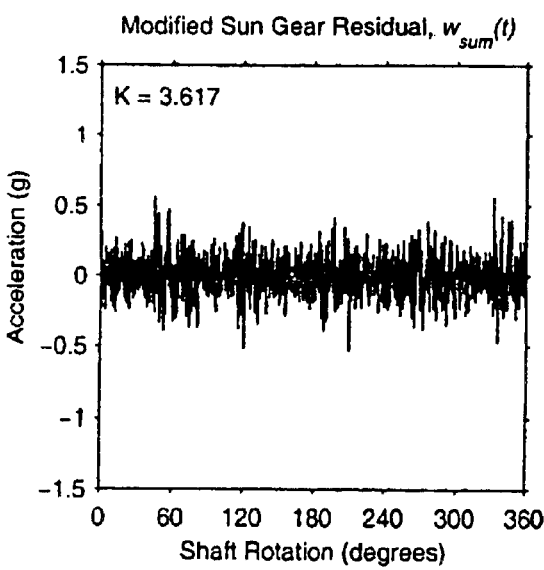
FIG. 4.23f

*Sun gear averages. 200 lb ft torque, port ring accelerometer.*
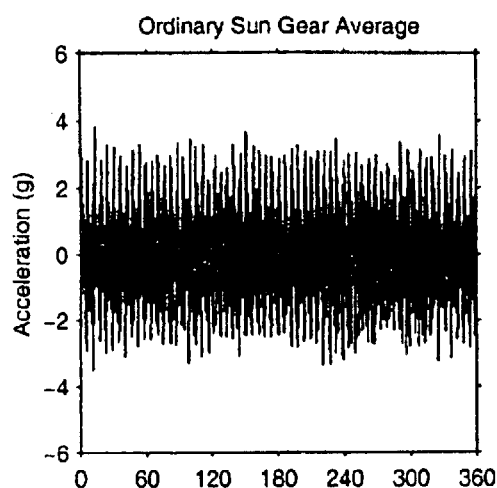
FIG. 4.24a
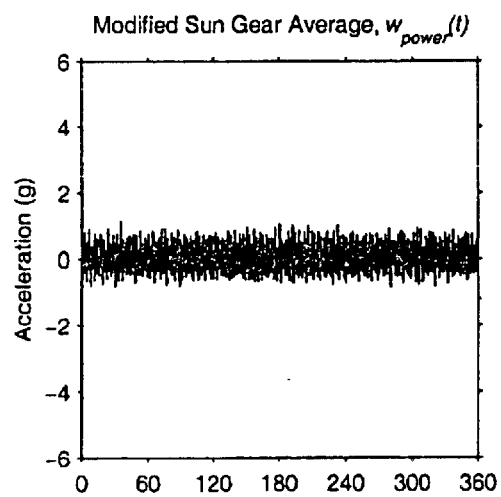
FIG. 4.24b
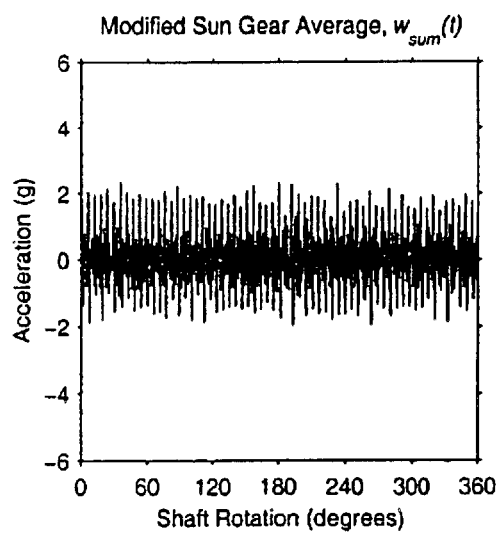
FIG. 4.24c

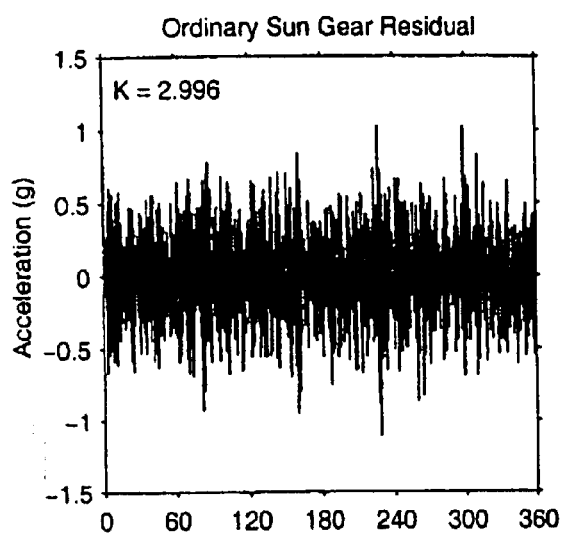
FIG. 4.24d
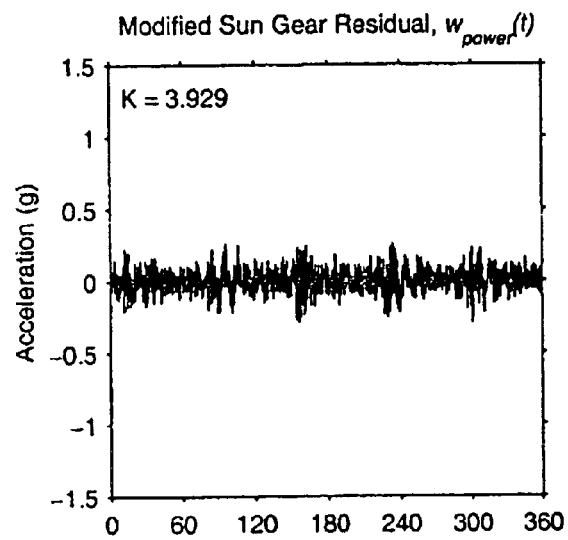
FIG. 4.24e
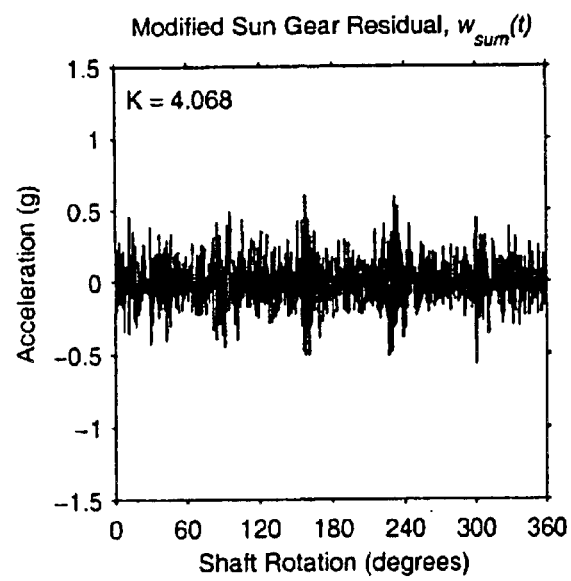
FIG. 4.24f

*Sun gear averages, 200 lb ft torque, starboard ring accelerometer.*
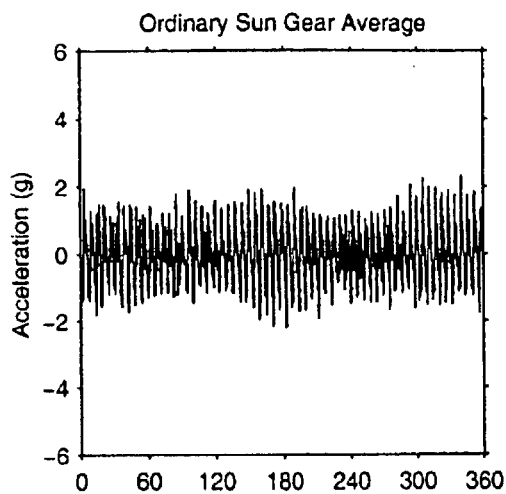
FIG. 4.25a
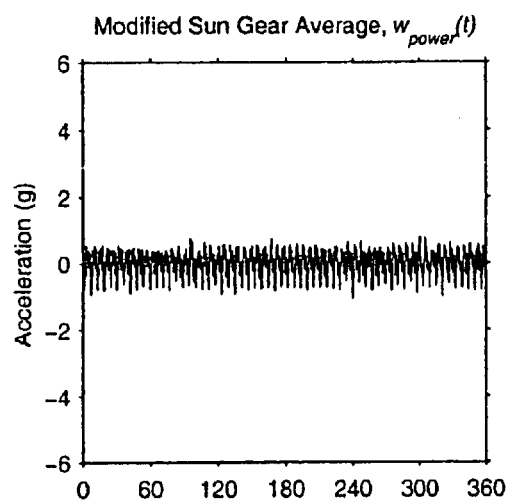
FIG. 4.25b
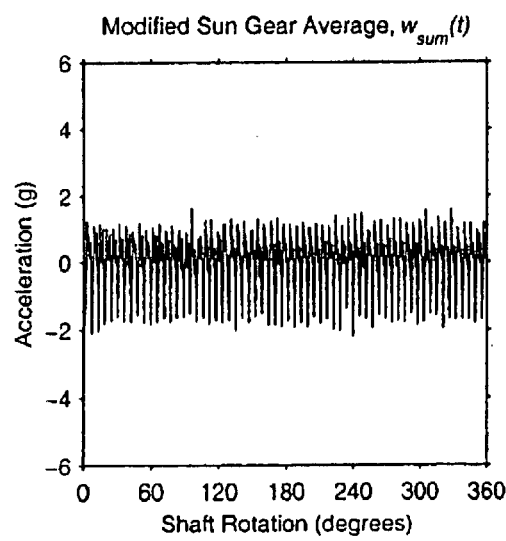
FIG. 4.25c

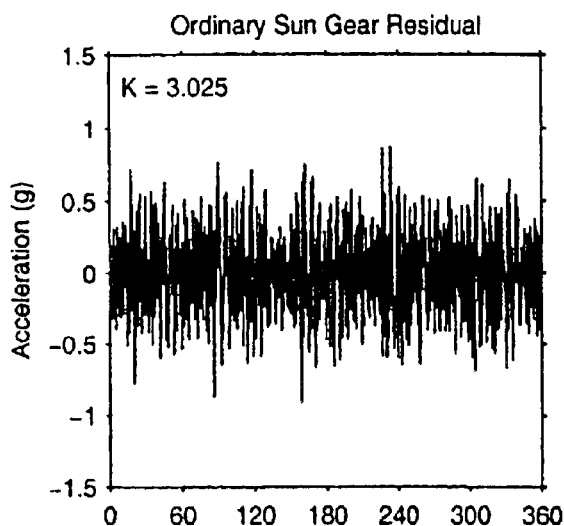
FIG.4.25d
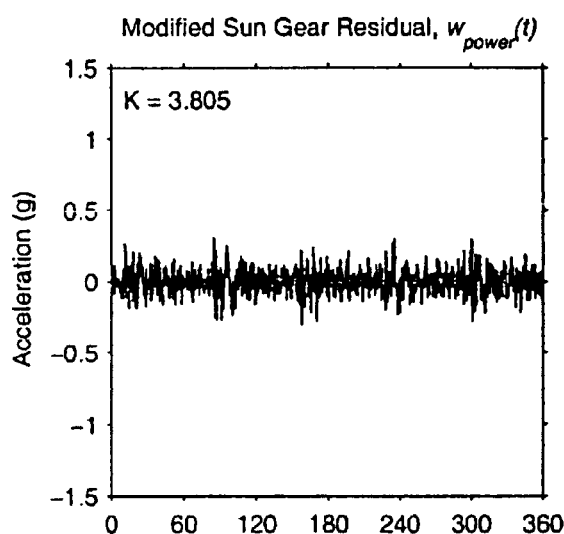
FIG.4.25e
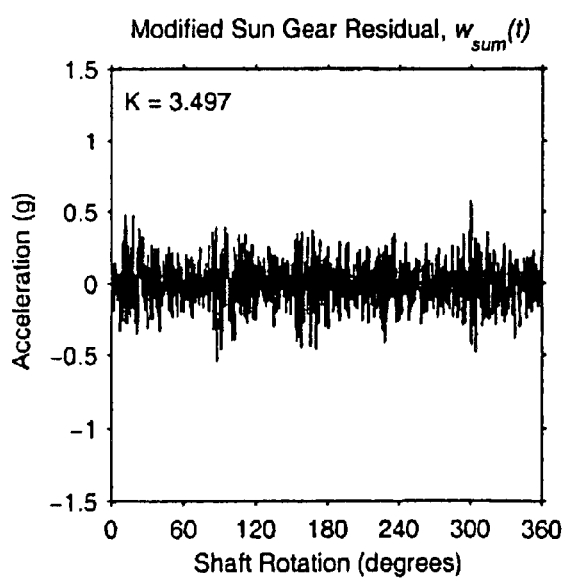
FIG.4.25f

Sun gear averages, 165 lb ft torque, port ring accelerometer.
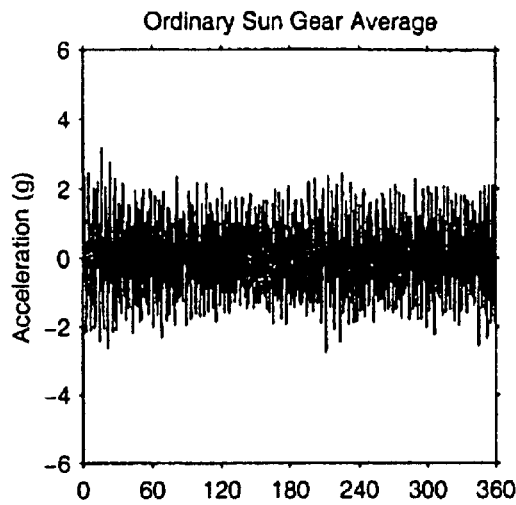
FIG. 4.26a
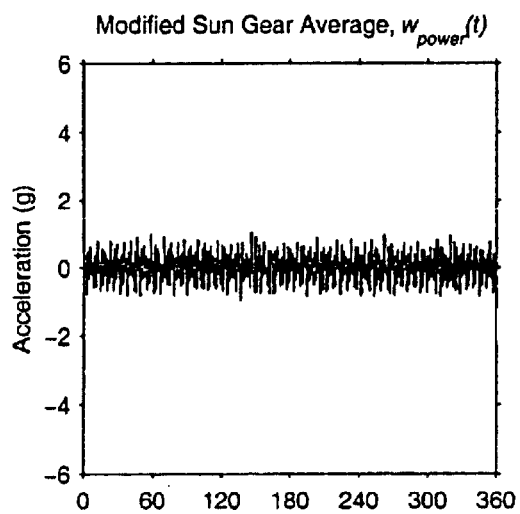
FIG. 4.26b
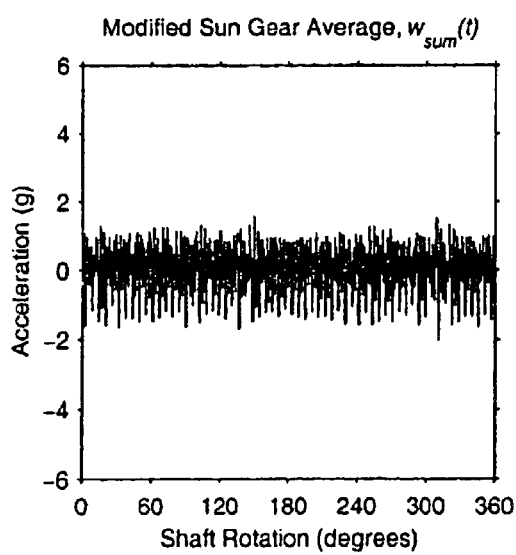
FIG. 4.26c

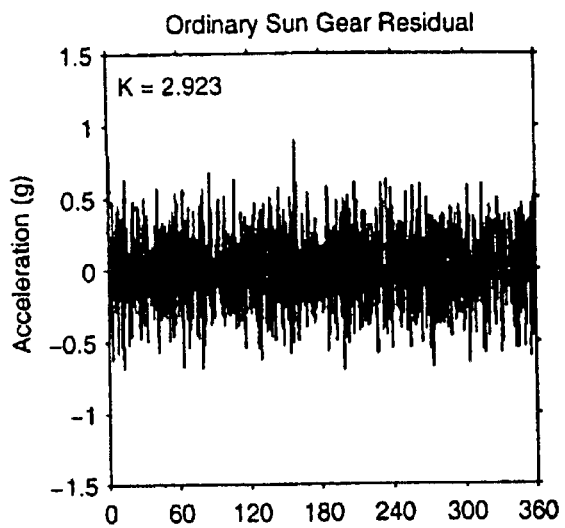
FIG. 4.26d
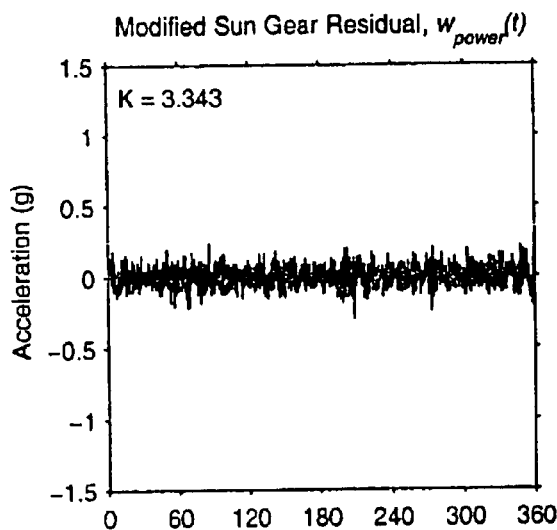
FIG. 4.26e
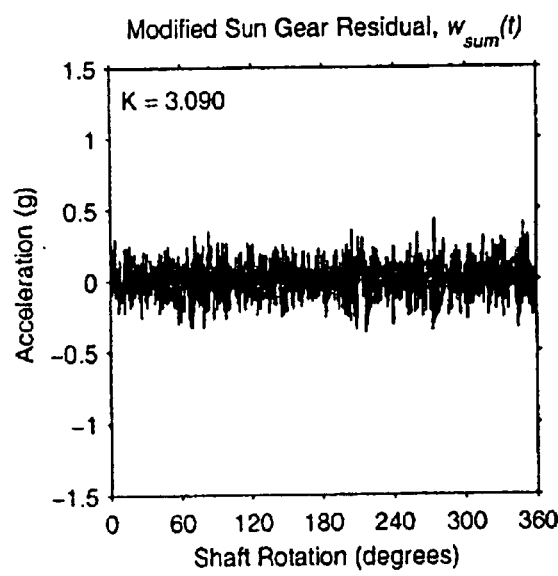
FIG. 4.26f

Sun gear averages, 165 lb ft torque, starboard ring accelerometer.
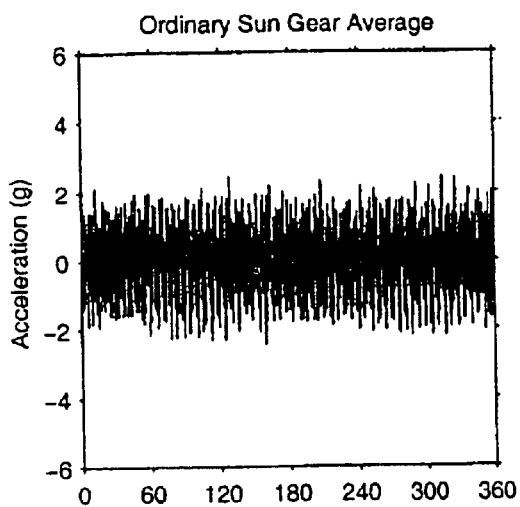
FIG. 4.27a
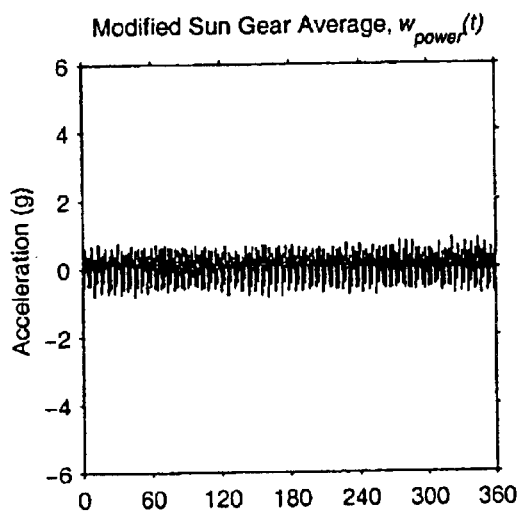
FIG. 4.27b
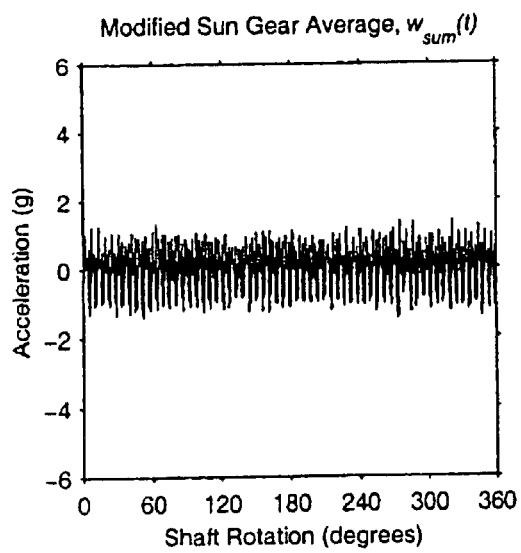
FIG. 4.27c

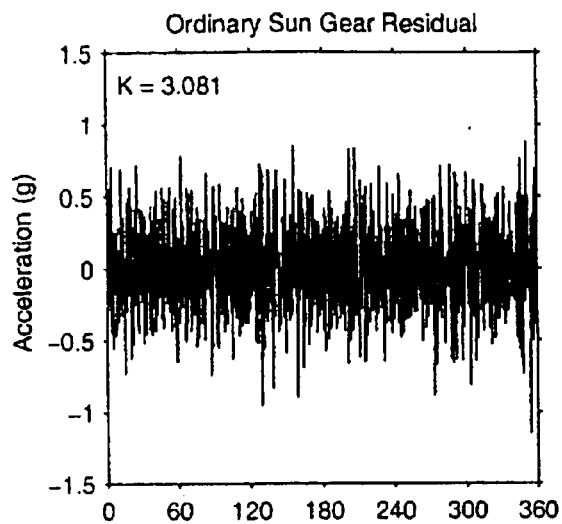
FIG.4.27d
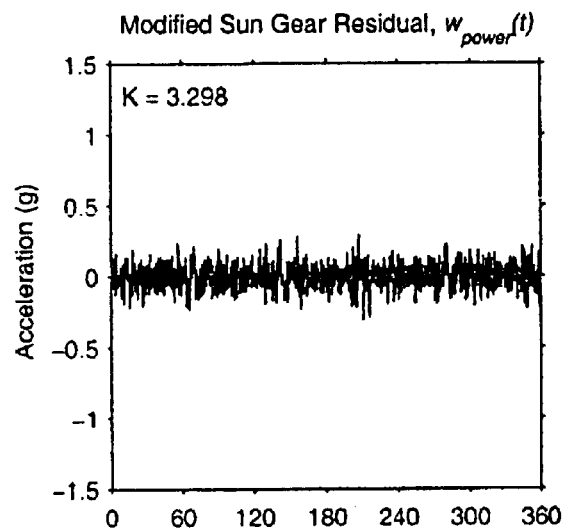
FIG.4.27e
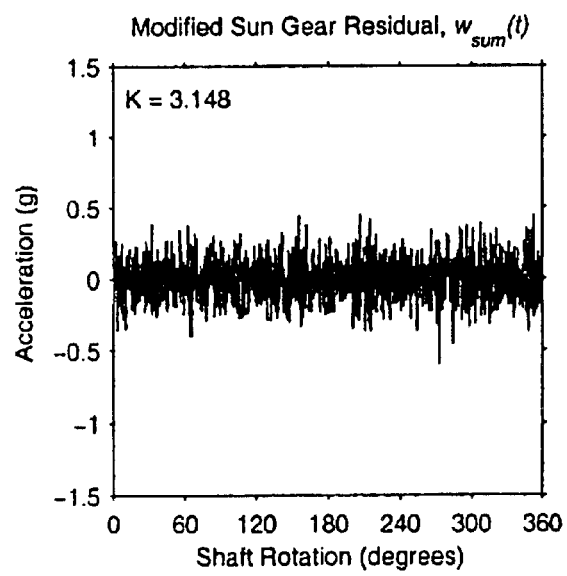
FIG.4.27f

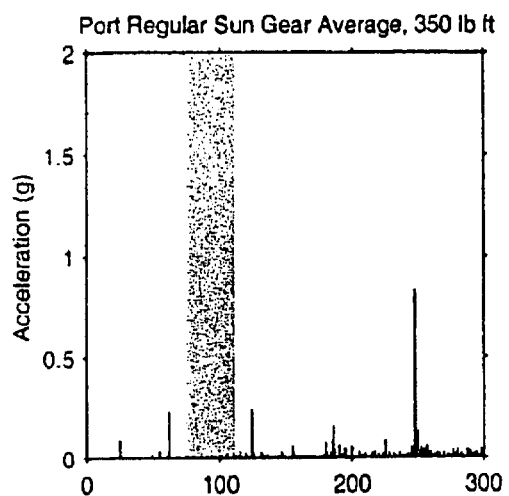
FIG. 4.28a
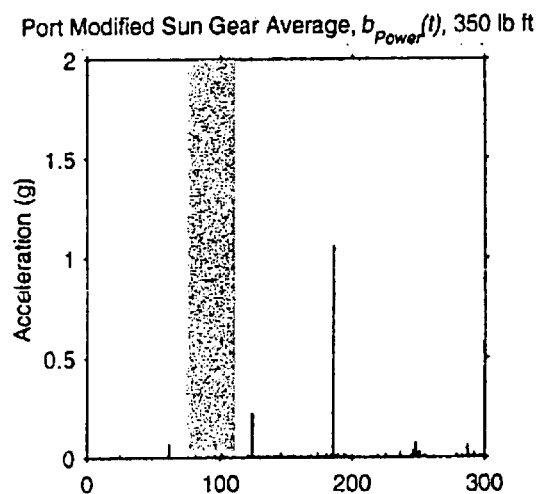
FIG. 4.28b
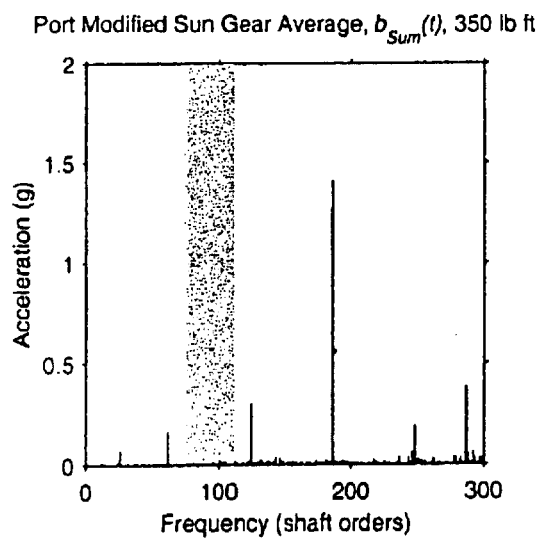
FIG. 4.28c
Spectra of sun gear averages at 350 lb ft from a gearbox without a sun gear fault.

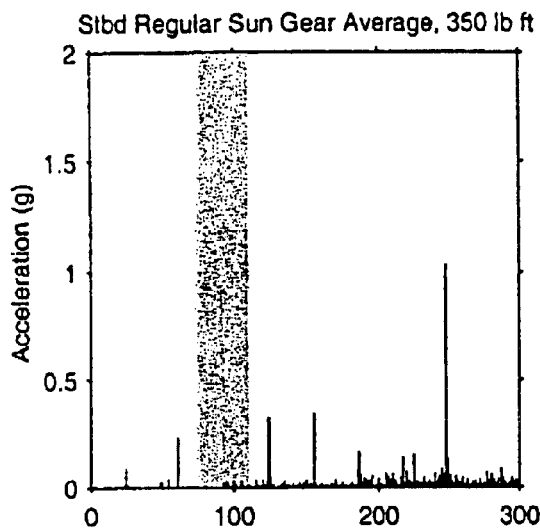
FIG. 4.28d
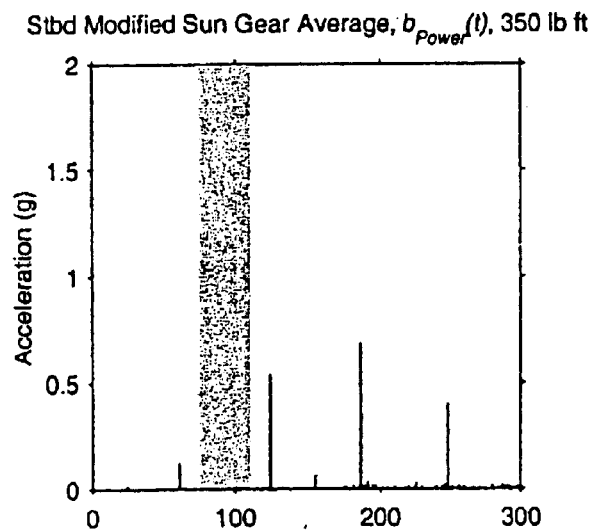
FIG. 4.28e
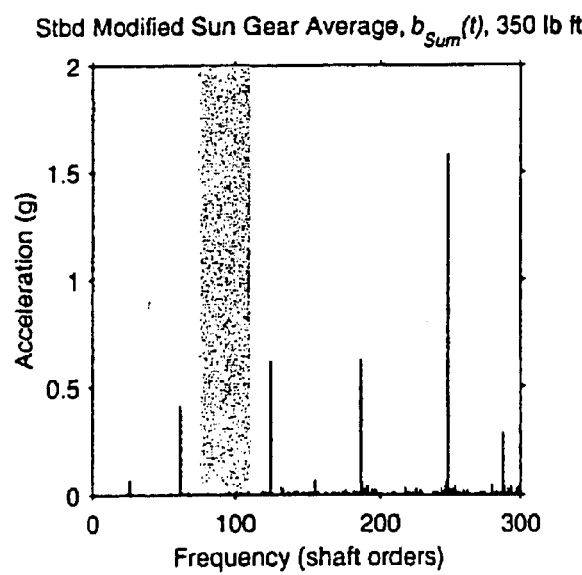
FIG. 4.28f

SYNCHRONOUS AVERAGING OF EPICYCLIC SUN GEAR VIBRATION

This application claims priority from provisional application Ser. No. 60/442,282, filed Jan. 24, 2003.

This invention relates generally to the processing of vibration data obtained from epicyclic gear trains, and more particularly to a method of performing synchronous averaging of sun gear vibration or vibrations.

The multiplicity of identical planet gears in an epicyclic gearbox, combined with the fact that the planet gear axes move in relation to the gearbox casing, make traditional vibration analysis techniques ineffective in the diagnosis of planet gear faults. The inability to effectively diagnose faults in epicyclic gearboxes is of particular concern in helicopters, most of which use epicyclic reduction gears as the final drive to the main rotor.

As most helicopter transmissions, and many aircraft propeller reduction gearboxes, utilize at least one epicyclic gear train, and since this forms a non-redundant critical part of the drive to the main rotor, or propeller it is important to have advanced techniques and tools to assess the conditions of these components. One such tool is vibration analysis. However, epicyclic gear train vibrations are difficult to analyze. Not only are there multiple planet gears producing similar vibrations, but there are multiple and time-varying vibration transmission paths from the gear mesh points to any vibration transducers mounted on the gearbox housing.

Previous work resulted in the development of a signal processing algorithm that "separated" the vibration from individual planet gears in an epicyclic gear train. This algorithm proved to be more effective at detecting faults in planetary gears than earlier planet-separation algorithms, or the ordinary synchronous averaging process, but it was not extended to the analysis of sun gear vibration at that stage. There is need for sun gear averaging method or methods that utilize a planet separation algorithm or technique to improve the detection of sun gear faults.

SUMMARY OF THE INVENTION

It is a major object of the invention to provide an improved method of detection of sun gear faults. Basically, the technique computes "separated" averages of the sun gear vibration "seen" through each planet, which are then phase shifted to account for their difference in meshing positions and recombined (averaged) to produce a modified sun gear average. With separation of the vibration from each planet, the technique produces a modified sun gear average that represents the average meshing behavior of the sun gear seen through a single "average" planet. In contrast, an ordinary sun gear average computed without planet separation represents the average meshing behavior of the sun gear seen through all planets simultaneously (with the accompanying summation and cancellation of certain vibration components).

Steps of the new and preferred method include:

a) detecting sun gear vibrations transmitted through each planet gear, b) computing separated averages of such detected vibrations, c) phase shifting said averages to account for the differences in gear meshing positions, d) and re-combining said phase shifted averages to produce a modified average value of the sun gear vibration.

As will be seen, a detection transducer is typically provided and operated on the ring gear, and sun gear vibration is transmitted to the transducer through the individual planet gears, and the expected sun gear vibration signal detected by the transducer is the sum of the sun gear vibration with each planet multiplied by the individual planet pass modulation. The measured transducer signal is separated into the components from each planet by applying a filter consisting of a window function for each planet to the measured signal. Sun gear averages are computed from each of these separated signals starting at the same instant in time. One average is selected as a reference, and the remaining averages are phase shifted by the angle between its planet and the reference planet so that the beginning of each phase shifted average starts with the same sun gear tooth in mesh with each planet.

The new technique was applied to vibration data collected from sun gear seeded-fault tests in both a simple industrial three-planet epicyclic gearbox, and a far more complex helicopter gearbox incorporating a five-planet epicyclic gear train. The technique significantly improved the detection of an isolated (single tooth) sun gear fault in both gearboxes. In both cases the fault condition index was increased by up to 66%. This increase was of more consequence for the helicopter gearbox, where the index was improved from around the warning level of 3.5, and hence a marginal level of fault detection using synchronous averaging, to well over the danger level of 4.5 using the new technique. It also allowed the fault to be detected at lower torques, and improved the ability to use one ring-gear accelerometer signal to confirm the detection of the fault with another ring-gear accelerometer. Accordingly, the new sun gear averaging technique significantly improves the condition assessment of epicyclic gear trains using vibration analysis.

These and other objects and advantages of the invention, as well as the details of an illustrative embodiments, will be more fully understood from the following specification and drawings, in which:

DRAWING DESCRIPTION

FIG. 1.1 is a view of an epicyclic gear train, with vibration detector;

FIGS. 1.2a) and b) are graphs of window functions;

FIG. 2.1 is a view of an epicyclic gear train, showing phase shifting;

FIG. 3.1 is a block diagram showing processing of detected vibration;

FIG. 4.1 is an exploded view of a Brevini gearbox;

FIGS. 4.2(a)–(f) are graphs;

FIGS. 4.3(a)–(f) are graphs;

FIGS. 4.4(a)–(f) are graphs;

FIGS. 4.5(a)–(f) are graphs;

FIGS. 4.6(a)–(f) are graphs;

FIGS. 4.7(a)–(f) are graphs;

FIGS. 4.8(a)–(f) are graphs;

FIGS. 4.9(a)–(f) are graphs;

FIG. 4.10 is a perspective and schematic view of a drive train for a helicopter employing epicyclic gearing;

FIG. 4.11 is a perspective view of a sun gear, with one-third of a tooth removed;

FIG. 4.12 is a perspective view of a transmission, showing sensor locations;

FIGS. 4.13(a) and (b) are graphs of window functions;

FIGS. 14.14(a) and (b) are graphs plotting residual Kurtosis values as a function of engine torque;

FIGS. 4.15(a)–(f) are graphs as labeled;
FIGS. 4.16(a)–(f) are graphs as labeled;
FIGS. 4.17(a)–(f) are graphs as labeled;
FIGS. 4.18(a)–(f) are graphs, as labeled;
FIGS. 4.19(a)–(f) are graphs, as labeled;
FIGS. 4.20(a)–(f) are graphs, as labeled;
FIGS. 4.21(a)–(f) are graphs, as labeled;
FIGS. 4.22(a)–(f) are graphs, as labeled;
FIGS. 4.23(a)–(f) are graphs, as labeled;
FIGS. 4.24(a)–(f) are graphs, as labeled;
FIGS. 4.25(a)–(f) are graphs, as labeled;
FIGS. 4.26(a)–(f) are graphs, as labeled;
FIGS. 4.27(a)–(f) are graphs, as labeled; and
FIGS. 4.28(a)–(f) are graphs, as labeled.

INTRODUCTION

As most helicopter transmissions, and many aircraft propeller reduction gearboxes, utilize at least one epicyclic gear train, and this forms a non-redundant critical part of the drive to the main rotor, or propeller, it is important to have advanced techniques and tools to assess the condition of these components. One such tool is vibration analysis. However, epicyclic gear train vibrations are difficult to analyse. Not only are there multiple planet gears producing similar vibrations, but there are multiple and time-varying vibration transmission paths from the gear mesh points to any vibration transducer mounted on the gearbox housing.

Previous work at DSTO by Forrester (1, 2 & 3) resulted in the development of an algorithm that produces "separated" synchronous vibration averages of the individual planet gears in an epicyclic gear train. This is achieved by applying a window function to be vibration signal from a transducer mounted on the ring gear. The function weights the signal according to the azimuth of the planet gear relative to the transducer location. The windowed vibration signal is then synchronously averaged in the usual way. (However, note that in order for the separated averages to be uniformly weighted, the number of periods averaged must be a whole multiple of the number of teeth on the ring gear so that there are a whole number of cycles of both the window function and the planet gear rotation). Separation of the planet gear averages is achieved by offsetting the window function by the angular spacing between the planet gears. In effect, this process is attempting to use the planet-pass modulation to separate the vibration from each planet. Two window functions that have been found to perform well are:

$$w_{power}(t) = \left(\frac{1}{2} + \frac{1}{2}\cos(2\pi f_c t)\right)^{P-1}, \quad (1)$$

$$w_{sum}(t) = \frac{1}{2} + \sum_{m=1}^{P-1} \cos(2\pi m f_c t) \quad (2)$$

where $f_c$ is the rational frequency of the planet carrier, and P is the number of planets (1). An example of an epicyclic gear train with three planets is shown in FIG. 1.1, and the planet-separation window functions for the gear train are shown in FIG. 1.2. Note that the summation of the individual planet window functions is a constant, and therefore the sum of the separated averages will be identical to the ordinary (non-separated) synchronous average multiplied by that constant.

Forrester's algorithm proved to be more effective at detecting faults in planetary gears than earlier planet-separation algorithms, or the ordinary synchronous averaging process (1, 4, 5 & 6), but it was not extended to the analysis of sun gear vibration at that stage. The invention disclosed herein concerns a new sun gear averaging technique that utilizes the planet-separation algorithm to improve the detection of localized sun gear faults. The technique computes "separated" averages of the sun gear vibration "seen" through each planet, which are then phase shifted to account for their difference in meshing positions and recombined (averaged) to produce a modified sun gear average. Ideally, with complete separation of the vibration from each planet, the technique produces a modified sun gear average that represents the average meshing behavior of the sun gear seen through a single "average" planet. In contrast, an ordinary sun gear synchronous average computed without planet separation represents the average meshing behavior of the sun gear seen through all planets simultaneously (with the accompanying summation and cancellation of certain vibration components). However, as complete separation is impossible in a operational gearbox due to:

a) the imperfect ability of the window function to make full use of the planet-pass modulation to separate the planet vibration signals, and b) the many vibration transmission paths present that are not affected by the planet-pass modulation (e.g., through the sun gear shaft, bearings, support structure, and housing to the ring gear), the new technique produces a modified sun gear average that lies somewhere between the ideal case and an ordinary sun gear average.

To test the new technique it was applied to vibration data collected from seeded sun gear fault tests in both a simple industrial three-planet epicyclic gearbox, and a far more complex helicopter gearbox incorporating a five-planet epicyclic gear train.

2. Procedure

The new procedure or method for computing the modified sun gear average contemplates one or more of the following:

1. Use the planet separation algorithm to compute the separated sun gear averages. This is almost the same as using the algorithm to compute the separated planet gear averages, however the sun gear ratio is substituted for the planet gear ratio during the averaging process. The same separation window function is used as for separating the planet gear vibrations (i.e., the window function is still based on the planet-carrier position).

2. Phase shift the separated sun gear averages so that the mesh points align. For example, in a three planet gear train, Planet 2 must be shifted +120°, and Planet 3 must be shifted −120° (or +240°) to align both with Planet 1, as shown in FIG. 2.1. Note that the sun gear meshes with the planets in the reverse order that they pass the transducer on the ring gear.

3. Combine (average) the aligned averages.

See for example FIG. 1.1 showing a vibration transducer 100 mounted on ring gear 101 of an epicyclic transmission 102. The latter also includes three planet gears 103 and a sun gear 104. The transducer operates as a detector to detect sun gear vibrations transmitted through each planet gear, as the sun gear rotates about axis 104a. Circuitry at 106 connected at 105 to 100 operates to compute separated averages of such detected vibrations. Circuitry at 108 connected at 107 to 106 operates to phase shift such averages, as disclosed herein, to account for differences in gear meshing positions. Circuitry at 110 connected at 109 to 108 operates to re-combine the phase shifted average values to produce a modified average value at 111 of sun gear vibrations, displayed or recorded at 112.

4. Theory

The following is adapted from the theoretical development found in [1].

The meshing frequency, $f_m$, of an epicyclic gear train with a fixed ring gear is (refer to FIG. 1.1).

$$f_m = N_r f_c = N_p(f_p + f_c) = N_s(f_s - f_c), \quad (3)$$

where $N_r$, $N_p$ and $N_s$ are the number of teeth on the ring, planet and sun gears respectively, and $f_c$, $f_p$ and $f_s$ are the absolute rational frequencies of the planet carrier, planet and sun gears, respectively. The relative frequencies $(f_p + f_c)$ of the planet to the carrier, and $(f_s - f_c)$ of the sun to the carrier are:

$$f_p + f_c = f_c \frac{N_r}{N_p}, \text{ and} \quad (4)$$

$$f_s - f_c = f_c \frac{N_r}{N_s}. \quad (5)$$

Ignoring secondary transmission paths, the sun gear vibration is transmitted to the transducer mounted on the ring gear through the individual planets. The expected sun gear vibration signal measured by the transduce will thus be the sum of the sun gear vibration with each planet multiplied by the individual planet-pass modulations, $$x_s(t) = \sum_{p=0}^{P-1} \alpha_p(t) v_{s,p}(t), \quad (6)$$

where $\alpha_p(t)$ is the amplitude modulation due to planet $p_1$ and $v_{s,p}(t)$ is the tooth meshing vibration of the sun gear with planet p. Alternatively, this can be expressed in the angle domain as $$x_s(\theta) = \sum_{p=0}^{P-1} \alpha_p\left(\frac{N_s}{N_r}\theta\right) v_{s,p}(\theta), \quad (7)$$

where $\theta$ is the relative rotation of the sun with respect to the planet carrier, p=planet
$N_s$=the number of teeth on the sun gear,
$N_r$=number of teeth on the ring gear,
$v_{s,p}(\theta)$=the tooth meshing vibration of the sun gear with plane p
$\alpha_p(N_s/N_r\theta)$=the amplitude modulation due to p.

Ignoring any slight variation between the planets, the amplitude modulation function (planet-pass modulation), $\alpha_p(\psi)$, will have the same form of all planets, differing only by a phase delay, $2\pi p/P$, $$\alpha_p(\varphi) = a\left(\varphi - \frac{2\pi p}{P}\right), \quad (8)$$

where $\alpha(\psi)$ is the planet-pass modulation function, and $\phi$ is the planet carrier angle, p is the planet, P is the number of planets. Since the amplitude modulation will repeat with the planet carrier rotation period, it can be expressed as a Fourier series, $$a(\varphi) = \sum_{m=-\infty}^{\infty} A_m e^{im\varphi}, \quad (9)$$

where $A_m$ are the Fourier series coefficients.

The method of extracting the representative vibrations of the sun gear "seen" through each planet (the "separated" sun gear averages) is to incorporate a selective (continuous) time filter into the averaging process. The filter proportionally divides the overall vibration signal into the estimated contributions from each planet. For each separated sun gear average, $\bar{z}_{s,p}(\theta)$, the filter window, $w(\theta)$, is centred at the point at which the planet is adjacent t the transducer. Assuming that all the vibration that is not synchronous with the relative sun gear rotation will tend toward zero with the averaging process (7 & 8) the synchronous average taken over N periods of the relative sun gear rotation can be expressed as $$\begin{aligned}
\bar{z}_{s,p}(\theta) &= \frac{1}{N}\sum_{n=0}^{N-1} w\left(\frac{N_s}{N_r}(\theta + 2\pi n) - \frac{2\pi p}{P}\right) x_s(\theta + 2\pi n) \\
&= \frac{1}{N}\sum_{n=0}^{N-1} w\left(\frac{N_s}{N_r}(\theta + 2\pi n) - \frac{2\pi p}{P}\right)\left[\sum_{k=0}^{P-1} a\left(\frac{N_s}{N_r}(\theta + 2\pi n) - \frac{2\pi k}{P}\right) v_{s,k}(\theta + 2\pi n)\right] \\
&= \sum_{k=0}^{P-1} \bar{v}_{s,k}(\theta) \frac{1}{N}\sum_{n=0}^{N-1} w\left(\frac{N_s}{N_r}(\theta + 2\pi n) - \frac{2\pi p}{P}\right) a\left(\frac{N_s}{N_r}(\theta + 2\pi n) - \frac{2\pi k}{P}\right),
\end{aligned} \quad (10)$$

where $\bar{v}_{s,k}(\theta)$ is the mean vibration of the sun gear with planet k, $\theta$ is the relative rotation of the sun with respect to the planet carrier, $x_s(\theta)$ is the expected sun gear vibration signal, $N_s$ is the number of teeth on the sun gear, $N_r$ is the number of teeth on the ring gear, $w(N_s/N_r\theta)$ is the planet separation window function, $a(N_s/N_r\theta)$ is the planet-pass modulation function, $v_{s,k}(\theta)$ is the tooth meshing vibration of the sun gear with planet k, $v_{s,k}(\theta)$ is the mean vibration of the sun gear with planet k, and P is the number of planets.

With careful selection of the window characteristics and the synchronous averaging parameters, the separation can be performed with a minimum of "leakage" of vibration from the other planets (note that even if the window completely separates the vibration of the sun gear with each planet, this will not totally eliminate the influence of the sun gear meshing with the other planets since there will still be transmission paths from those meshes through the sun gear to the planet in question. However, because these transmission paths will be more indirect (i.e., the vibrations have to travel through the sun gear), they should be less significant.) no loss of vibration data, and no distortion of the average. The three conditions that meet these criteria are:

a) the separation window is periodic with the planet carrier rotation (i.e., it can be expressed as a Fourier series with a fundamental frequency of $f_c$), b) the averaging is performed over the relative sun rotation period, and the number of periods averaged is a whole multiple of the number of teeth on the ring gear, $N_r$, and c) the Fourier series representing the separation window has no terms at or above the planet-pass frequency (this is done to limit aliasing and prevent distortion of the average) (i.e., $N_p \times f_c$) and is a real-valued, even function.

Under condition (a), the separation window can be expressed as a Fourier series $$w(\varphi) = \sum_{l=-\infty}^{\infty} W_l e^{il\varphi}, \tag{11}$$

and Equation 10 becomes $$\bar{z}_{s,p}(\theta) = \sum_{k=0}^{P-1} \bar{v}_{s,k}(\theta) \frac{1}{N} \sum_{n=0}^{N-1} \left[ \sum_{l=-\infty}^{\infty} W_l e^{il\left(\frac{N_s}{N_r}(\theta+2\pi n) - \frac{2\pi p}{P}\right)} \right. \tag{12}$$

$$\left. \sum_{m=-\infty}^{\infty} A_m e^{im\left(\frac{N_s}{N_r}(\theta+2\pi n) - \frac{2\pi k}{P}\right)} \right]$$

$$= \sum_{k=0}^{P-1} \bar{v}_{s,k}(\theta) \frac{1}{N} \sum_{n=0}^{N-1} \left[ \sum_{l=-\infty}^{\infty} \sum_{m=-\infty}^{\infty} \right.$$

$$\left. W_l A_m e^{i\left[(l+m)\frac{N_s}{N_r}(\theta+2\pi n) - (lp+mk)\frac{2\pi}{P}\right]} \right].$$

Under condition (b), that the number of periods averaged is a whole multiple of the number of teeth on the ring gear, $jN_r$ where $j$ is a whole number, and since the summation (or integration) of any sinusoid over a whole number of cycles will be zero, except where the frequency is zero, i.e., $$\frac{1}{jN_r} \sum_{n=0}^{jN_r-1} e^{i\left((l+m)\frac{N_s}{N_r}(\theta+2\pi n)\right)} = 0, \quad m \neq -l \tag{13}$$

$$\frac{1}{jN_r} \sum_{n=0}^{jN_r-1} e^{i\left((l+m)\frac{N_s}{N_r}(\theta+2\pi n)\right)} = 1, \quad m = -l.$$

Equation 12 therefore becomes $$\bar{z}_{s,p}(\theta) = \sum_{k=0}^{P-1} \bar{v}_{s,k}(\theta) \sum_{l=-\infty}^{\infty} W_l A_{-l} e^{il(k-p)\frac{2\pi}{P}}. \tag{14}$$

Under the condition (c), that the Fourier coefficients $W_l = 0$ for $l \geq P$, Equation 14 becomes $$\bar{z}_{s,p}(\theta) = \sum_{k=0}^{P-1} \bar{v}_{s,k}(\theta) \sum_{l=-(P-1)}^{P-1} W_l A_{-l} e^{il(k-p)\frac{2\pi}{P}}, \tag{15}$$

and if the separation window is further limited to be a real-valued even function (i.e., $W_l = W_{-l}$, and is real), and if the amplitude modulation is also a real-valued even function, this can be reduced to $$\bar{z}_{s,p}(\theta) = \sum_{k=0}^{P-1} \bar{v}_{s,k}(\theta) \left[ W_0 A_0 + 2 \sum_{l=1}^{P-1} W_l A_l \cos\left(l(k-p)\frac{2\pi}{P}\right) \right]. \tag{16}$$

Note that from Equation 15, the summation of the separated averages, $\bar{z}_{s,p}(\theta)$, can be shown to be equal to the ordinary sun gear average, $\bar{x}_s(\theta)$, multiplied by a constant, i.e., $$\sum_{p=0}^{P-1} \bar{z}_{s,p}(\theta) = \sum_{p=0}^{P-1} \sum_{k=0}^{P-1} \bar{v}_{s,k}(\theta) \sum_{l=-(P-1)}^{P-1} W_l A_{-l} e^{il(k-p)\frac{2\pi}{P}} \tag{17}$$

$$= PW_0 A_0 \sum_{k=0}^{P-1} \bar{v}_{s,k}(\theta)$$

$$= PW_0 \bar{x}_s(\theta),$$

and the separation process is therefore reversible.

As an illustrative example, if $P=3$, the first separated sun gear average, using Equation 16, becomes $$\bar{z}_{s,0}(\theta) = \begin{bmatrix} \bar{v}_{s,0}(\theta)(W_0 A_0 + 2(W_1 A_1 + W_2 A_2)) + \\ \bar{v}_{s,1}(\theta)\left(W_0 A_0 + 2\left(W_1 A_1 \cos\left(\frac{2\pi}{3}\right) + W_2 A_2 \cos\left(\frac{4\pi}{3}\right)\right)\right) + \\ \bar{v}_{s,2}(\theta)\left(W_0 A_0 + 2\left(W_1 A_1 \cos\left(\frac{4\pi}{3}\right) + W_2 A_2 \cos\left(\frac{8\pi}{3}\right)\right)\right) \end{bmatrix}$$

$$= \begin{bmatrix} \bar{v}_{s,0}(\theta)(W_0 A_0 + 2W_1 A_1 + 2W_2 A_2) + \\ \bar{v}_{s,1}(\theta)(W_0 A_0 - W_1 A_1 - W_2 A_2) + \\ \bar{v}_{s,2}(\theta)(W_0 A_0 - W_1 A_1 - W_2 A_2) \end{bmatrix},$$

and similarly, $$\bar{z}_{s,1}(\theta) = \begin{bmatrix} \bar{v}_{s,0}(\theta)(W_0 A_0 - W_1 A_1 + W_2 A_2) + \\ \bar{v}_{s,1}(\theta)(W_0 A_0 + 2W_1 A_1 + 2W_2 A_2) + \\ \bar{v}_{s,2}(\theta)(W_0 A_0 - W_1 A_1 - W_2 A_2) \end{bmatrix}$$

$$\bar{z}_{s,2}(\theta) = \begin{bmatrix} \bar{v}_{s,0}(\theta)(W_0 A_0 - W_1 A_1 - W_2 A_2) + \\ \bar{v}_{s,1}(\theta)(W_0 A_0 - W_1 A_1 - W_2 A_2) + \\ \bar{v}_{s,2}(\theta)(W_0 A_0 + 2W_1 A_1 + 2W_2 A_2) \end{bmatrix}.$$

Thus, if the amplitude modulation were known, and the separation window coefficients were set to $W_o = 1/A_o$, $W_1 = 1/2A_1$, and $W_2 = 1/2A_2$, the separation would be complete. However, this is rarely practical in operational gearboxes, and so alternative window functions must be used. The two separation windows that have been found to perform well are those mentioned in the introduction, i.e., Equations 1 and 2, which are repeated here for convenience.

$$w_{power}(t) = \left(\frac{1}{2} + \frac{1}{2}\cos(2\pi f_c t)\right)^{P-1}, \text{ and}$$

$$w_{sum}(t) = \frac{1}{2} + \sum_{m=1}^{P-1} \cos(2\pi m f_c t).$$

Applying the new sun gear averaging technique described in §2 to Equation 16, the modified sun gear average, $\bar{z}_{s,m}(\theta)$, can be expressed as $$\bar{z}_{s,m}(\theta) = \sum_{p=0}^{P-1} \sum_{k=0}^{P-1} \bar{v}_{s,k}\left(\theta - \frac{2\pi p}{P}\right)\left[W_0 A_0 + \right. \tag{18}$$

$$\left. 2 \sum_{l=1}^{P-1} W_l A_l \cos\left(l(k-p)\frac{2\pi}{P}\right)\right],$$

whereby the delay, $2\pi p/P$, aligns the mean sun gear vibration with each planet, $\bar{v}_{s,k}(\theta)$, so that the beginning of each separated average starts with the same sun gear tooth in mesh with each planet, and $\theta$ is the relative rotation of the sun with respect to the planet carrier, p, k and l are summation indicies, P is the number of planets, $W_0$ and $W_1$ are the Fourier coefficients of the planet separation window function, $A_0$ and $A_1$ are the Fourier coefficients of the planet-pass modulation function.

If the sun gear vibrations with each planet were identical, they would repeat with a period of $2\pi p/P$, i.e., $$v_{s,p}(\theta) = v_s\left(\theta + \frac{2\pi p}{P}\right), \quad (19)$$

where $v_s$ is the meshing vibration of the sun gear with a planet. Substituting Equation 19 into Equation 18 results in $$\bar{z}_{s,m}(\theta) = \bar{v}_s(\theta) \sum_{p=0}^{P-1} \sum_{k=0}^{P-1} \left[ W_0 A_0 + 2\sum_{l=1}^{P-1} W_l A_l \cos\left(l(k-p)\frac{2\pi}{P}\right) \right] \quad (20)$$

$$= P W_0 A_0 \bar{v}_s(\theta),$$

$\theta$ is the relative rotation of the sun with respect to the planet carrier, p, k and l are summation indicies, P is the number of planets, $W_0$ and $W_1$ are the Fourier coefficients of the planet separation window function, $A_0$ and $A_1$ are the Fourier coefficients of the planet-pass modulation function, and $v_s(\theta)$ is the mean vibration of the sun gear with a single planet, and the modified sun gear average would thus represent, to within a constant, the average vibration of the sun gear with a single planet. However, since the sun gear vibration will, in practice, not be identical with each planet, the modified average will only tend to average-out the differences between the meshing behaviour with each planet. Nevertheless, because the separated averages will be aligned at the same sun gear tooth, any localized sun gear defect will always appear at the same angular position, and thus be reinforced. This should lead to an improved ability to detect the fault compared to an ordinary sun gear average, where the influence of the defect will be more distributed.

RESULTS 4.1 Simple Industrial Gearbox

The new sun gear averaging technique was applied to two vibration data sets generated from an experimental rig with a small industrial Brevini EM1010-MN epicyclic gearbox (5). This gearbox has three planet gears with 32 teeth, a sun gear with 28 teeth, and a fixed ring gear with 95 teeth (see FIG. 4.1). The sun gear was driven by a 40 kW electric motor through a belt drive, and the planet carrier was loaded by a water brake dynamometer through a second belt drive. The vibration was measured with an accelerometer mounted radially on a small steel block bonded to the outside of the ring gear, and a synchronising signal was obtained from a photocell on the input shaft. The nominal input rotational speed was 19 Hz. The rated power of the gearbox at this speed is 18 kW.

The first data set was measured with the gearbox in a no-fault (undamaged) condition. The second data set was measured with approximately 0.05 mm ground from the loaded face of one sun gear tooth to form a narrow flat surface at the pitch line. The gearbox was operated at a power level of 12 kW in both cases (i.e., 67% of the rated power).

The sun gear averages were computed over 760 revolutions of the sun gear with respect to the carrier. The results for the no-fault case are presented in FIG. 4.2 to FIG. 4.5, and for the fault case in FIG. 4.6 to FIG. 4.9. These figures show the following:

a) Separated Sun Gear Averages: These are the averages obtained by applying the planet separation algorithm to the sun gear. Effectively, they are the averages of the sun gear seen through each individual planet gear. Note that the separated averages have been normalized by scale factors ($PW_o$) obtained from the separation windows (e.g., for $w_{sum}(t)$, the scale factor is 1.5).

b) Ordinary Sun Gear Averages: These are the averages computed without the planet separation algorithm.

c) Combined Sun Gear Averages: These are the averages obtained by combining the separated sun gear averages before aligning the mesh points. Effectively, they show that the sum of the separated averages is equivalent to the ordinary average, thus confirming Equation 17.

d) Modified Sun Gear Averages: These are the sun gear averages obtained by combining the separated sun gear averages after aligning the mesh points.

e) Residual Signals & Kurtosis Values: The residual signal kurtosis is a recognized method of detecting a localized gear fault. Warning and danger limits for this condition index are normally set to 3.5 and 4.5 respectively. For this gearbox, the residual signals were obtained by removing the mesh harmonics (i.e., multiples of 28 shaft orders) and their first and second order sidebands. For the fault case, the arrows indicate the meshing points of the fault with each planet. The kurtosis (or normalized $4^{the}$ statistical moment) values for these signals are printed on each plot, and tabulated in Table 1. Note that, due to the dismantling of the gearbox and the lack of a planet carrier synchronization signal, the numbering of the separated sun gear averages may not be consistent between the fault and no-fault cases. However, this is of no importance to the new sun gear averaging technique.

TABLE 1

Residual Signal Kurtosis Values

| Separation Window | $w_{power}(t)$ | | $w_{sum}(t)$ | |
|---|---|---|---|---|
| Average | No Fault | Fault | No Fault | Fault |
| First Separated Sun Gear Average | 2.894 | 8.540 | 2.687 | 9.606 |
| Second Separated Sun Gear Average | 2.673 | 5.374 | 2.598 | 5.918 |
| Third Separated Sun Gear Average | 2.929 | 7.586 | 2.868 | 8.030 |
| Ordinary Sun Gear Average | 3.301 | 4.870 | 3.301 | 4.870 |
| Combined Sun Gear Average | 3.301 | 4.870 | 3.301 | 4.870 |
| Modified Sun Gear Average | 2.768 | 7.860 | 2.699 | 8.677 |

4.2 Complex Helicopter Gearbox

The new sun gear averaging technique was also applied to vibration data from a seeded-fault sun gear test in a SH-60B Seahawk main transmission. These data were obtained from the United States Naval Air Warfare Center (NAWC) through The Technical Cooperation Program (TTCP). The test was conducted in the Helicopter Transmission Test Facility at the Naval Air Station at Patuxent River, Md., in January 2001. This facility has the capability to fully load the complete transmission including the intermediate and tail gearboxes. Power is supplied by the aircraft engines, and absorbed by water brakes.

The SH-60 transmission has an epicyclic stage as the final reduction to the main rotor, as shown in FIG. 4.10. The sun, five planets, and ring gear have, respectively, 62, 83, and 228 teeth. The seeded fault in this test was the removal of one third of a single sun gear tooth, as shown in FIG. 4.11. The vibrations from the epicyclic stage were measured by the port-ring and starboard-ring accelerometers shown in FIG. 4.12. A tachometer signal from a pick-up on the hydraulic drive gear in the starboard accessory gearbox was used as the reference signal for the synchronous averaging. The tachometer signal was nominally a sine wave with a frequency of 11 kHz at the normal operating speed. The ratio of the planet carrier (rotor shaft) rotational frequency to the tachometer frequency was: 3441/8816000. The vibration and tachometer signals were sampled at 50 kHz with a bandwidth of 20 kHz.

The new sun gear averaging technique was applied to the vibration data sets detailed in Table 2. The 100% dual-engine power for all versions of the Black Hawk and Seahawk helicopters is defined as 2828 shp (2109 kW), which is equivalent to a torque of 355 lb ft. (482 Nm) at the engine drive shaft speed of 20,900 rpm (348.3 Hz). However, the improved durability gearbox fitted to the Australian S-70A-9 and S-70B-2 variants, and the US Navy SH-60B, actually has a continuous power rating of 3400 shp, which is equivalent to a torque of 427 lb ft. (9).

The sun gear averages were computed over 684 revolutions of the sun gear with respect to the carrier. This represented about 60 seconds of data. The separation window functions are shown in FIG. 4.13. The results are presented in FIG. 4.16 to FIG. 4.27. These figures show the following:

a) Ordinary Sun Gear Averages: These are the averages computed without the planet separation algorithm.

b) Modified Sun Gear Averages: These are the averages obtained by combining the separated sun gear averages after aligning the mesh points.

c) Residual Signals & Kurtosis Values: The residual signals for the Seahawk sun gear averages were obtained by removing the mesh harmonics (i.e, multiples of 62 shaft orders) and their first and second order sidebands. A band between 75 and 110 shaft orders was also removed, as shown in FIG. 4.15, as this is the location of a strong resonance. The resonance frequency is slightly higher on the port side than the starboard side, but the band accommodates this difference. The resonance is possibly in the gearbox structure or in the accelerometer mounting brackets. Although the resonance occurs near the tail take-off gear mesh frequency, it is more likely to be excited by the impacts generated by the fault, as these are synchronous with the sun gear average (and will thus not be averaged-out). The kurtosis values of the residual signals are printed on each plot, tabulated in Table 3, and plotted in FIG. 4.14, where the horizontal dotted and dashed lines indicate the warning and danger limits respectively.

5. Discussion 5.1 Simple Industrial Gearbox

The results show the following:

1. The fault is immediately apparent in each of the separated sun gear averages, however the impact is stronger in the first and third separated averages than in the second, as shown in FIG. 4.6 and FIG. 4.7. This indicates that there are differences in the meshing behaviour of the sun gear with each planet. These differences can be attributed to physical factors such as slight differences between the planets, gear misalignments, etc. As the new technique aligns and combines the sun/planet mesh points, this effectively averages out the differences between the planets, and produces an average of the sun gear vibration as seen through a single "average" planet.

2. The ordinary and combined sun gear averages are identical (to within numerical error). Thus, the separation algorithm is reversible, and is shown not to distort the vibration signal.

3. Ordinary synchronous averaging produces a sun gear average with three equally spaced fault impacts, while the new technique appears to produce an average with only one fault impact. This is most probably because there is good separation of the vibration from each planet, and the transducer senses the vibration from the mesh point with the planet through which the average is taken (i.e., the planet immediately adjacent to the transducer) much more strongly than the vibration from the more distant mesh points with the other planets. Note, that three impacts are visible in the ordinary average because it is an average taken through all the planets simultaneously, and the mesh points with each planet are distributed instead of being aligned.

4. The fault is more easily identified in the residual signals of the modified sun gear averages than the ordinary averages, as shown in FIG. 4.8 and FIG. 4.9, and Table 1. The residual kurtosis jumps from 4.870 to 7.860 (+61%) using the power separation window, and from 4.870 to 8.677 (+78%) using the summation separation window. Slightly higher residual kurtosis values (8.540 and 9.606, respectively) are present in the first separated sun gear averages for both window cases. However, the residual kurtosis values from the modified averages are considered more reliable because both window cases also have lower residual kurtosis values (5.374 and 5.918 respectively) for two of the other separated averages. Another strong point in favour of the new technique is the fact that the fault is immedi-

TABLE 3

Residual signal kurtosis values.

| Torque (lb ft) | Port Ring Accelerometer | | | Starboard Ring Accelerometer | | |
|---|---|---|---|---|---|---|
| | Ordinary | Modified | | Ordinary | Modified | |
| | | $b_{Power}$ (t) | $b_{Sum}$ (t) | | $b_{Power}$ (t) | $b_{Sum}$ (t) |
| 425 | 3.975 | 6.058 (+52%) | 6.186 (+56%) | 4.160 | 5.998 (+44%) | 6.900 (+66%) |
| 350 | 3.751 | 5.451 (+45%) | 6.044 (+61%) | 3.206 | 4.863 (+52%) | 5.101 (+59%) |
| 300 | 3.525 | 4.288 (+22%) | 3.953 (+12%) | 3.179 | 3.966 (+25%) | 4.225 (+33%) |
| 250 | 3.453 | 3.682 (+7%) | 3.411 (−1%) | 3.053 | 3.840 (+26%) | 3.617 (+18%) |
| 200 | 2.996 | 3.929 (+31%) | 4.068 (+36%) | 3.025 | 3.805 (+26%) | 3.497 (+16%) |
| 165 | 2.923 | 3.343 (+14%) | 3.090 (+6%) | 3.081 | 3.298 (+7%) | 3.148 (+2%) | ately identifiable in the modified average itself, not just in its residual signal. Thus, the new technique clearly improves the detection of the fault.

5.2 Complex Helicopter Gearbox

The results show the following:

1. The new modified sun gear averaging technique significantly improves the detection of the sun gear fault using the residual kurtosis method. The kurtosis levels are increased by up to 66%, as shown in Table 3. This is a similar increase to that obtained with the simple industrial gearbox.

2. The fault is detectable at lower torques with the new technique, as shown in FIG. 4.14. The residual kurtosis levels of the modified averages exceed the warning limit of 3.5 for all engine torques at or above 200 lb ft., with the exception of one measurement (3.411 and 250 lb ft. for the port-ring accelerometer using the $b_{sum}(t)$ window). In contrast, the residual kurtosis levels of the ordinary averages only exceed the warning limit at or above 300 lb ft. for the port accelerometer, and only at 425 lb ft. for the starboard accelerometer.

3. The residual kurtosis levels of the modified averages surpass the danger level of 4.5 at the higher torques of 350 lb ft. and 425 lb ft. for both accelerometers, while this level is never exceeded with the ordinary averages. Thus, the new technique assigns a larger and more appropriate condition index level to what is a severe fault.

4. Apart from the previously noted exception, the new technique produces similar results from both the port and starboard ring gear accelerometers, thereby allowing a more robust detection of the fault through cross-confirmation of one result with the other. In comparison, the results for the ordinary averages computed from the starboard ring accelerometer do not confirm the existence of the fault detected with the port ring accelerometer until the torque reaches the very high level of 425 lb ft. (120% torque). Thus it is arguable whether this severe fault would be detected at all using ordinary averaging if secondary confirmation is required.

5. Both separation window functions produce similar improvements to the detection of the fault, although the summation window, $W_{sum}(t)$, is perhaps slightly better at the higher torques.

6. In the modified averages where the fault is detectable, the averages exhibit five almost equally strong impacts per revolution of the sun gear. However, as a result of the separation algorithm, it might be expected that they should have only one impact, or that one should be significantly stronger than the rest, as was found in the simple industrial gearbox case. The results therefore indicate that perhaps there is weaker separation of the vibration from each planet gear in this case (due to the larger number of transmission paths in this gearbox, or the placement of the transducers in locations where the planet-pass modulation is weak), or that the severity of the fault is overcoming the differences in transmission path effects.

It was noted in §4.2 that the resonance in the sun gear averages between 75 and 110 shaft orders was probably being excited by the impacts generated by the fault as it meshed with each of the five planets. Supporting evidence for this is shown in the figures, which displays the spectra of the sun gear averages from a Seahawk gearbox at the same torque (350 lb ft.) without a sun gear fault. While these are from a different gearbox, which will necessarily have slightly different vibration, it can clearly be seen that the amplitudes of the frequencies in the shaded resonance band are very low compared to those in FIG. 4.15. It should also be noted that, while this gearbox did not have a sun gear fault, it did have a seeded planet gear fault (half a tooth removed form one planet), which would also have produced resonance-exciting impacts as it meshed with the sun and ring gears. However, the frequency of these impacts would have been non-synchronous with the relative sun gear rotation, and thus have been attenuated during the averaging process. It follows from this, that the amplitude of the vibration in the resonance band may therefore be a useful indicator of the presence of a sun gear fault. However, the seeded-fault in this test is very severe, and this method of sun gear fault detection may not be so effective with a natural incipient fault.

6. Conclusion

A new technique has been presented for the analysis of epicyclic sun gear vibration using a DSTO-developed planet separation algorithm. The technique has been shown to significantly improve the detection, using the residual signal kurtosis method, of an isolated (single tooth) sun gear fault in both a relatively simple industrial epicyclic gearbox, and a far more complex helicopter gearbox. In both cases the kurtosis levels were increased by up to 66%. This increase was of more consequence for the helicopter gearbox, whereby the kurtosis was improved from around the warning level of 3.5, and hence a marginal level of fault detection using ordinary synchronous averaging, to well over the danger level of 4.5 using the new technique. It also allowed the fault to be detected at lower torques, and improved the ability to use one ring-gear accelerometer signal to confirm the detection of the fault with another ring-gear accelerometer.

It is concluded that the new sun gear averaging technique can significantly improve the condition assessment of epicyclic gear trains using vibration analysis.

TABLE 2

Vibration data sets.

| Data File | Engine 1 Torque (lb ft) | Engine 2 Torque (lb ft) | Tail Torque (lb ft) | Length (seconds) |
|---|---|---|---|---|
| IMDSun.1.001 | 425 | 425 | 800 | 360 |
| IMDSun.1.002 | 350 | 350 | 800 | 360 |
| IMDSun.1.003 | 300 | 300 | 800 | 360 |
| IMDSun.1.004 | 250 | 250 | 800 | 360 |
| IMDSun.1.005 | 200 | 200 | 800 | 360 |
| IMDSun.1.006 | 165 | 165 | 1450 | 360 |

REFERENCES

1. Forrester, B. D., "A Method for the Separation of Epicyclic Planet Gear Vibration Signatures", Proceedings of the Third International Conference on Vibratory Surveillance Methods and Diagnostic Techniques, Senlis, France, Oct. 12th–15th, 1998.
2. Forrester, B. D., "Method and Apparatus for Performing Selective Signal Averaging", Australian Patent 672166 (40638/95).
3. Forrester, B. D., "A Method for the Separation of Epicyclic Planet Gear Vibration Signatures", U.S. Pat. No. 6,298,725.
4. Howard, I. M., "An Investigation of Vibration Signal Averaging of Individual Components in an Epicyclic Gearbox", DSTO ARL Propulsion Report 185, ARL-PROP-R-185, AR-006-147, June 1991.

5. McFadden, P. D., and Howard, I. M., "The Detection of Seeded Faults in an Epicyclic Gearbox by Signal Averaging of the Vibration", DSTO ARL Propulsion Report 183, ARL-PROP-R-183, AR-006-087, October 1990.

6. Hardman, W., Hess, A., and Blunt, D., "USN Drivetrain Diagnostics and Prognostics Development Strategy and Demonstration", COMADEM 2000 Conference and Exhibition, Houston, Tex., USA, Dec. 3rd–8the, 2000.

7. Forrester, B. D., "Advanced Vibration Analysis Techniques for Fault Detection and Diagnosis in Geared Transmission Systems", PhD Thesis, Swinburne University of Technology, February 1996.

8. McFadden, P. D., "A Model for the Extraction of Periodic Waveforms by Time Domain Averaging", Aero Propulsion Technical Memorandum 435, Department of Defence, Aeronautical Research Laboratory, March 1986.

9. Jackson, R. W., "Configuration and Other Differences Between Black Hawk and Seahawk Helicopters in Military Service in the USA and Australia", DSTO General Document 43, AR-008-386, December, 1993.

I claim:

1. In the method of detecting a localized sun gear fault, in the operation of an epicyclic gear train having ring, planet and sun gears, and a planet carrier, the steps that include a) detecting sun gear vibrations transmitted through each planet gear,
   b) computing separated averages of such detected vibrations,
   c) phase shifting said averages to account for the differences in gear meshing positions,
   d) and re-combining said phase shifted averages to produce a modified average value of the sun gear vibration.

2. The method of claim 1 wherein a detection transducer is provided and operated on the ring gear.

3. The method of claim 1 wherein one separated average is selected as a reference, and the remaining averages are phase shifted by the angle between its planet and the reference planet so that the beginning of each separated average starts with the same sun gear tooth in mesh with each planet, and all the separated averages are aligned.

4. The method of claim 3 wherein a detection transducer is provided and operated on the ring gear.

5. The method of claim 2 wherein the sun gear vibration is transmitted to the transducer through the individual planet gears, an the expected sun gear vibration signal detected by the transducer is the sum of the sun gear vibration with each planet multiplied by the individual planet pass modulations.

6. The method claim 5 wherein the expected sun gear vibration signal $X_s(t)$ is determined substantially in accordance with the following equation (6) represented as follows:

$$x_s(t) = \sum_{p=0}^{P-1} \alpha_p(t) v_{s,p}(t),$$

where: $\alpha_p(t)$ is the amplitude modulation due to planet p, and $v_{s,p}(t)$ is the tooth meshing vibration of the sun gear with planet p, and P is the number of planets.

7. The method of claim 5 wherein the expected sun gear vibration signal $x_s(\theta)$ expressed in the angular domain is determined substantially in accordance with the following equation (7) represented as follows:

$$x_s(\theta) = \sum_{p=0}^{P-1} \alpha_p\left(\frac{N_s}{N_r}\theta\right) v_{s,p}(\theta),$$

where $\theta$ is the relative rotation of the sun with respect to the planet carrier P is the of planets, p=planet
$N_s$=the number of teeth on the sun gear,
$N_r$=the number of teeth on the ring gear,
$v_{s,p}(\theta)$=the tooth meshing vibration of the sun gear with planet P,
$\alpha_p(N_s/N_r\theta)$=the amplitude modulation due planet p.

8. The method of claim 4 wherein the amplitude modulation function (8) (planet-pass modulation), $\alpha_p(\phi)$, differs only by a phase delay $2\pi p/P$, $$\alpha_p(\varphi) = a\left(\varphi - \frac{2\pi p}{P}\right),$$

where $\alpha(\psi)$ is the planet-pass modulation function and $\psi$ is the planet carrier angle
p is the planet
P is the number of planets.

9. The method of claim 1 wherein steps a) and b) include providing and operating a filter proportionally dividing the overall vibration signal into estimated contributions from each planet gear.

10. The method of claim 9 wherein separated sun gear values $\overline{Z}_{s,p}(\theta)$ are derived.

11. The method of claim 10 wherein said value $z_{s,p}(\theta)$ taken over N periods of the relative sun gear rotation is represented substantially by the following equation (10):

$$\bar{z}_{s,p}(\theta) = \frac{1}{N}\sum_{n=0}^{N-1} w\left(\frac{N_s}{N_r}(\theta + 2\pi n) - \frac{2\pi p}{P}\right) x_s(\theta + 2\pi n)$$

$$= \frac{1}{N}\sum_{n=0}^{N-1} w\left(\frac{N_s}{N_r}(\theta + 2\pi n) - \frac{2\pi p}{P}\right)$$

$$\left[\sum_{k=0}^{P-1} a\left(\frac{N_s}{N_r}(\theta + 2\pi n) - \frac{2\pi k}{P}\right) v_{s,k}(\theta + 2\pi n)\right]$$

$$= \sum_{k=0}^{P-1} \overline{v}_{s,k}(\theta) \frac{1}{N}\sum_{n=0}^{N-1} w\left(\frac{N_s}{N_r}(\theta + 2\pi n) - \frac{2\pi p}{P}\right)$$

$$a\left(\frac{N_s}{N_r}(\theta + 2\pi n) - \frac{2\pi k}{P}\right),$$

where $v_{s,k}(\theta)$ is the mean vibration of the sun gear with planet k, $\theta$ is the relative rotation of the sun with respect to the planet carrier, $x_s(\theta)$ is the expected sun gear vibration signal, $N_s$ is the number of teeth on the sun gear, $N_r$ is the number of teeth on the ring gear, $w(N_s/N_r\theta)$ is the planet separation window function, a $(N_s/N_r\theta)$ is the planet-pass modulation function, $v_{s,k}(\theta)$ is the tooth meshing vibration of the sun gear with planet k, $v_{s,k}(\theta)$ is the mean vibration of the sun gear with planet k, and P is the number of planets.

12. The method of claim 10 wherein a modified sun gear average value $\bar{z}_{s,m}(\theta)$ is derived and represented substantially by the following equation $$\bar{z}_{s,m}(\theta) = \sum_{p=0}^{P-1} \sum_{k=0}^{P-1} \bar{v}_{s,k}\left(\theta - \frac{2\pi p}{P}\right) \left[W_0 A_0 + 2\sum_{l=1}^{P-1} W_l A_l \cos\left(l(k-p)\frac{2\pi}{P}\right)\right],$$

where the delay, $2\pi p/P$, aligns the mean sun gear vibration with each, $v_{s,k}(\theta)$, so that the beginning of each separated average starts with the same sun gear tooth in mesh with each planet, and $\theta$ is the relative rotation of the sun with respect to the planet carrier, p, k and l are summation indicies, P is the number of planets, $W_0$ and $W_1$ are the Fourier coefficients of the planet separation window function, $A_0$ and $A_1$ are the Fourier coefficients of the planet-pass modulation function.

13. The method of claim 10 wherein a modified sun gear average value $Z_{s,m}(\theta)$ is derived and represented substantially by the following equation (20), $$\bar{z}_{s,m}(\theta) = \bar{v}_s(\theta) \sum_{p=0}^{P-1} \sum_{k=0}^{P-1} \left[W_0 A_0 + 2\sum_{l=1}^{P-1} W_l A_l \cos\left(l(k-p)\frac{2\pi}{P}\right)\right]$$
$$= P W_0 A_0 \bar{v}_s(\theta),$$

and $\theta$ is the relative rotation of the sun with respect to the planet carrier, p, k and l are summation indicies, P is the number of planets, $W_0$ and $W_1$ are the Fourier coefficients of the planets separation window function, $A_0$ and $A_1$ are the Fourier coefficients of the planet-pass modulation function, and $\bar{v}_s(\theta)$ is the mean vibration of the sun gear with a single planet.

* * * * *